United States Patent [19]

Morton et al.

[11] Patent Number: 4,774,569

[45] Date of Patent: Sep. 27, 1988

[54] METHOD FOR ADAPTIVELY MASKING OFF A VIDEO WINDOW IN AN OVERSCANNED IMAGE

[75] Inventors: Roger R. A. Morton; John E. Redden, both of Rochester, N.Y.

[73] Assignee: Eastman Kodak Company, Rochester, N.Y.

[21] Appl. No.: 77,718

[22] Filed: Jul. 24, 1987

[51] Int. Cl.[4] .......................................... H04N 1/387
[52] U.S. Cl. .................................. 358/102; 358/280; 358/282; 382/22
[58] Field of Search ....................... 358/282, 280, 102; 382/22

[56] References Cited

U.S. PATENT DOCUMENTS

| | | | |
|---|---|---|---|
| 4,053,928 | 10/1977 | Orton et al. | 358/96 |
| 4,189,711 | 2/1980 | Frank | 340/146.3 |
| 4,399,461 | 8/1983 | Powell | 358/166 |
| 4,428,077 | 1/1984 | Shimada | 382/22 |
| 4,451,854 | 5/1984 | Daigo | 358/282 |
| 4,499,598 | 2/1985 | Chittineni | 382/54 |
| 4,501,016 | 2/1985 | Persoon et al. | 382/22 |
| 4,553,260 | 11/1985 | Belt et al. | 382/22 |
| 4,561,104 | 12/1985 | Martin | 382/8 |
| 4,569,079 | 2/1986 | Yoshida | 382/1 |
| 4,575,751 | 3/1986 | Duschl | 358/106 |
| 4,577,235 | 3/1986 | Kannapell et al. | 358/280 |
| 4,578,765 | 3/1986 | Barker | 364/514 |
| 4,611,349 | 9/1986 | Hou | 382/47 |
| 4,618,990 | 10/1986 | Sieb et al. | 382/43 |
| 4,625,330 | 11/1986 | Higgins | 382/27 |
| 4,631,599 | 12/1986 | Cawkell | 358/280 |
| 4,636,863 | 1/1987 | Kaizaki et al. | 358/167 |
| 4,637,059 | 1/1987 | Habitzreiter et al. | 382/54 |
| 4,638,369 | 1/1987 | Hsieh | 358/283 |
| 4,648,120 | 3/1987 | Chittineni | 382/54 |
| 4,672,461 | 6/1987 | Yoshida | 358/280 |
| 4,685,143 | 8/1987 | Choate | 382/22 |
| 4,700,237 | 10/1987 | Yoshioka | 358/102 |

Primary Examiner—Howard W. Britton
Attorney, Agent, or Firm—Dennis R. Arndt

[57] ABSTRACT

A method for extracting (masking off) a desired video window, such as that which forms a scanned image of a document or a portion thereof, from a overscanned image stored in a frame buffer is disclosed herein. Specifically, this method involves first determining horizontal pixel locations for left and right edges of the document for each of a plurality of scan lines located within said scanned image. Then, histograms of the left and right edge locations are fabricated. Once this has occurred, the positions of top and bottom edges of an escribing rectangle is found. The escribing rectangle is a rectangular area, located within the frame buffer, which includes the entire document. Now, with the top and bottom edge locations known, the inventive method locates the right and left edge locations of the escribing rectangle by suitably analyzing the histogram results. Next, memory address corresponding to the first pixel location in the escribing rectangle and the vertical and horizontal size of the rectangle are determined, using all the edge locations of the escribing rectangle, and then applied as input to addressing circuitry located within the frame buffer. Once this occurs, then all (or a portion of) the pixel values stored within the frame buffer and located on and within the escribing rectangle are successively accessed and routed to an output connection as being those pixel values that form the image, or a selected portion thereof, of the document.

17 Claims, 42 Drawing Sheets

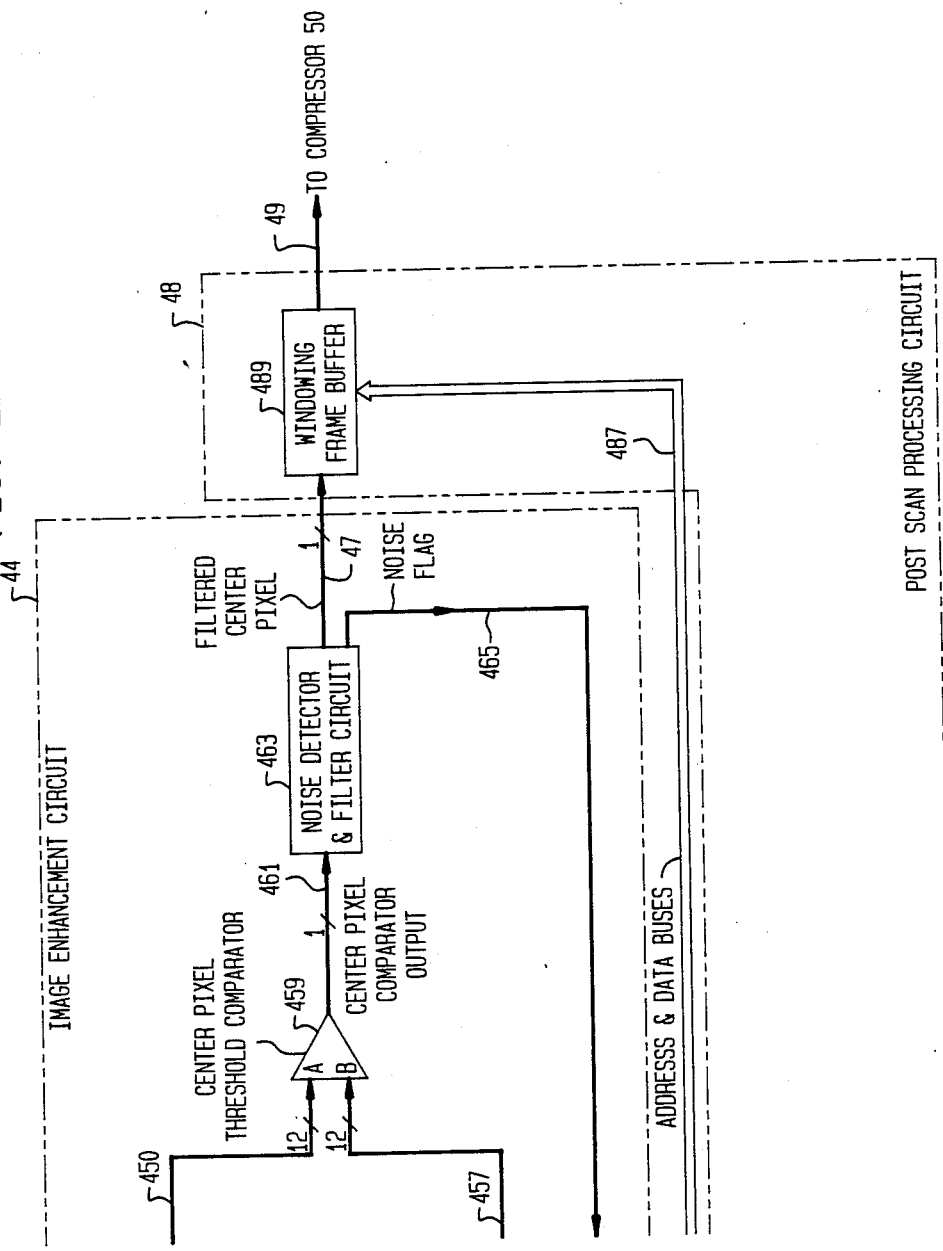

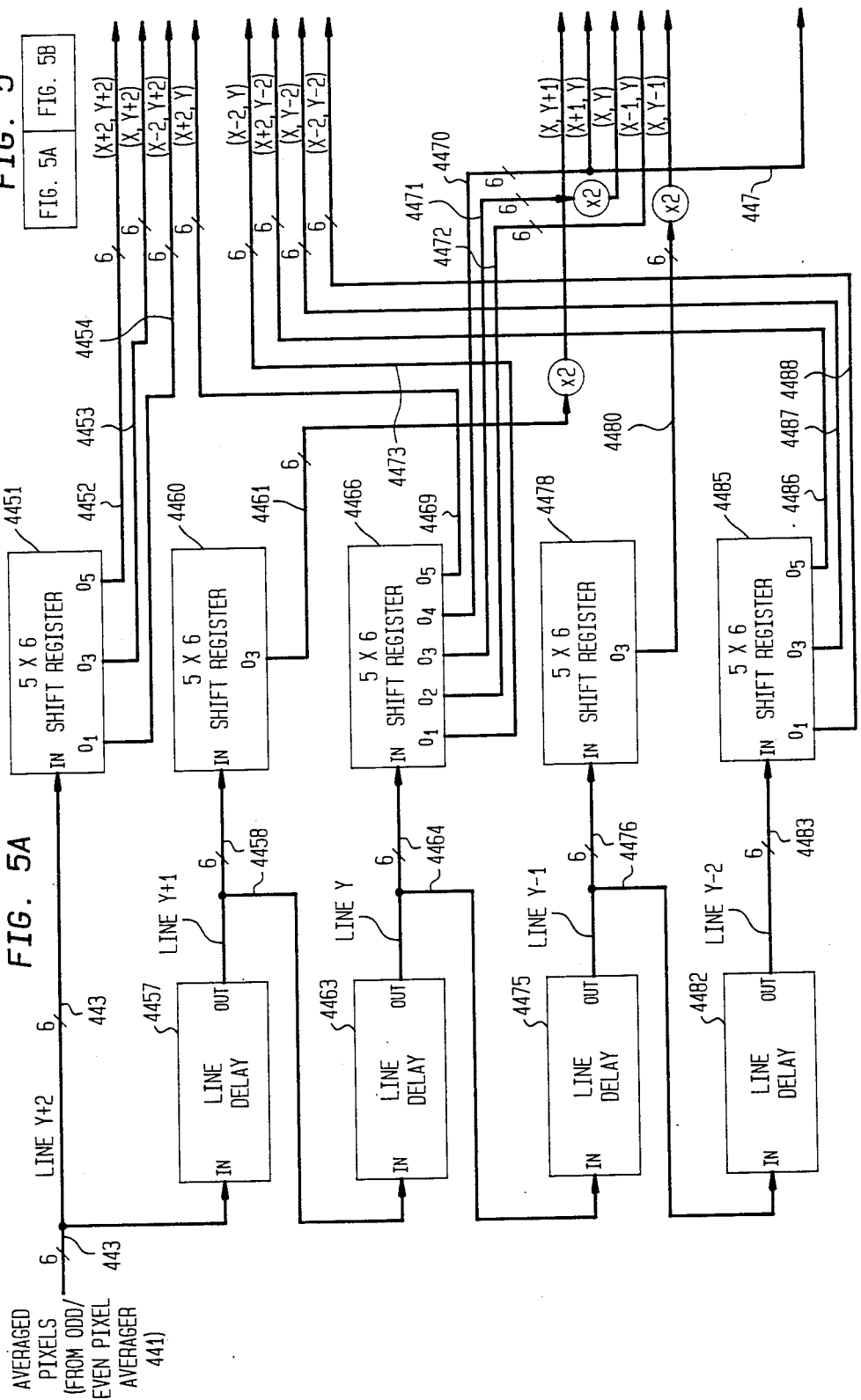

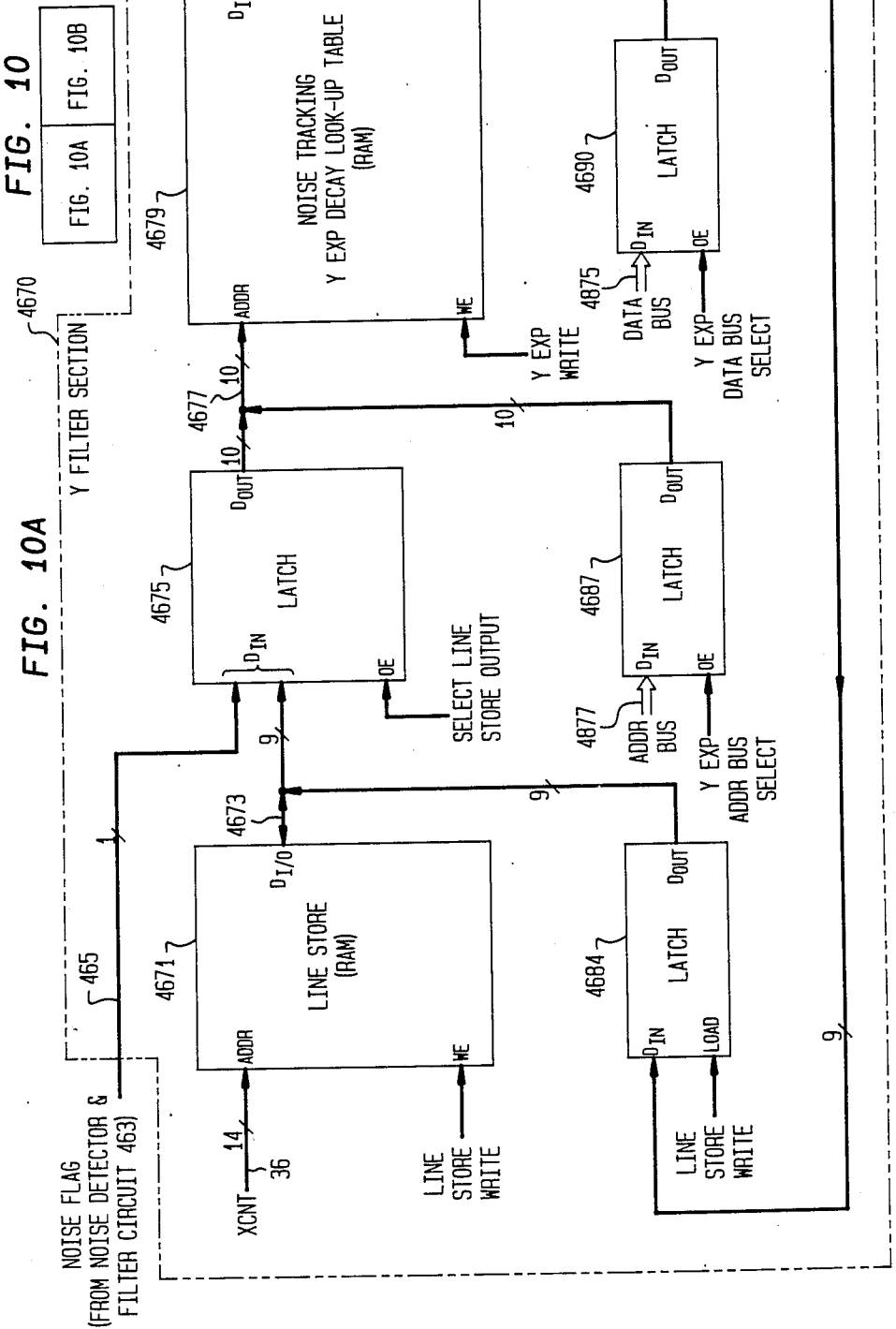

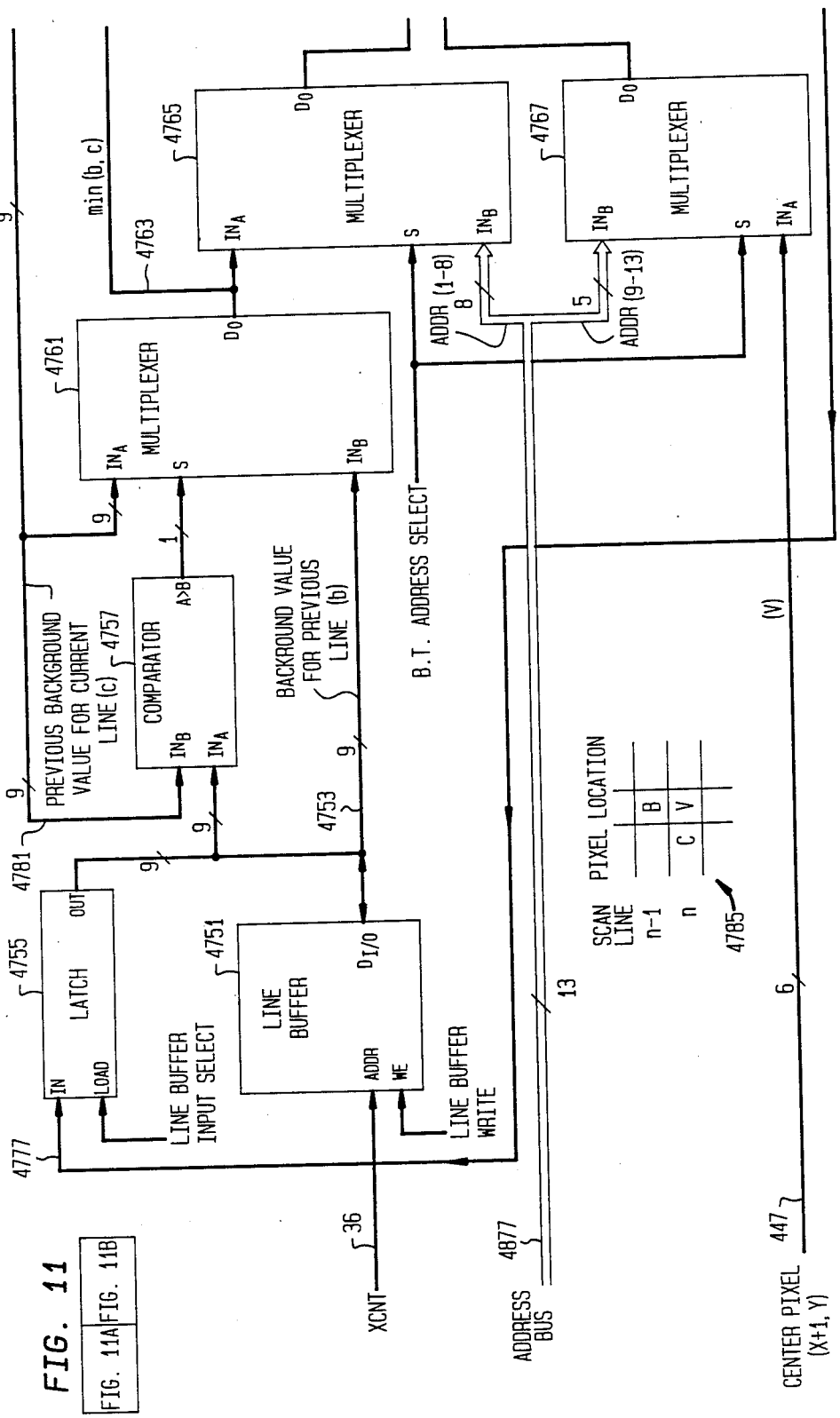

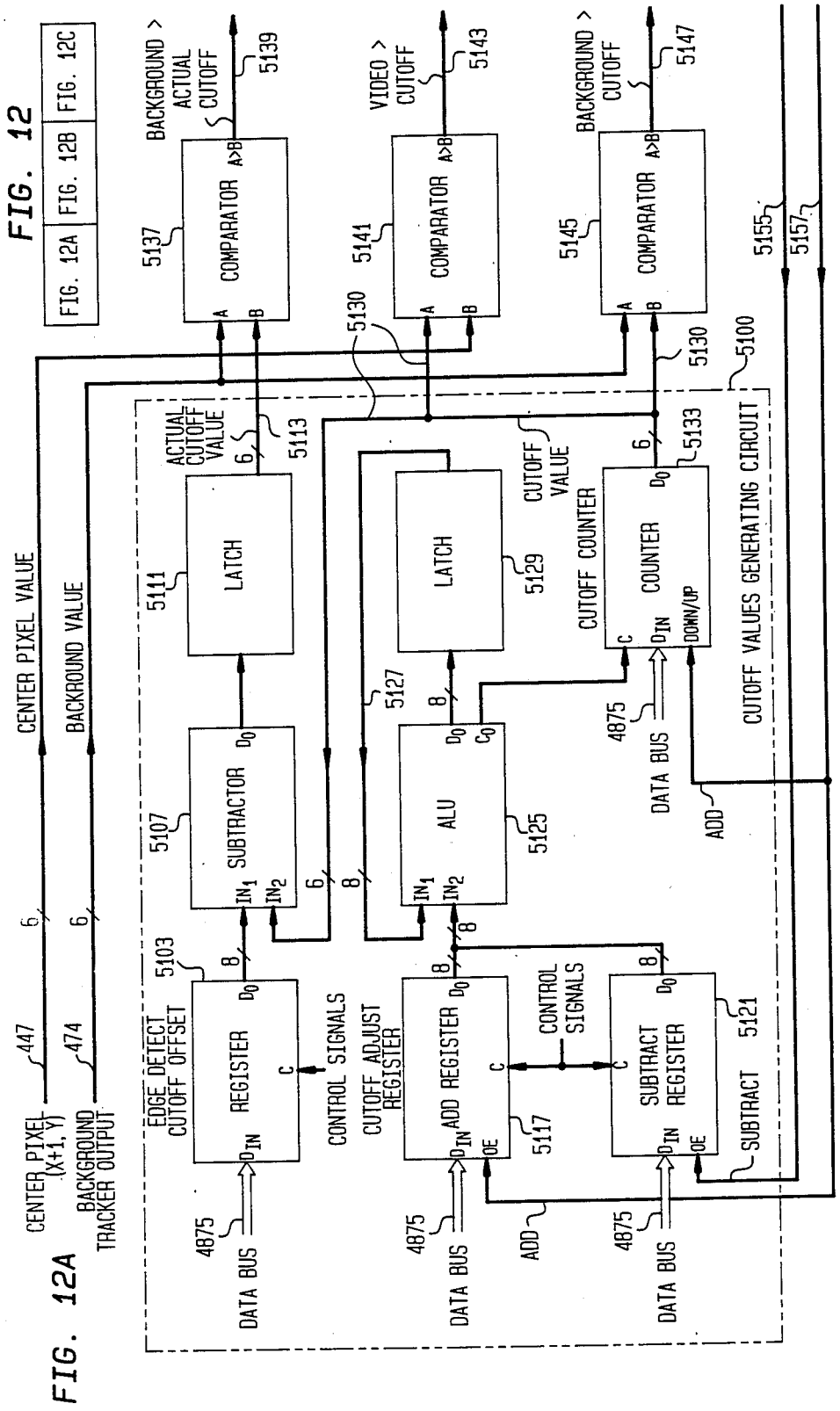

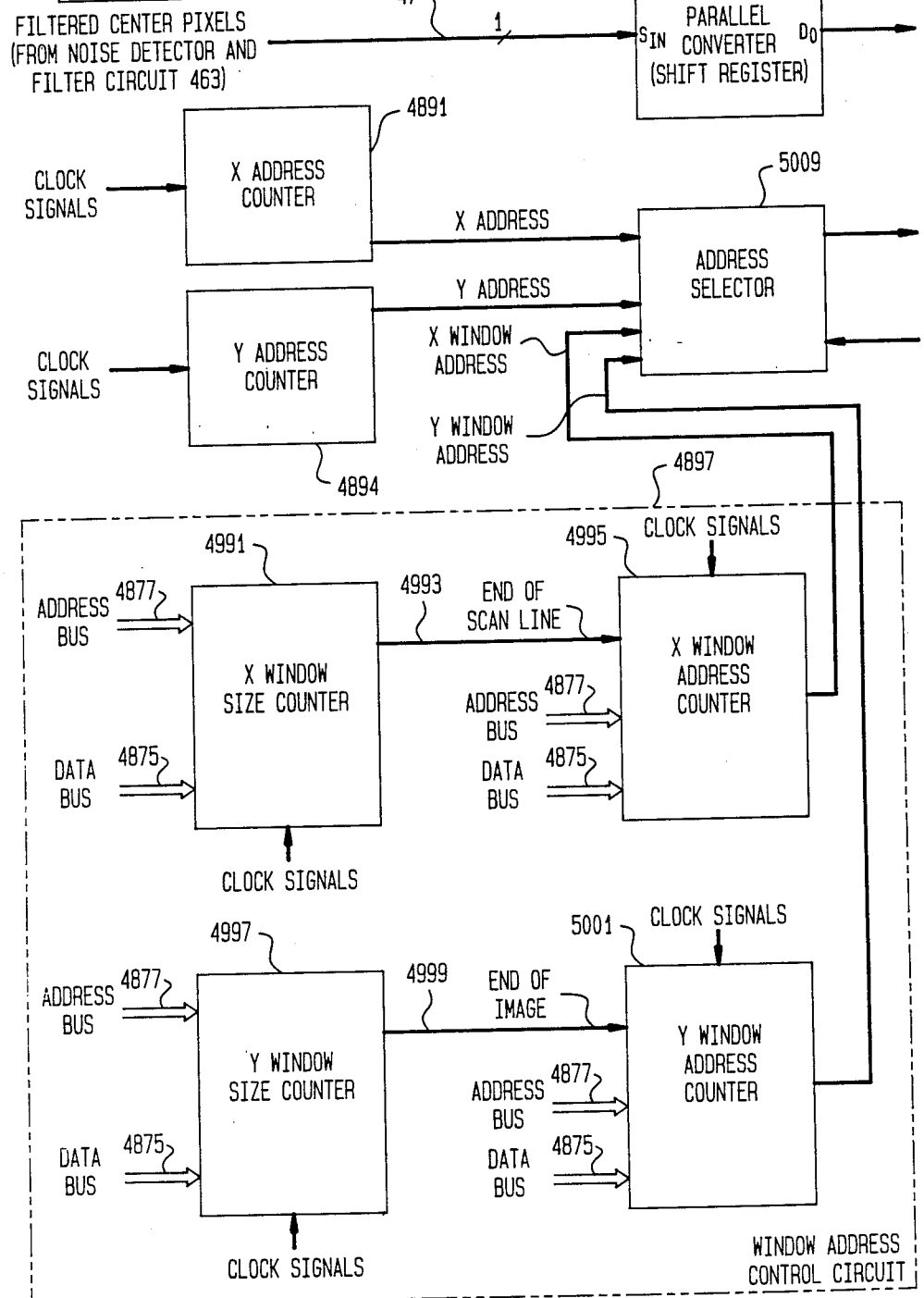

MAIN LOOP
1400

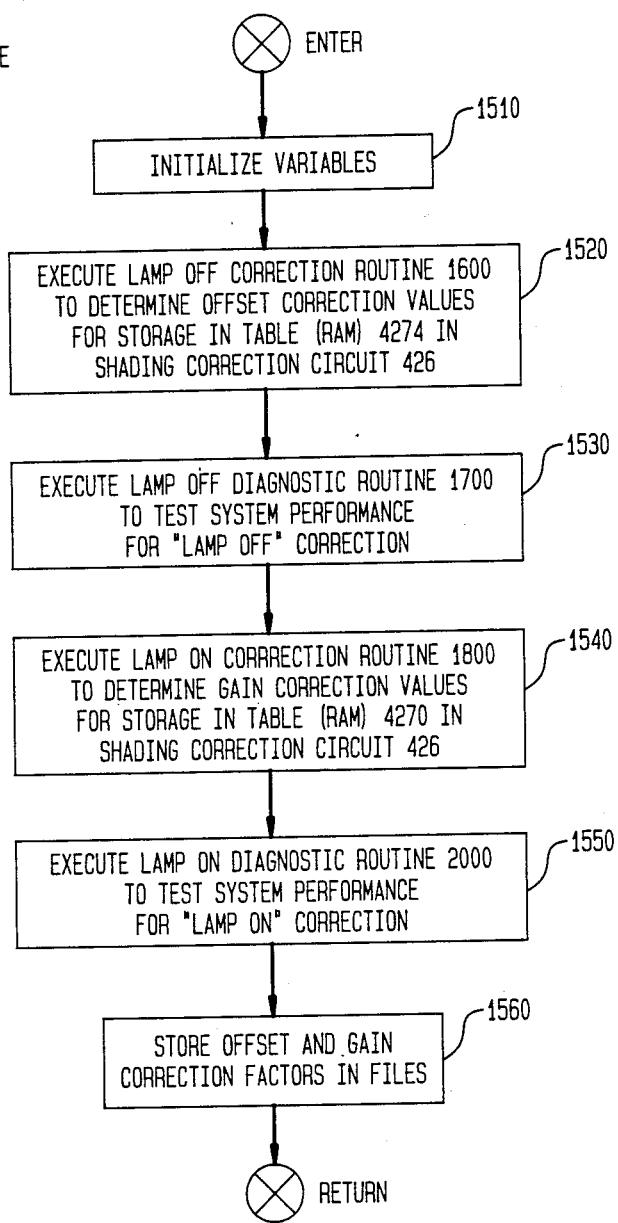

FIG. 16A
LAMP OFF
CORRECTION ROUTINE
1600

FIG. 16

| FIG. 16A |
|----------|
| FIG. 16B |

⊗ ENTER

1610 — SET LAMP ON/OFF SIGNAL ACCORDINGLY TO INSTRUCT LAMP DRIVER 5 TO TURN LAMP 7 OFF

PIXEL COLUMN AVERAGING ROUTINE 1640

1620 — INSTRUCT MICROFILM SCANNER TO SCAN IMAGE, AND STORE RESULTS

1622 — SET LSUM ← 0

1624 — SET PSUM, LINE COUNT AND ALL PIXEL COLUMN SUMS ($PCSUM_0$, $PCSUM_1$, ..., $PCSUM_{2047}$) TO ZERO

1626 — CALCULATE SUM (PSUM) OF PIXELS (P) ON CURRENT SCAN LINE:
PSUM ← PSUM + $P_n$   n=1, 2, ..., 2047

1629 — END OF LINE REACHED?

1631 — NO

1630 — YES

1637 — UPDATE PIXEL COLUMN SUMS ($PCSUM_0$, $PCSUM_1$, ..., $PCSUM_{2047}$) WITH CORRESPONDING PIXELS IN CURRENT LINE ($P_0$, $P_1$, ..., $P_{2047}$):
$PCSUM_0 \leftarrow PCSUM_0 + P_0$
$PCSUM_1 \leftarrow PCSUM_1 + P_1$
⋮
$PCSUM_{2048} \leftarrow PCSUM_{2048} + P_{2047}$

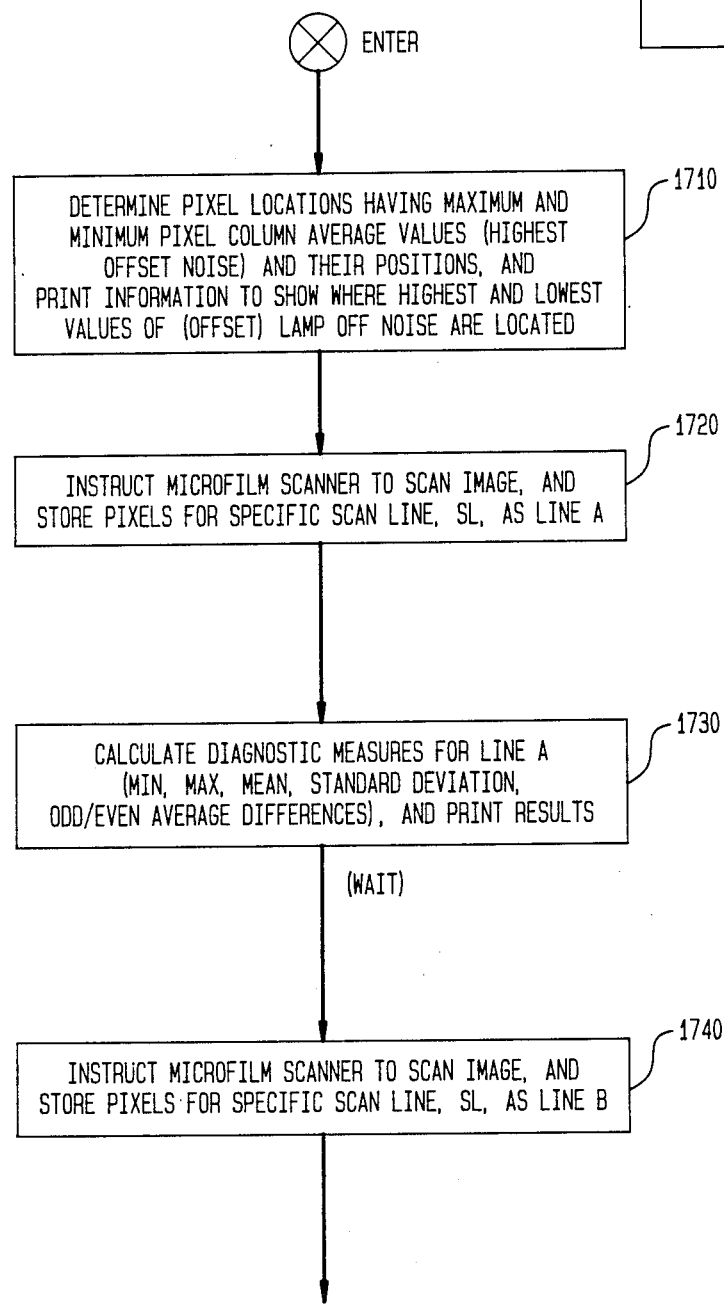

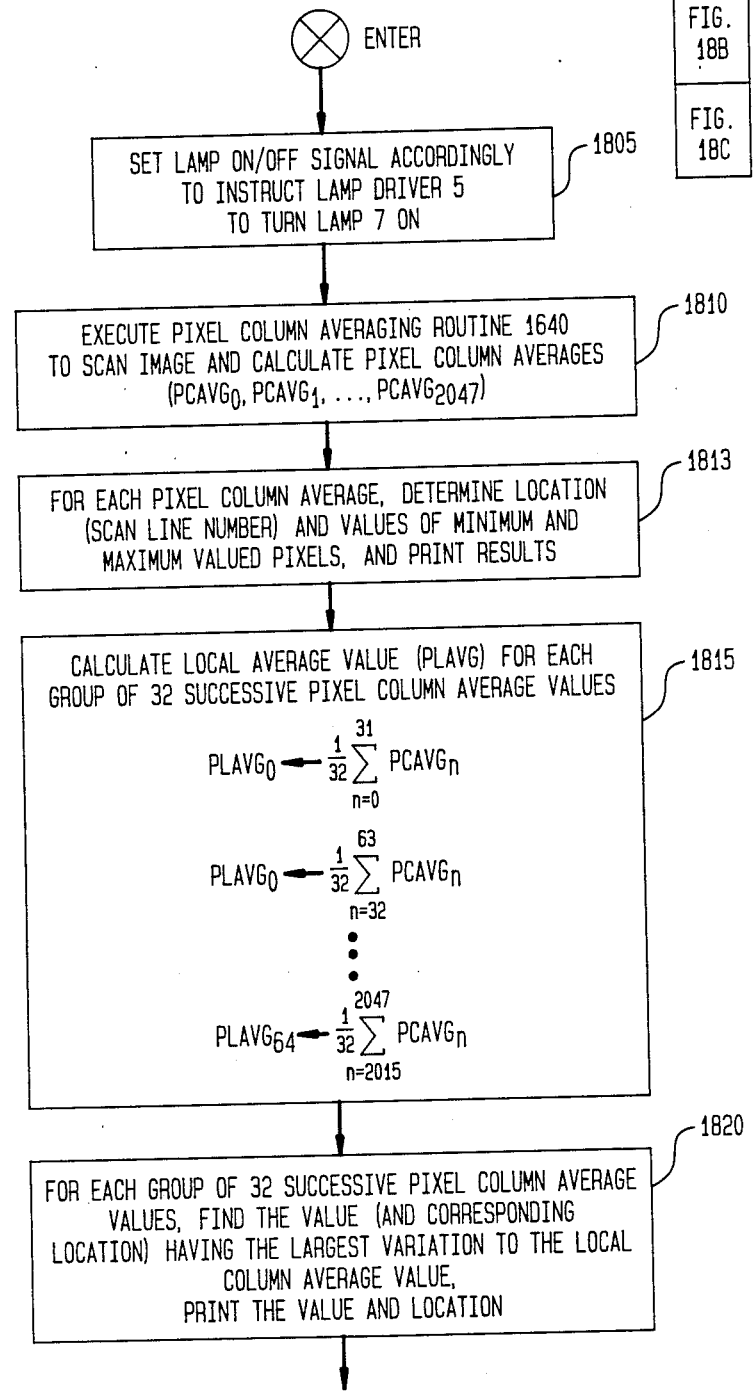

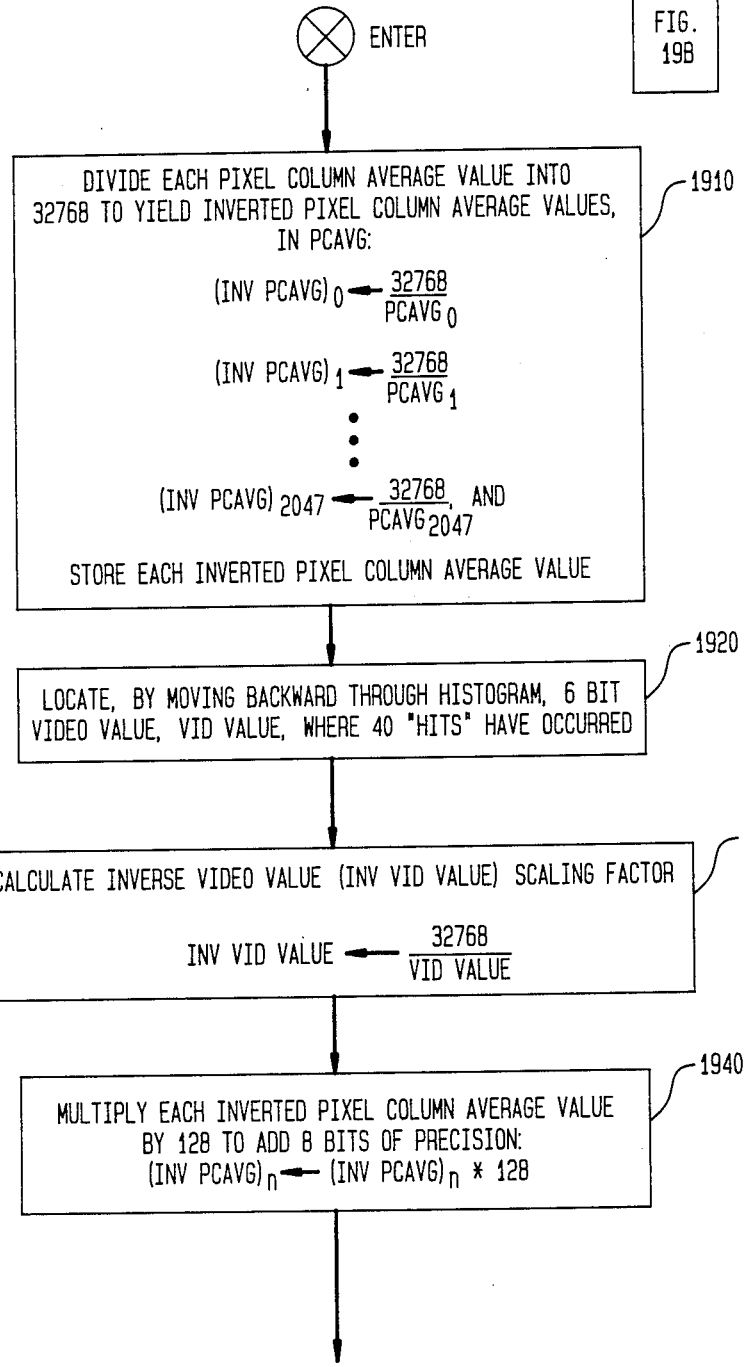

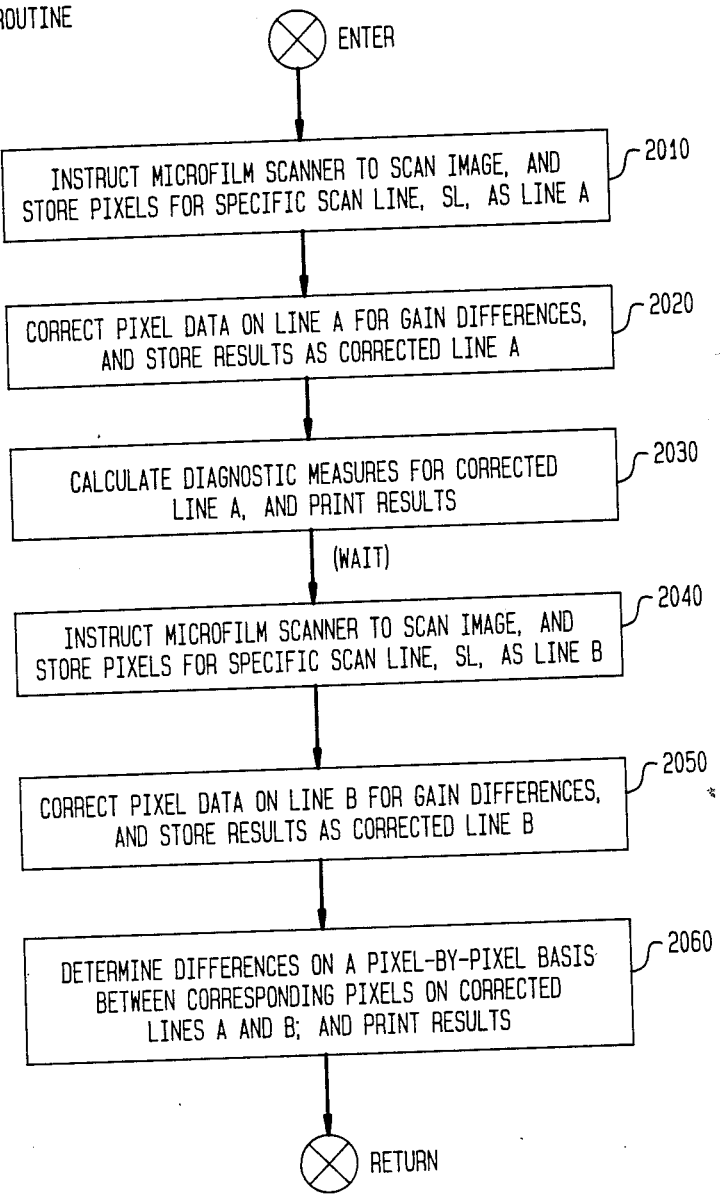

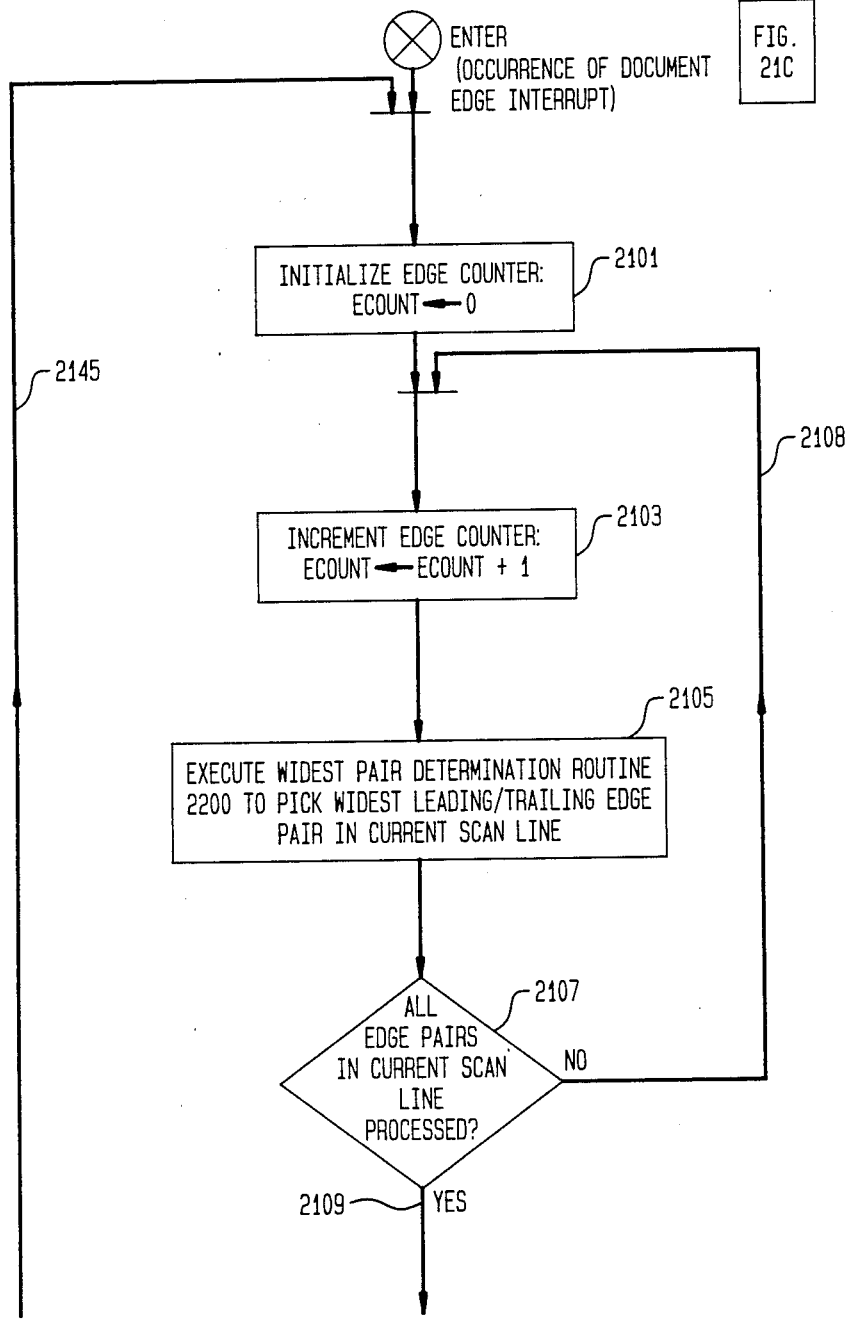

WIDEST PAIR DETERMINATION ROUTINE 2200

FIG. 23A

PRIOR LINE EDGE PAIR SELECTION ROUTINE 2300

FIG. 23

| FIG. 23A |
|---|
| FIG. 23B |
| FIG. 23C |

⊗ ENTER

LEADING EDGE DETERMINATION ROUTINE 2330

- 2302: CLEAR EDGE COUNTER: ECOUNT ← 0
- 2304: SET PRIOR EDGE DIFFERENCE (PEDIFF) TO PRE-DEFINED MAXIMUM VALUE
- 2306: READ LEADING EDGE (ECOUNT) FROM MEMORY
- 2308: CALCULATE DIFFERENCE (EDGE DIFFERENCE) BETWEEN LEADING EDGE (ECOUNT) AND HISTOGRAMED LEADING EDGE LOCATION FOR IMMEDIATELY PRIOR SCAN LINE
- 2311: IS EDGE DIFFERENCE < PEDIFF?
  - NO → 2313
  - YES → 2315: SAVE LEADING EDGE (ECOUNT) AS LEADING EDGE LOCATION FOR CURRENT SCAN LINE
- 2317: SET: PEDIFF ← EDGE DIFFERENCE
- 2319: IS LEADING EDGE (ECOUNT) LAST LEADING EDGE FOR CURRENT SCAN LINE?
  - NO (2322) → 2324: INCREMENT EDGE COUNTER: ECOUNT ← ECOUNT + 1 → (2326) back to 2306
  - YES ↓

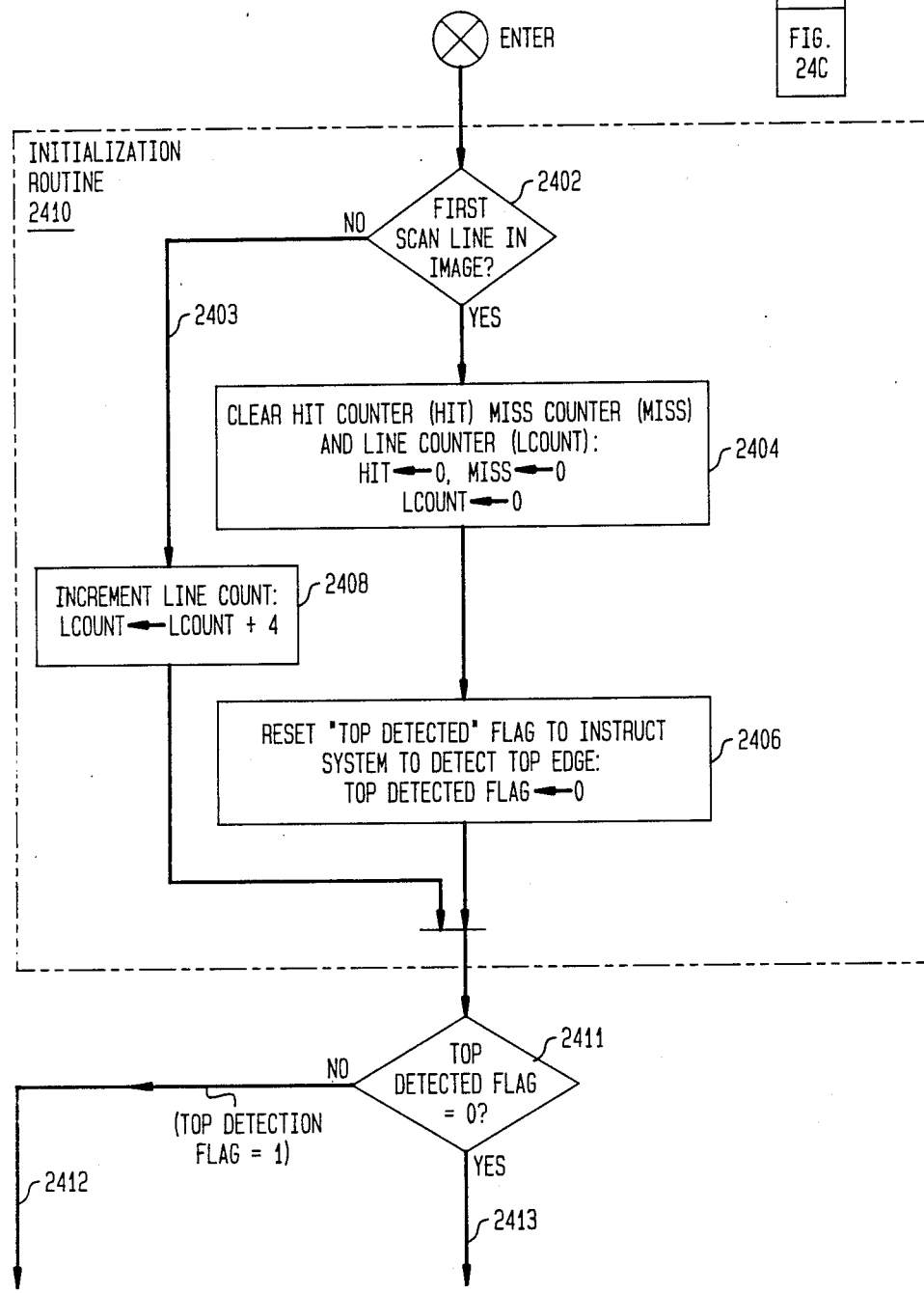

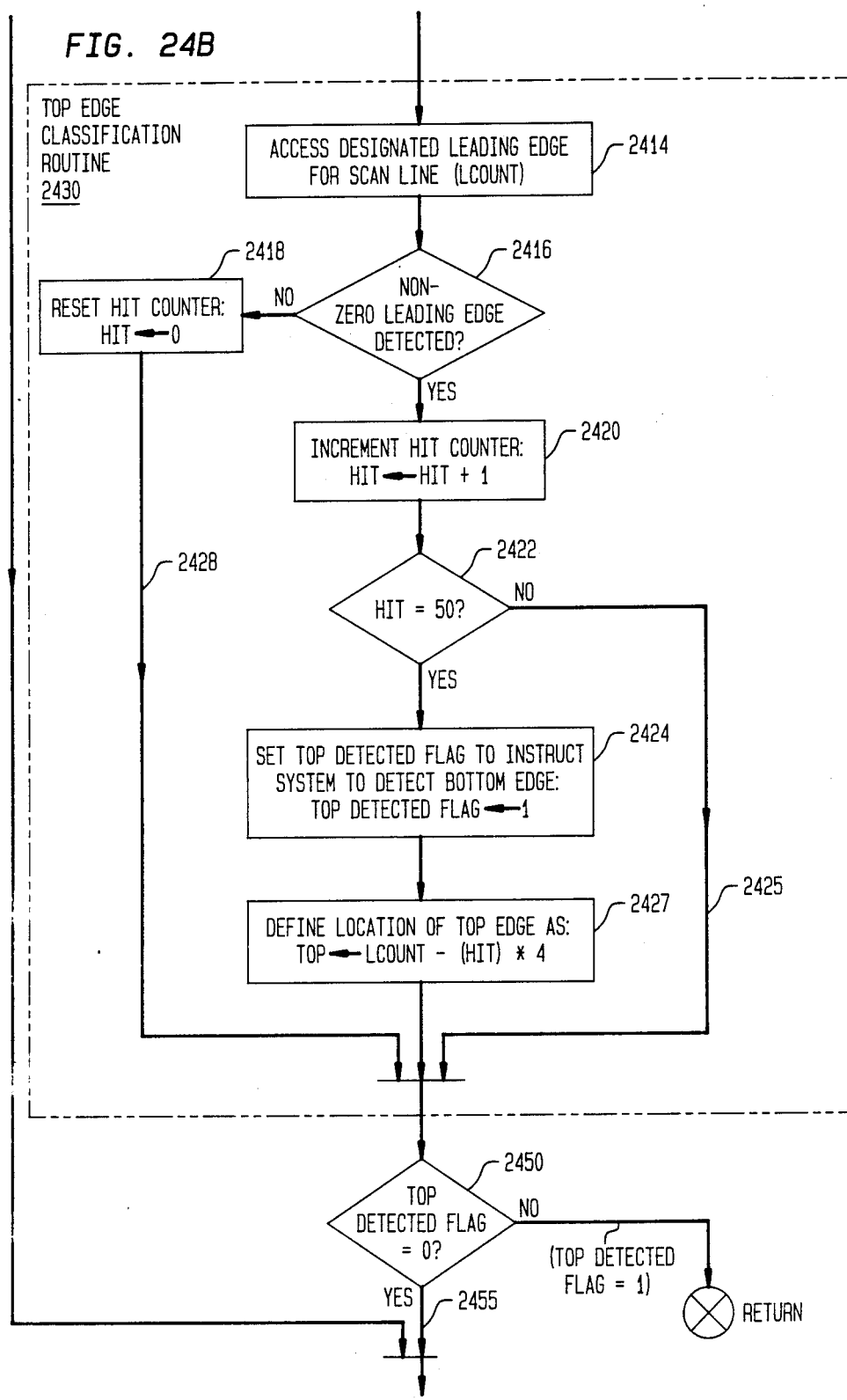

METHOD FOR ADAPTIVELY MASKING OFF A VIDEO WINDOW IN AN OVERSCANNED IMAGE

CROSS-REFERENCE TO RELATED APPLICATIONS

Reference is made herein to commonly-assigned, copending U.S. patent application Ser. No. 077,527, filed concurrently herewith in the names of R. R. A. Morton and J. Redden and entitled APPARATUS AND METHODS FOR LOCATING EDGES AND DOCUMENT BOUNDARIES IN VIDEO SCAN LINES; Ser. No. 077,704, filed concurrently herewith in the name of S. Lewis and entitled METHOD AND APPARATUS FOR DEAVERAGING A STREAM OF AVERAGED DATA; Ser. No. 077,529, filed concurrently herewith in the names of R. R. A. Morton, J. Redden, and S. Lewis and entitled APPARATUS FOR ENHANCING AND THRESHOLDING SCANNED MICROFILM IMAGES AND METHODS FOR USE THEREIN; Ser. No. 077,719, filed concurrently herewith in the names of R. R. A. Morton and J. Redden and entitled APPARATUS AND METHOD FOR IMPROVING THE COMPRESSIBILITY OF DIGITAL VIDEO SIGNALS; and Ser. No. 077,530, filed concurrently herewith in the names of R. R. A. Morton and S. Lewis and entitled FORWARD LOOK AHEAD TECHNIQUES FOR TRACKING BACKGROUND AND NOISE LEVELS IN SCANNED VIDEO IMAGES.

FIELD OF THE INVENTION

The invention relates to a method for adaptively extracting (masking off) a desired video window, such as a scanned document or portion thereof, from an overscanned image stored in a frame buffer.

BACKGROUND OF THE INVENTION

Gray scale images of various documents are often stored on microfilm for subsequent retrieval in order to conserve storage space by advantageously eliminating the need to store bulky originals. Retrieving (accessing) a microfilmed image of a document, on a manual basis, typically requires locating a desired roll of microfilm that houses the desired image, loading the roll into a manual reader and then advancing the microfilm to a desired frame at which the image is located. Thereafter, the image is optically enlarged and displayed on the reader.

Now, to minimize image retrieval time, particularly for archives that store a substantial number of documents, and also to permit the retrieved image to be electronically enhanced and processed, image management systems have been developed in the art. These systems are typified, for example, by the Kodak Image Management System (KIMS) system currently manufactured by the present assignee (KIMS is a trademark of the Eastman Kodak Company). Essentially, the KIMS system first locates the desired microfilm roll and frame through a computerized database inquiry. Then, an automated microfilm reader, i.e. a so-called film library also known as an autoloader, operating under computer control, fetches and then loads the desired roll into the reader. Once this has occurred, the film library automatically advances the roll to the desired frame. Thereafter, the film library electronically scans and digitizes a gray scale microfilm image present at the desired frame, and finally applies the resulting digitized bi-tonal image onto a local area network for storage, display and/or printing.

Within the KIMS system, the microfilm image of a document is scanned one line at a time by a microfilm scanner and specifically by a 2048-by-1 cell charge coupled device (CCD) array located therein. The array is positioned directly over (or in front of) the microfilmed image and is oriented substantially perpendicular to a direction through which the microfilm moves through the reader. A lamp situated below (or behind) the microfilm projects light through the image. As a result, each cell of the CCD array provides an analog signal which is proportional to the intensity of the light that passes through that portion of the scanned area of the microfilm which lies directly below (or behind) that element. The scanned area is generally 25 to 50% larger than the actual image of the document. In this manner, the full image is scanned even if document used to form the image was photographed somewhat off center or tilted and/or if the CCD becomes slightly horizontally mis-aligned with respect to the microfilm. Overscanning is necessary particularly where rotary microfilmers have been used to photograph images onto microfilm. These filmers cause a wide variation in the location and orientation of the photographed document with respect to a standard image area, such that containing image. Now, as each pixel (pel) is scanned, the analog signal corresponding to the intensity of that pixel is converted into a six bit digital signal which itself is subsequently thresholded to provide a single bit binary output signal for that pixel. All the single bit binary values are stored in a frame store memory. Once scanning has been completed, then the contents of the frame store memory which store the scanned image of the document are routed to a video compressor. Thereafter, the compressed bi-tonal image is sent to the local area network for storage, display and/or printing by downstream electronic processing equipment.

Typically, a scanned bi-tonal microfilmed image which appears on the network may be deficient in quality. This deficiency can result primarily from image noise and/or edge discrepancies.

Image noise takes the form of undesirable pixel transitions (i.e. from white to black, or black to white) occurring in the image. Therefore, to improve image quality and increase compressibility, these undesirable pixel transitions must be removed from the image. Image compressibility increases as the number of pixel transitions decreases. However, fine detail, such as small characters, typically spans a relatively small number of pixels. Therefore, as increasingly larger groups of isolated pixels are removed as noise, compressibility rises but fine detail is removed from the image and hence image quality degrades. Consequently, a tradeoff exists between image quality and compressibility in determining the size of isolated pixel groups that are to be removed, as noise, during a process of image enhancement.

To achieve a good compromise between image quality and compressibility, image noise is typically viewed as being a single isolated "on" (black) pixel occurring anywhere in the image. Any larger sized pixel groups are viewed as desirable detail which are to be left in the image. Image noise typically originates from any one of three sources: so-called paper noise existing in the document itself that has been microfilmed, so-called film noise caused by the grain size in the microfilm medium and electronic noise generated by the electronic scanning system.

Now, to properly threshold an image in order to remove image noise, a threshold level must intersect video pulses that form textual characters, in the scanned image, at a point that occurs above a pre-defined noise amplitude but below the peak amplitudes of these pulses. One technique for sensing the proper noise amplitude is to observe the occurrence of single isolated pixels that occur throughout the scanned image. Specifically, in the KIMS system, a microfilm image is scanned at a typical density of 200 pixels to the inch (approximately 79 pixel/cm). Noise generally takes the form of an isolated pixel of one color, i.e. black, surrounded by pixels of another color, i.e. white. A pixel of this size is simply not readily visible to an average reader. As such, a single isolated pixel does not form any part of a textual character but is instead noise. Single pixel noise can be one-dimensionally isolated wherein a single pixel is "on" while its neighbors to its left and right are both "off", or two-dimensionally isolated wherein the single pixel is "on" while its neighbors to the left, right, above and below and possibly also those which are diagonally oriented to the single pixel are all "off".

Ideally, then, one could set the threshold level to an appropriate level to filter out single pixel noise from the six bit digitized video. Unfortunately, in practice, single pixel noise can occur at various intensity levels throughout the full range of video amplitude in the scanned image thereby significantly complicating the process of thresholding. Specifically, first, single pixel noise can occur on the peaks of the video signal which correspond to detected pixels that form a textual character that appears on a background having the highest contrast, e.g. those pixels that form a black character on a white background. If the threshold were to be set to this level, then disadvantageously any character that is situated on a background having a reduced contrast, e.g. a gray character on a white background, would be entirely removed from the image. Specifically, the pixels which form these characters would not possess as high a peak amplitude value as those which form characters situated on the highest contrasting background and hence would be removed by the thresholding operation. Consequently, thresholding at this level would produce erroneous pixel patterns and hence incorrect text. Second, single pixel noise can also occur just above the level of the background video. The background level in the video signal corresponds to the proper background level of the scanned image. Single pixel noise which occurs here accurately indicates noise amplitude in the scanned image. Hence, setting a threshold value slightly above the background level will result in accurate thresholding of image noise. Third, single pixel noise can occur below the background level of the video signal. If this were to be used as a threshold value, then an excessive amount of noise would remain in the image and hence adversely affect image compressibility.

Now, since the background level may vary significantly across any line in the scanned image, the threshold level must track the background level and be dynamically maintained at a value slightly greater than the background level.

Edge discrepancies, the second primary cause of image quality degradation, often occur whenever an image is drastically reduced in size, such as through microfilming, which, by its very nature, eliminates a great deal of information from an original image. In particular, microfilm possesses a finite resolution, as does all photographic media, which tends to limit the size of the detail that can be photographed on the microfilm. If fine detail exists in a document and is reduced to a size which is smaller than this resolution, then this detail will be blurred in the microfilmed image and hence will appear blurred in any image that results from scanning the microfilmed image. Consequently, image edges in a scanned microfilmed image may often appear ragged and/or blurred instead of straight. Therefore, to improve image quality, all image edges should be sharpened during image enhancement.

Therefore, an overall need exists in the art for a system that enhances the quality of a multi-bit scanned image, particularly one resulting from a scanned microfilmed image and then accurately thresholds each pixel in the bi-tonal image into a single bit binary value. This system would enhance the image by both removing image noise therefrom and sharpening the edges of the image. Such a system would advantageously find particular use in improving the quality of images generated by an an image management system.

As noted above, document and/or scanner misalignment necessitates that every document be overscanned by as much as 25–50% in order to ensure that each document has, in fact, been completely scanned. Unfortunately, by scanning beyond the boundaries of any given document, overscanning generates a considerable amount of extraneous pixel information. Now, if this information were to be transmitted, even in a compressed state, over the local area network, transmission time and network bandwidth would be wasted. Moreover, additional time would be needlessly consumed by downstream equipment situated on the network in order to handle this information.

One technique which can be used to reduce the amount of extraneous pixels to be transmitted is to detect left and right edges (boundaries) of the document in the scanned image and transmit only those pixels that exist on and between these edges. Unfortunately, since documents are often photographed off center or tilted, the locations of the edges may vary with every scan line. This necessitates that the horizontal beginning and ending pixel addresses which are provided to a frame buffer must be updated prior to accessing each scan line, associated with the document, from the frame buffer. Unfortunately, this updating imparts additional operating delay and complexity to the process of reading the values of those pixels in the frame buffer that forms the document and hence slows the response of the entire image management system.

Therefore, a specific need also exists in the art for apparatus, that is capable of extracting (masking off) those pixel values associated with a scanned document that exists within a scanned image stored within frame buffer, which is relatively simple to implement and which does not require excessive time to operate. The present invention addresses this specific need. Now, by satisfying this specific need, the inventive circuit advantageously facilitates meeting the overall need through use of the image enhancement system disclosed herein.

SUMMARY OF THE INVENTION

Accordingly, it is an object of the present invention to provide apparatus for extracting (masking off) pixel values associated with a scanned document that exists within a scanned image stored within a frame buffer.

A specific object is to provide such apparatus that does not consume excessive time to operate.

Another specific object is to provide such apparatus which is suitable for use within an image management system for extracting an image of a scanned document from an overscanned microfilm image.

Another specific object is to provide such apparatus which is relatively simple to implement and operate.

These and other objects are accomplished in accordance with the teachings of the present invention by a method which extracts (masking off) a desired video window, such as that which forms a scanned image of a document or a portion thereof, from a overscanned image stored in a frame buffer. Specifically, this method first determines horizontal pixel locations for left and right edges of the document for each of a plurality of scan lines located within said scanned image. Then, histograms of the left and right edge locations are fabricated. Once this has occurred, the positions of top and bottom edges of an escribing rectangle is found. The escribing rectangle is a rectangular area, located within the frame buffer, which includes the entire document. Now, with the top and bottom edge locations known, the inventive method locates the right and left edge locations of the escribing rectangle by suitably analyzing the histogram results. Next, memory address corresponding to the first pixel location in the escribing rectangle and the vertical and horizontal size of the rectangle are determined, using all the edge locations of the escribing rectangle, and then applied as input to addressing circuitry located within the frame buffer. Once this occurs, then all (or a portion of) the pixel values stored within the frame buffer and located on and within the escribing rectangle are successively accessed and routed to an output connection as being those pixel values that form the image, or a selected portion thereof, of the document.

BRIEF DESCRIPTION OF THE DRAWING

The teachings of the present invention may be readily understood by considering the following detailed description in conjunction with the accompanying drawing, in which:

FIGS. 2A and 2B collectively depict a block diagram of Image Processing Circuit 40 shown in FIG. 1;

FIG. 5 depicts the correct alignment of the drawing sheets for FIGS. 5A and 5B;

FIGS. 5A and 5B collectively depict a block diagram of 5-by-5 Convolution Circuit 445 which also forms part of Image Processing Circuit 40 shown in FIGS. 2A and 2B;

FIG. 10 depicts the correct alignment of the drawing sheets for FIGS. 10A and 10B;

FIGS. 10A and 10B collectively depict a block diagram of Noise Tracker 467 which also forms part of Image Processing Circuit 40 shown in FIGS. 2A and 2B;

FIG. 11 depicts the correct alignment of the drawing sheets for FIGS. 11A and 11B;

FIGS. 11A and 11B collectively depict a block diagram of Background Tracker 475 which also forms part of Image Processing Circuit 40 shown in FIGS. 2A and 2B;

FIG. 12 depicts the correct alignment of the drawing sheets for FIGS. 12A-12C;

FIGS. 12A-12C collectively depict a block diagram of Document Edge Detection Circuit 481 which also forms part of Image Processing Circuit 40 shown in FIGS. 2A and 2B;

FIG. 13 depicts the correct alignment of the drawing sheets for FIGS. 13A and 13B;

FIGS. 13A-13D collectively depict a block diagram of Windowing Frame Buffer 489 which also forms part of Image Processing Circuit 40 shown in FIGS. 2A and 2B;

FIG. 15 depicts a flowchart of Calibration Routine 1500 that is executed as part of Main Loop 1400 shown in FIG. 14;

FIG. 16 depicts the correct alignment of the drawing sheets for FIGS. 16A and 16B;

FIGS. 16A and 16B collectively depict a flowchart of Lamp Off Correction Routine 1600 that is executed as part of Calibration Routine 1500 shown in FIG. 15;

FIG. 17 depicts the correct alignment of the drawing sheets for FIGS. 17A and 17B;

FIGS. 17A and 17B collectively depict a flowchart of Lamp Off Diagnostic Routine 1700 that is also executed as part of Calibration Routine 1500 shown in FIG. 15;

FIG. 18 depicts the correct alignment of the drawing sheets for FIGS. 18A-18C;

FIGS. 18A-18C collectively depict a flowchart of Lamp On Correction Routine 1800 that is also executed as part of Calibration Routine 1500 shown in FIG. 15;

FIG. 19 depicts the correct alignment of the drawing sheets for FIGS. 19A-19B;

FIGS. 19A and 19B collectively depict a flowchart of Invert and Scale Routine 1900 that is executed as part of Lamp On Correction Routine 1800 shown in FIGS. 18A-18C;

FIG. 20 depicts a flowchart of Lamp On Diagnostic Routine 2000 that is also executed as part of Calibration Routine 1500 shown in FIG. 15;

FIG. 21 depicts the correct alignment of the drawing sheets for FIGS. 21A-21C;

FIGS. 21A-21C collectively depict a flowchart of Document Edge Detection Routine 2100 that is executed as part of Main Loop 1400 shown in FIG. 14;

FIG. 23 depicts the correct alignment of the drawing sheets for FIGS. 23A-23C;

FIGS. 23A-23C collectively depict a flowchart of Prior Line Edge Pair Selection Routine 2300 that is also executed as part of Document Edge Detection Routine 2100 shown in FIGS. 21A-21C;

FIG. 24 depicts the correct alignment of the drawing sheets for FIGS. 24A-24C; and FIGS. 24A-24C collectively depict a flowchart of Top/Bottom Routine 2400 that is also executed as part of Document Edge Detection Routine 2100 shown in FIGS. 21A-21C.

To facilitate understanding, identical reference numerals have been used to denote identical elements that are common to various figures.

DETAILED DESCRIPTION

After reading the following description, those skilled in the art will readily appreciate that the inventive image enhancement and thresholding system can be used in a wide variety of applications for electronically enhancing and thresholding a scanned gray scale image. For example, one such illustrative application might include enhancing and thresholding a scanned image of a document for subsequent transmission of that image by facsimile. Now, inasmuch as the inventive system is particularly suited for use in an image management system for enhancing and thresholding scanned bi-tonal microfilm images and more specifically, for example, in the Kodak Image Management System (KIMS) system (KIMS is a trademark of Eastman Kodak Company), it will be discussed in that context.

A. Overall System Description

Figure 1:
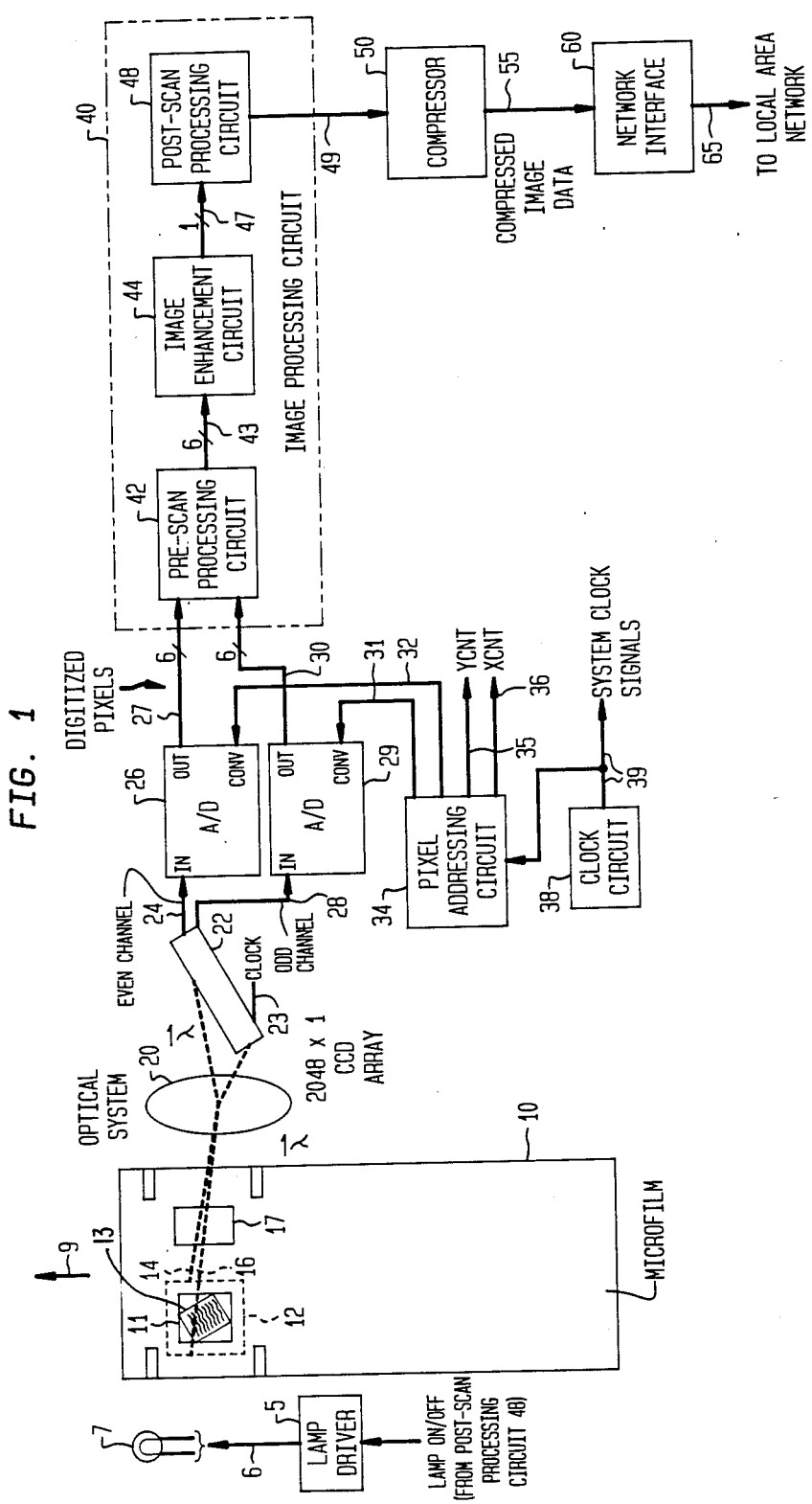
FIG. 1 depicts a block diagram of an embodiment of a microfilm scanning and image enhancement system constructed in accordance with the teachings of the present invention.

A block diagram of one embodiment of a microfilm scanning and image enhancement system, which is constructed in accordance with the teachings of the present invention, for use in, for example, the KIMS system is depicted in FIG. 1. In essence, the inventive system enhances a scanned multi-bit gray scale microfilm image to substantially remove image noise therefrom and sharpen image edges therein, and then thresholds the enhanced image into single bit binary video for subsequent image compression. The inventive system advantageously forms part of an automated microfilm reader commonly known as a film library (previously known as an autoloader) which forms part of a KIMS instrument. Image enhancement, including noise removal and edge sharpening, is provided by Image Processing Circuit 40 which receives scanned pixel information from the scanned microfilm. The output of circuit 40 is routed, via lead 49, to compressor 50 for video compression prior to being transmitted, via network interface 60 and lead 65, over a local area network that forms part of the KIMS system.

The film library contains an automated computer-controlled mechanism which fetches a desired roll of microfilm, loads that roll into an automated microfilm reader located within the film library and then, using the reader, advances the film to a frame at which a microfilm image of a document that is to be scanned is located. Since none of the mechanical film handling equipment located within the film library forms part of the invention or needs to be explained in order to fully understand the invention, this equipment has been completely omitted from the drawing. Since only a rudimentary understanding of the microfilm scanning equipment used in the reader is necessary to fully understand and appreciate the invention, this equipment is shown in simplified form.

Microfilm 10, as shown, generally contains two adjacent stored images, such as images 11 and 17, positioned across its width. Each image is typically 1/40th of the size of its associated original document. A microfilm image, such as image 11, is scanned one line at a time by a microfilm scanner and specifically by 2048-by-1 cell charge coupled device (CCD) array 22 located therein. The array is positioned in front of the microfilmed image and is perpendicularly oriented to the direction through which the microfilm moves. Lamp 7, situated behind microfilm 10, projects light through the film which, in turn, enters optical system 20. The optical system ensures that light for only one horizontal scanning line, typically that lying between rays 14 and 16 inclusive, reaches CCD array 22. In practice, optical system 20 is set to overscan each horizontal scanning line that constitutes image 11 by approximately 50%. By doing so, the full image will be scanned even if document 13 used to form image 11 was photographed somewhat off center or tilted (as shown in FIG. 1) and/or if the CCD becomes slightly horizontally misaligned with respect to the microfilm. Overscanning is necessary particularly where rotary microfilmers have been used to photograph images onto microfilm 10. These filmers cause a wide variation in the location and orientation of the photographed document, such as document 13, with respect to a standard image area, such as that containing image 11. Specifically, the area scanned by CCD array 22 for image 11 is illustratively defined by dotted line box 12. As a result, each cell of the CCD array provides an analog output which is proportional to the intensity of the light that passes through a portion of scanned area 12 and which is focused onto that cell. Each CCD cell provides a single pixel in a scanned line. Once the current line has been scanned, the film transport mechanism (not shown) in the film library vertically advances the film in the direction of arrow 9 to appropriately bring the next image of a document into a proper starting position behind optical system 20. Once this occurs, CCD array 22 moves vertically through the image one scan line at a time. Lamp 7 is appropriately energized, via lamp driver 5 and lead 6, through a "Lamp On/Off" control signal provided by a microcomputer system (discussed in detail below) that forms part of post scan processing circuit 48 situated within image processing circuit 40.

CCD array 22 typically consists of two interlaced groups of 1024 serially connected CCD cells: one group for the odd pixels and the other group for the even pixels. Under control of appropriate clocking signals applied, via lead 23, to the CCD array, a stream of sequential pixels for both the even and odd channels are simultaneously shifted out of the array on leads 24 and 28 for the even and odd pixels, respectively, for each scanned line in scanned area 12. Each channel of pixel information is then converted by a respective analog-to-digital (A/D) converter. Specifically, A/D converter 26 receives even channel pixel information over lead 24 emanating from CCD array 22 and, under control of appropriate "convert" control pulses appearing on lead 32, provides six-bit digital equivalent pixel values on leads 27. Likewise, A/D converter 29 receives odd channel pixel information over lead 28 emanating from CCD array 22 and, under control of appropriate convert pulses appearing on lead 31, provides six-bit digital equivalent pixel values on leads 30. The convert pulses are provided by pixel addressing circuit 34. This circuit also generates the (x,y) address of the current pixel in the image that is being scanned. This address consists of vertical (y) pixel address, YCNT (y count), appearing on leads 35 and horizontal (x) pixel address, XCNT (x count), appearing on leads 36. System clock pulses are provided by clock circuit 38 and appear on lead 39.

Image processing circuit 40 performs image enhancement, noise removal and document edge detection. Specifically, within circuit 40, incoming digitized pixel values are routed via leads 27 and 30 to pre-scan processing circuit 42. This circuit first corrects the scanned image for differences in pixel-to-pixel shading resulting from different levels of illumination as well as differences in response between individual cells of the CCD array. Thereafter, the scanned image pixels are compensated, through so-called gamma correction, for differences arising among different types of microfilm, such as for example silver positive, silver negative, diazo and vessicular. After pre-scan processing has been completed, corrected scanned pixels are routed over leads 43 to image enhancement circuit 44 which enhances the scanned image and substantially removes single pixel noise therefrom. The resulting pixels are applied over leads 47 to post scan processing circuit 48 which detects top, bottom, left and right edges of escribing rectangle 11 located within scanned image area 12. The escribing rectangle is defined to be approximately the smallest rectangle, oriented parallel with the microfilm direction (i.e. the direction the microfilm moves), that completely contains scanned document 13. Now, since, overscanning produces a great deal of extraneous pixel information, i.e. values for pixels located within scanned image area 12 but outside escribing rectangle 11, post scan processing circuit 48 routes only those enhanced values for the scanned pixels situated on and within escribing rectangle 11 to compressor 50.

Figure 2A:
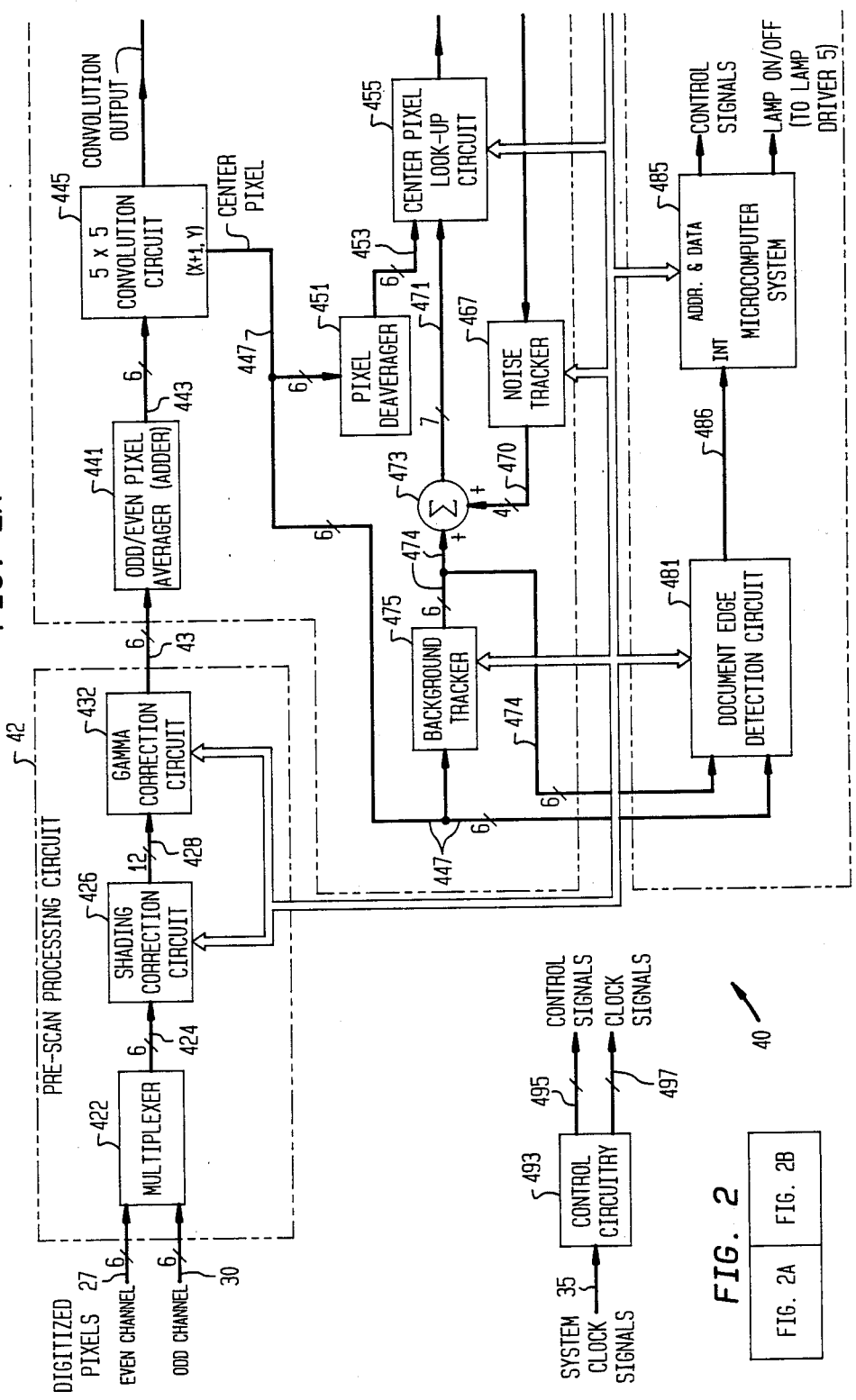
Figure 2:
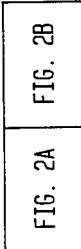
FIG. 2 depicts the correct alignment of the drawing sheets for FIGS. 2A and 2B.

A block diagram of image processing circuit 40 shown in FIG. 1 appears in FIGS. 2A and 2B, for which the correct alignment of the drawing sheets for these figures is shown in FIG. 2. As discussed, image processing circuit 40 consists of pre-scan processing circuit 42, image enhancement circuit 44 and post-scan processing circuit 48. Inasmuch as pre-scan processing circuit 42 and image enhancement circuit 44 both provide image processing through specialized hardware, and post-scan processing circuit 48 utilizes both specialized hardware and software, a detailed discussion of the hardware utilized in all three circuits will now be presented followed by a discussion of the software utilized in post-scan processing circuit 48 and specifically by microcomputer system 485.

B. Image Processing Hardware

Now, as shown, within image processing circuit 40, incoming six-bit even and odd pixel values are applied over leads 27 and 30, respectively, to pre-scan processing circuit 42. Within circuit 42, these incoming pixels are routed to multiplexer 422. Under control of various clock and control signals, multiplexer 422 successively routes incoming pixels on an alternating basis from even channel leads 27 and odd channel leads 30 to leads 424. The control signals for multiplexer 422, as well as for the remaining circuitry that forms image processing circuit 40, are generated by control circuitry 493 in response to system clock signals appearing over lead 35. Circuitry 493 produces various control and clock signals over leads 495 and 497, respectively. To simplify the drawing, only those control and clock signals that are needed to understand the following description have been specifically shown in the figures. Additional clock and control signals will be needed to implement the inventive circuit, with the specific signals used being governed by the specific implementation. However, these signals and their interconnection to the circuitry would be readily apparent to those skilled in the art from the following description and for that reason have been omitted from the drawing.

The pixels appearing over leads 424 and produced by multiplexer 422 are applied to shading correction circuit 426. This circuit, described in detail in conjunction with FIG. 3, corrects the value of each incoming pixel by adding a pre-determined offset correction factor to each pixel and then multiplying the result by a pre-determined gain correction factor. The offset and gain factors vary across the scanned line and correct for optical shading and uneven CCD pixel performance that appear in the output of the CCD array. The values of the correction factors are determined during a calibration process which will be discussed in detail below in conjunction with FIG. 15, wherein offset factors are obtained using a test scan with lamp 7 (see FIG. 1) off while gain factors are obtained during a test scan with the lamp on. The shading corrected pixel values are routed over leads 428 to gamma correction circuit 432. This circuit, discussed in detail in conjunction with FIG. 4, compensates each incoming six-bit pixel value for differences in transfer characteristics occurring among different types of microfilm that can be used in an image retrieval system. The different film types illustratively include silver positive, silver negative, diazo and vessicular. These characteristics generally include intensity rolloff distance, film rise distance, and the like. Consequently, gamma correction can be advantageously used to tailor the response curve (illumination vs. intensity) of any one of several pre-defined film types to a single curve best suited as input to image enhancement circuit 44. Moreover, gamma correction can be used to invert incoming pixel values and thereby convert from a positive to a negative image. Inasmuch as the noise removal algorithms utilized in image enhancement circuit 44 are designed to function with negative images, gamma correction can be used to provide optimum results with negative images by providing a positive to negative image conversion prior to noise filtering.

Random access (RAM) memories located within shading correction circuit 426 and gamma correction circuit 432 store tables of appropriate correction factors. These memories are loaded through address and data busses 487 during the calibration process by microcomputer system 485, situated within post-scan processing circuit 48. The specific manner in which the RAMs are loaded will be discussed in detail in conjunction with shading correction circuit 426 shown in FIG. 3. In addition, RAM memories, which are used to store pre-defined data tables, are also situated within background tracker 475, noise tracker 467, center pixel lookup circuit 455 and noise detector and filter circuit 463 all located within image enhancement circuit 44. All these RAMs are also appropriately loaded with data during the calibration process, via address and data busses 487, by microcomputer system 485.

The corrected pixels produced by gamma correction circuit 432 are routed over leads 43 to image enhancement circuit 44. This circuit, as discussed, filters single pixel noise from the scanned image and appropriately thresholds each six-bit pixel value into a single bit bitonal value for subsequent storage within a frame store memory.

In essence, image enhancement circuit 44 fenhances the scanned image and also reduces the noise content of each pixel (thereby increasing its signal-to-noise ratio) contained therein. First, image enhancement circuit 44 enhances image edges by convolving a 5-by-5 window of scanned pixel values, with the current scanned pixel value located at the center of the window, with a 5-by-5 array of pre-defined coefficients to emphasize the high frequency content in the image. The value of the pixel produced by the convolution, specifically a convolved pixel produced on leads 450 by convolution circuit 445, forms one input to a thresholding circuit, specifically center pixel threshold comparator 459. It is this comparator which converts each multi-bit (convolved) pixel value into a corresponding single bit binary value (the center pixel comparator output). Specifically, a multi-bit convolved pixel, which appears on leads 450, is compared against a multi-bit binary value that appears on leads 457.

Advantageously, both the noise and background levels are determined for each pixel rather than for each scan line as is commonly done in the art. In this manner, the values for background and noise content, and hence the multi-bit threshold level appearing on leads 457, respond much more rapidly to local variations than in filtering systems known in the art and thereby permit more accurate thresholding than that which has been heretofore utilized in the art.

Figure 11B:
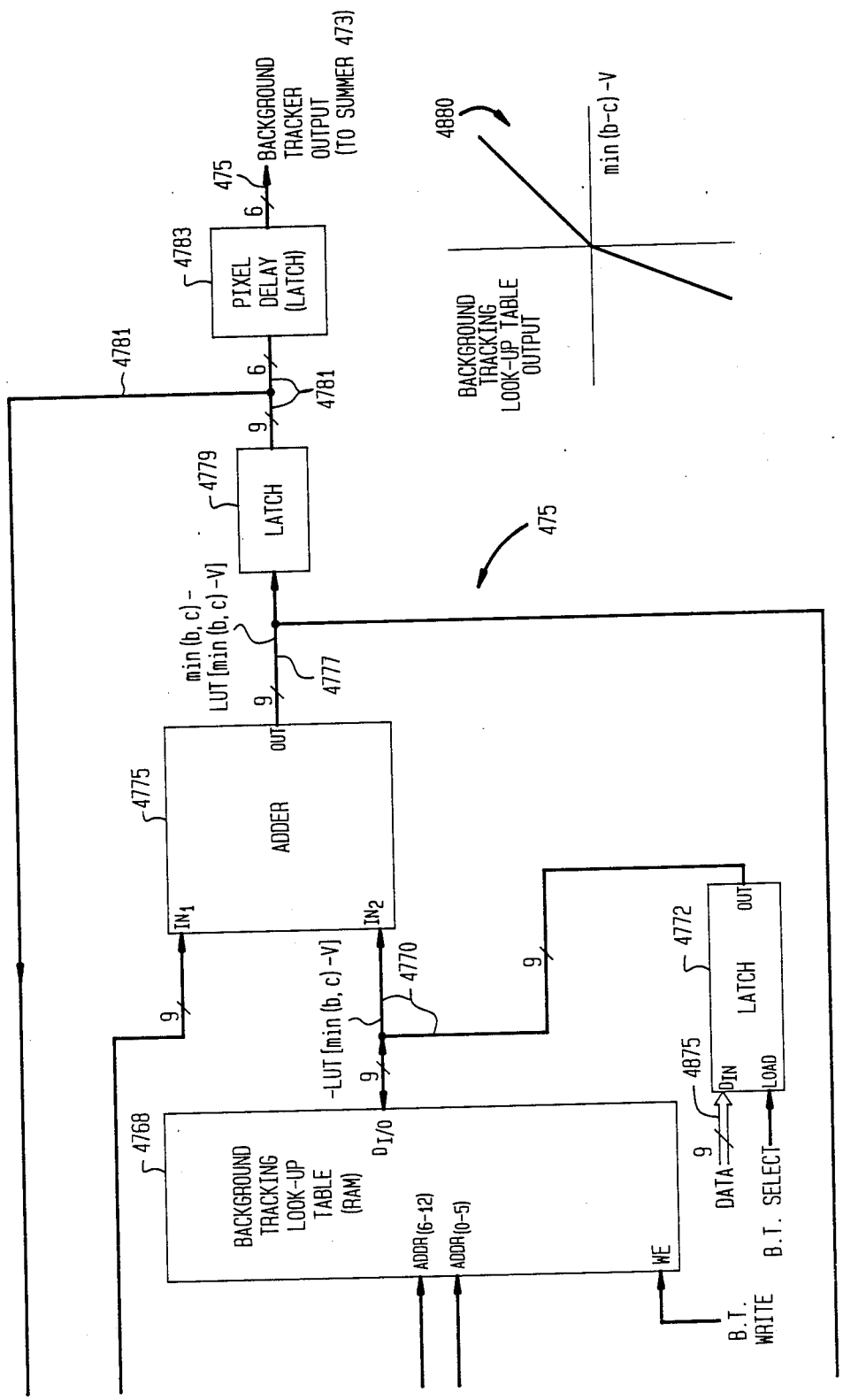

Specifically, the other input to comparator 459, which appears on leads 457 and varies with the noise and background level, is a pre-defined value provided by center pixel look-up circuit 455. This circuit stores pre-defined pixel values which are used in thresholding the value of each pixel which forms the center pixel in a 3-by-3 window utilized by noise detector and filter circuit 463. The particular value produced by circuit 455 is governed by three factors: the background intensity level of a region centered about the current scanned pixel, the noise content of a 3-by-3 window centered about the current center pixel and a deaveraged value of current scanned pixel. The background level and noise content are determined by two adaptive filters. One such filter, background tracker 475 which is discussed in detail below in conjunction with FIG. 11, adaptively tracks the background level of the scanned pixels and produces a six-bit value on leads 474 representative of the background level. In essence, the background level is determined through a pre-defined function of the value of the current pixel, the value of the background level for the immediately prior scanned pixel and the value of the scanned pixel situated in the previous scan line and directly above the current scanned pixel.

The other adaptive filter, consists of noise tracker 467 and noise detector and filter circuit 463. Noise detector and filter circuit 463 determines whether any one of several pre-defined noise patterns exist in the thresholded image produced by comparator 459. Specifically, circuit 463 forms a 3-by-3 window of thresholded pixels centered about the current thresholded pixel produced by comparator 459. The pixel pattern in this window is then compared to a previously stored noise pattern which is pre-defined to be pixel noise. Should a match occur between the pattern in the window and the pre-stored pattern, then a signal in the form of a "Noise flag" is provided over lead 465 to noise tracker 467. This signal causes the noise tracker to increment its output value which, in the absence of subsequent noise, decays on a two-dimensional exponential basis. Inasmuch as the noise flag and the noise tracker form a feedback path in a closed loop servo-control system containing noise tracker 467, summer 473, center pixel look-up circuit 455, comparator 459 and noise detector and filter circuit 463, any detected noise will change the values applied as input to the center pixel look-up table circuit in order to produce an appropriate center pixel value that does not contain noise. In addition, noise detector and filter circuit 463 filters noise from the center pixel (changes its value) in the 3-by-3 window and provides the filtered center pixel value on lead 47. These filtered pixel values are serially applied to and stored within windowing frame buffer 489 located within post-scan processing circuit 48.

Now, with that overview in mind, the discussion will shift to a specific description of image enhancement circuit 44. Specifically, incoming pixel values that have been corrected by pre-scan processing circuit 42 and appear on leads 43 are first applied as input to odd/even pixel averager 441. The averager computes the average value for any two adjacent pixels by merely summing two adjacent pixels and then shifting the result one place to the right to effect a division by two. The resulting averaged value is applied over leads 443 as input to 5-by-5 convolution circuit 445. Advantageously, the averager smooths out any differences (such as offsets between the odd and even channels) appearing in the response of the CCD array to identical adjacent image portions thereby advantageously removing odd/even correlated noise from the corrected pixels. In addition, averaging expands the convolved sampling area with little increase in cost. In particular, pixel averaging followed by 5-by-5 convolution effectively expands the sampled pixel area used in convolution to a 6-by-5 window.

Figure 6:
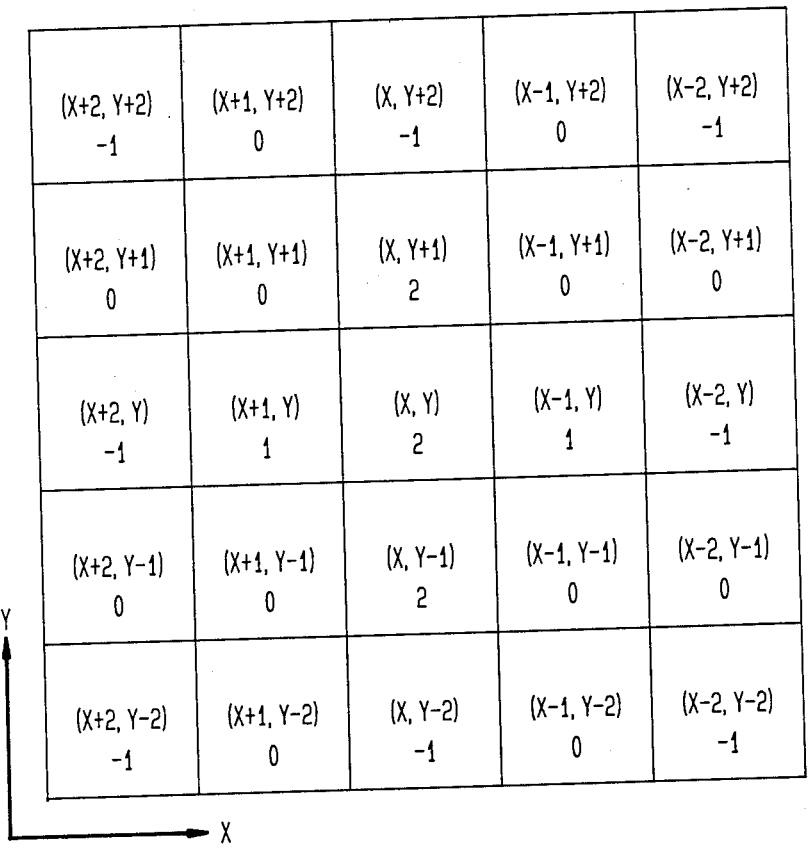
FIG. 6 depicts a diagram of the pixels that constitute 5-by-5 window 46 and their corresponding convolution coefficients as used by 5-by-5 Convolution Circuit 445 shown in FIG. 5.

Convolution circuit 445 convolves a 5-by-5 moving window of pixel values centered about the current averaged pixel value appearing on lead 443 to yield a convolved multi-bit pixel value on lead 450. Convolution is used to sharpen the edges of pixel patterns having widths of two pixels or greater which appear in a scanned microfilm image. Specifically, a certain amount of image resolution is lost whenever an image on paper is reduced in size and photographed onto microfilm. This loss becomes evident when the microfilm image is later expanded: a certain amount of fine detail is lost and previously sharp image edges appear somewhat blurred. Convolution substantially compensates the scanned microfilm image for the loss in resolution. The amplitude of the pixel situated at the beginning of the edge will be substantially increased while that of all surrounding pixels will be decreased although by an amount less than the increase. As a result, the amplitude of the former pixel will reach a peak at a positive value that is substantially higher than the original intensity level, thereby producing a "spike" in the convolution output, while the values of the latter pixels will become somewhat negative thereby creating a "moat" around the peaked value. In this manner, the signal-to-noise ratio of the image is substantially enhanced. The size of the window is set to 5-by-5 in order to achieve a good compromise between hardware cost and complexity and resulting image quality. Generally, as the size of the window increases, image quality will correspondingly increase as the convolution operation is able to detect pixel changes occurring in additional directions. Unfortunately, the cost and complexity of implementing the convolution circuit also increases as the window size increases. Specifically, use of a 2-by-1 or 1-by-2 pixel window only sharpens horizontal and vertical pixel patterns and is generally unacceptable for text. Use of a 3-by-3 window sharpens pixel patterns that occur not only horizontally and vertically but also diagonally through the center pixel in the window. Use of a 5-by-5 pixel window sharpens additional diagonally oriented pixel patterns. For textual images, a 5-by-5 window provides an acceptably high degree of image enhancement. Consequently, this size is used, in view of the additional cost and complexity of the necessary hardware associated with implementing larger windows. Clearly, as the size of memory circuits and shift registers increase and their cost decreases, larger windows can be implemented and used. The coefficients used in convolution circuit 445, as discussed in detail later in conjunction with FIG. 6, are pre-defined binary values. To produce a zero output in response to a constant input the values of the coefficients are constrained to sum to zero. As noted, the multi-bit output of convolution circuit 445 is routed, over leads 450, as one input to center pixel threshold comparator 459.

Convolution circuit 445 also provides the value, over leads 447, of the center pixel that forms the 5-by-5 window. Inasmuch as center pixel look-up circuit 455 imparts a delay of one-pixel interval to its output, a shift register used in implementing convolution circuit 445 is tapped at the (X+1, Y) position which corresponds to the pixel situated immediately to the left of the center pixel. As a result of the one-pixel delay, the convolved pixel appearing on leads 450 and the output of center pixel look-up circuit 455 appearing on leads 457 are always synchronized together to the same pixel.

Center pixel look-up circuit 455 provides a value in response to two specific inputs: the value of the current pixel and the value of the combined background and noise levels present in this pixel. Pixel deaverager 451, discussed in detail below in conjunction with FIG. 7, reconstructs the original values of the shading corrected pixels (applied over lines 43) by inverting the averaging process. Once the pixel deaverager is supplied with the first pixel value for any scan line, it is then able to determine the original pixel values for all the remaining pixels in that line given the averaged data for each pixel appearing in that scan line. The deaveraged pixels appear on leads 453 as one input to center pixel look-up circuit 455.

In response to the current and previous pixel values appearing on leads 447, background tracker 475 provides a multi-bit value representative of the background level in the current pixel on leads 474 as one input to summer 473. This background level can be viewed as a level at which a white pixel changes to black (for negative film) as a function of the pixel intensities in a neighboring region. This level dynamically varies, as will be discussed in detail below. The other input to summer 473, appearing on leads 470, is produced by noise tracker 467. This latter input represents the noise level in the current pixel. Whenever a noise pixel is detected, the noise tracker generates a pre-set factor on leads 470 which, by virtue of summer 473, increases the value on leads 471, thereby causing look-up circuit 455 to generate a value having a higher threshold value for use by comparator 459. Noise tracker 467 generates a decaying exponential output in both the x and y image directions. This output continues to decay every pixel until it either reaches zero or noise is detected again. Each time a single pixel of image noise is detected by noise detector and filter circuit 463, this circuit momentarily causes a pulse to appear on "Noise flag" lead 465. Each such pulse causes the noise tracker 467 to increment its output upward by a pre-defined amount. This amount can be varied and is preferably set to the decimal value "45".

Post-scan processing circuit 48 contains document edge detection circuit 481, microcomputer system 485 and windowing frame buffer 489. In essence, the function of post scan processing circuit 48 is to detect the edges of escribing rectangle 11 containing the scanned document (document 13 shown in FIG. 1) located within the overscanned image area (scanned image 12 in FIG. 1) and supply the thresholded pixels situated on and within escribing rectangle 11 from windowing frame buffer 489 to compressor 50, via leads 49. Document edge detection circuit 481, in response to the current pixel values and corresponding background levels appearing over respective leads 447 and 474 and as discussed in detail below in conjunction with FIGS. 12A–12C, detects edges in each scan line in the scanned image. For each such edge, the circuit supplies its associated pixel location (XCNT value) to microcomputer system 485 via address and data busses 487. The microcomputer system then determines which ones of these edges for any given scan line are the leading and trailing edges of scanned document 13 for the scan line. Specifically, once all the edges for any given scan line have been detected by document edge detection circuit 481, this circuit applies a pulse, via lead 486, to interrupt microcomputer system 485. In response to this interrupt, the microcomputer system, as discussed in detail below in conjunction with document edge detection routine 2100 shown in FIGS. 21A–21C, locates the pair of edges having the widest difference therebetween. Once this pair is located, the edge situated at the lower valued pixel location is designated as the actual leading edge of the document and the edge situated at the higher valued pixel location is designated as the actual trailing edge of the document. This process is repeated, on an interrupt basis, for each scan line in the entire scanned area. At the same time, a histogram is generated by the microcomputer of the leading and trailing edge locations for the document. Now, once all the scan lines have been processed, the microcomputer determines from the histogram the first pixel location moving from the leftmost pixel location to the right at which 10% of the leading edges have occurred. This pixel location is designated as the leading (left) edge of the escribing rectangle (rectangle 11 shown in FIG. 1) situated within the entire scanned area and which contains the scanned document. The microcomputer then performs a similar analysis to locate the right edge of the escribing rectangle. Specifically, the microcomputer ascertains the first pixel location moving from the rightmost pixel location to the left at which 10% of the trailing edges have occurred. This pixel location is designated as the trailing (right) edge of the escribing rectangle. Also, from these pixel locations and in a manner to be discussed in detail below, the microcomputer also ascertains the vertical pixel locations in the scanned area at which the top and bottom edges of the escribing rectangle occur and determines the corresponding memory addresses. Now, given the pixel locations for the top, bottom, left and right edges of the escribing rectangle, the microcomputer system generates the memory address corresponding to the starting pixel (upper left corner in the rectangle) and the horizontal and vertical size of the rectangle. The microcomputer system then supplies the starting address and the vertical and horizontal size information (number of pixels horizontally and number of scan lines vertically) to the windowing frame buffer 489 (see FIGS. 13A–13B which will be discussed in detail shortly) via address and data busses 487. The windowing frame buffer then reads the pixel values stored on and within the edges of the escribing rectangle and serially supplies these pixels, via lead 49, to compressor 50.

Now, having described the entire system, the remaining discussion will turn to a specific description of each of the circuits shown in FIGS. 2A and 2B followed by a discussion of the software executed by microcomputer system 485.

Figure 3:
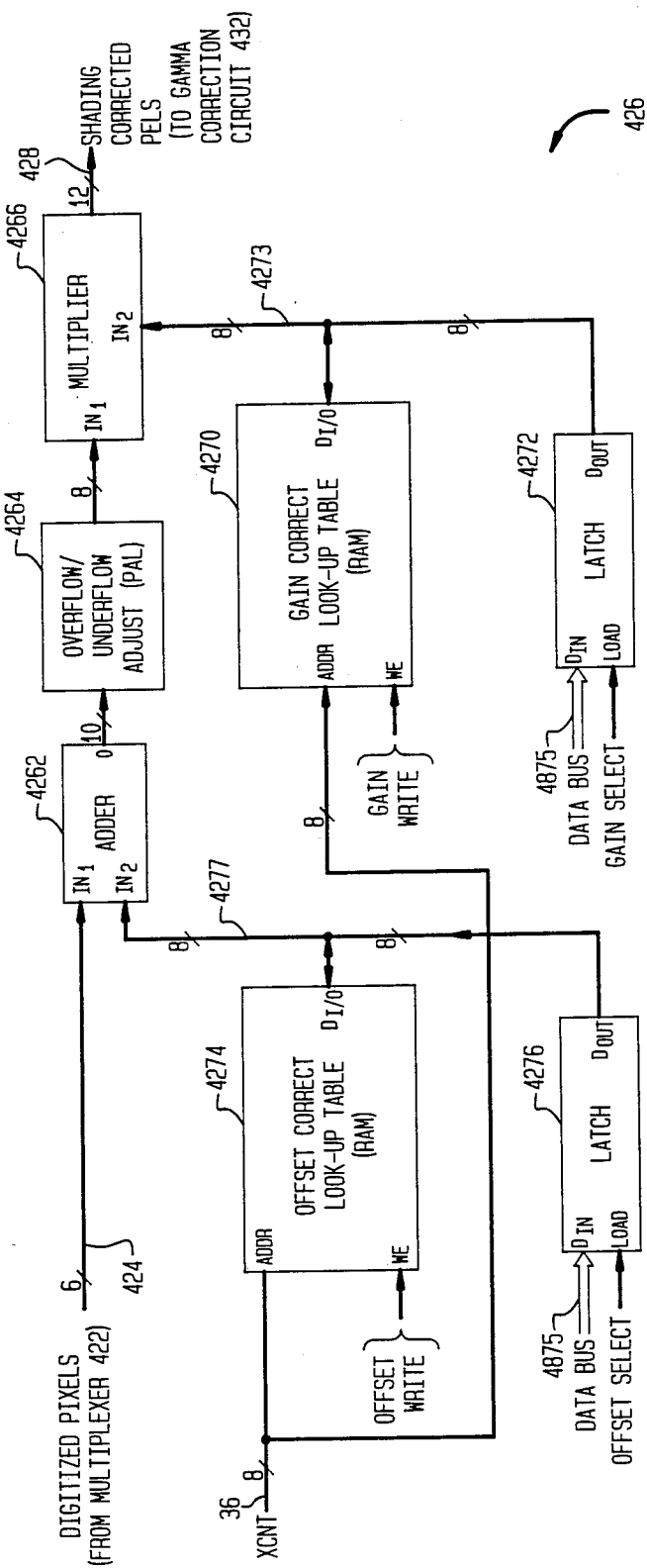
FIG. 3 depicts a block diagram of Shading Correction Circuit 426 which forms part of Image Processing Circuit 40 shown in FIGS. 2A and 2B.

A block diagram of shading correction circuit 426, which forms part of image processing circuit 40 shown in FIGS. 2A and 2B, is depicted in FIG. 3. As discussed above, the shading correction circuit corrects the value of each incoming pixel appearing on leads 424 for differences in illumination appearing across a scan line as well as differences in response between individual cells of the CCD array. This correction is accomplished by adding a pre-determined offset correction factor to the value of each incoming pixel and then multiplying the result by a pre-determined gain correction factor. The offset and gain factors vary across the scanned line and correct for optical shading and pixel performance differences that appear in the output of the CCD array.

Specifically, within shading correction circuit 426, an incoming multi-bit pixel value appearing on leads 424 is routed to one input of adder 4262. The other input to this adder is the offset correction value associated with this pixel and supplied from offset correct look-up table 4274. This table is illustratively a RAM memory that has been loaded with appropriate offset correction factors during system calibration. To generate the values stored within this table, a test scan was performed with lamp 7 (see FIG. 1) off. To obtain the appropriate offset correction factor, the horizontal pixel address, XCNT, is applied over leads 36 as the address to table 4274. Thus, for any incoming pixel appearing on leads 424, the corresponding offset factor for that pixel on any scan line is produced by table 4274. Adder 4262 additively combines the incoming pixel value and the offset correction value and applies the resulting sum to overflow/underflow adjust circuit 4264. This circuit is implemented using programmable array logic (PAL). The PAL has been pre-programmed to suitably change the value of the sum in the event the sum has overflowed or underflowed an allowable 10-bit range and thereby bring the value of sum within its allowable range. The adjusted sum is then applied as one input of (hardware) multiplier 4266. The other input to the multiplier is the gain correction value associated with the incoming pixel and supplied from gain correct look-up table 4270. This table is illustratively a RAM memory that has been loaded with appropriate gain correction factors during system calibration. To generate the values stored within this table, a test scan was performed with lamp 7 (see FIG. 1) on and without any microfilm present in the microfilm reader to impede light. To obtain the appropriate gain correction factor for the incoming pixel, the horizontal pixel address, XCNT, is routed, via leads 36, as the address to table 4270. Thus, for any incoming pixel appearing on leads 424, the corresponding gain factor for that pixel on any scan line is produced by table 4270. Multiplier 4266 multiplies the sum by the gain correct factor and applies the resulting product as the shading corrected pixel, via leads 428, to gamma correction circuit 432.

As noted, the values of the offset and gain correction factors stored within offset and gain correct tables 4274 and 4270 are determined and then stored within the associated RAM memories during system calibration. Specifically, once an appropriate test scan, such as lamp off, has been completed as part of system calibration, and microcomputer system 485, located within post-scan processing circuit 48 (see FIGS. 2A and 2B), has determined the appropriate values of the offset correction factors for each pixel in any scan line, these values are then loaded into table 4274. First, to write values into this table, the horizontal pixel address, XCNT, is set to point to the first pixel in the table. Thereafter or simultaneously therewith, the microcomputer system applies the appropriate offset correction value for that first pixel to data bus 4875. Then, the microprocessor system applies an appropriate pulse to an "Offset Select" control signal which, in turn, is applied to the "Load" input of latch 4276. This pulse causes the latch to store the value appearing on the data bus and apply that value, via its data output pins and leads 4277, to the data in/out terminals of table 4274. Subsequently, microcomputer system 485 applies a suitable high level "Offset Write" control signal to a "Write Enable" (WE) input to table 4274. This level, in turn, causes the RAM memory that implements this table to write the value appearing on data bus 4875 (which forms part of address and data busses 487 shown in FIGS. 2A and 2B) into a memory location specified by the XCNT value. Once this write operation has occurred, then the XCNT value is incremented and the process repeats. This process iteratively occurs until all the remaining offset correction factors have been stored in this table. The gain correction look-up table, shown in FIG. 3, is loaded in a substantially identical fashion through latch 4272 and data bus 4875.

Figure 4:
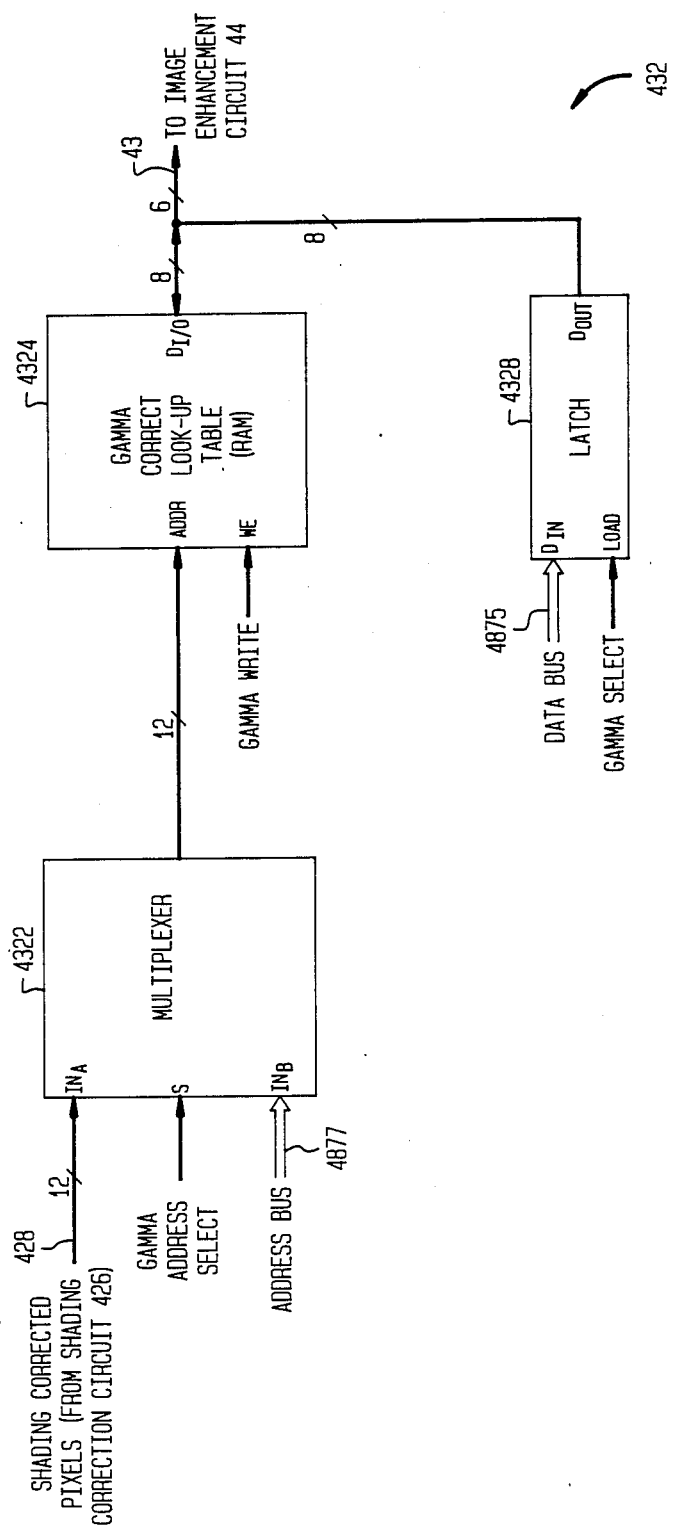
FIG. 4 depicts a block diagram of Gamma Correction Circuit 432 which also forms part of Image Processing Circuit 40 shown in FIGS. 2A and 2B.

A block diagram of gamma correction circuit 432, which also forms part of image processing circuit 40 shown in FIGS. 2A and 2B, is depicted in FIG. 4. As noted, this circuit compensates each shading corrected six-bit pixel value for differences in transfer characteristics occurring among different types of microfilm, illustratively silver positive, silver negative, diazo and vesicular, that can be used in the KIMS system. These characteristics generally include intensity rolloff distance, film rise distance, and the like. As such, gamma correction advantageously tailors the response curve (illumination vs. intensity) of any one of several predefined film types to a single curve best suited as input to image enhancement circuit 44. Moreover, gamma correction can also be used to invert incoming pixel values and thereby convert from a positive to a negative image.

Incoming multi-bit shading corrected pixel values are routed by leads 428 to one data input, $IN_A$, of 12-bit multiplexer 4322. This multiplexer routes either these pixel values or an address appearing on address bus 4877, which is applied to its second data input, $IN_B$, to gamma correct look-up table 4324. Whenever gamma correction is to be performed, the level of a "Gamma Address Select" control signal applied to a select, S, input of the multiplexer is appropriately set to cause the multiplexer to route the incoming pixel values therethrough as input addresses to table 4324. This control signal is set to the opposite level whenever data is to be written into the table. During gamma correction, the value of each incoming pixel is used as an address to table 4324 to access the corresponding gamma corrected pixel value from the table. Once this value is accessed, the most significant six bits are applied, over leads 43, to image enhancement circuit 44.

Gamma correction factors are constants that are loaded into gamma correction look-up table 4324 prior to scanning. These factors often vary as different types of microfilm are fetched and scanned by the film library. Specifically, after the film library loads a roll of microfilm in the microfilm reader but prior to its being scanned, gamma correction look-up table 4324 is loaded with appropriate gamma correction factors corresponding to the specific type of the film that is to be scanned. The gamma correction factors for each different film type take the form of a table of constants. All these constant tables have been previously stored within microprocessor system 485 (see FIGS. 2A and 2B). Once the microprocessor system determines the specific film type, from various indicia located on the film container, it accesses the appropriate table and writes the contents of that table into the RAM memory that implements table 4324. To do so, the microprocessor system first sets the 37 Gamma Address Select" control signal, as shown in FIG. 4, to an appropriate level to cause multiplexer 4322 to route the address appearing on address bus 4877 (which forms part of address and data bus 487 shown in FIGS. 2A and 2B) to the address inputs of gamma correct look-up table 4324. At substantially the same time, the microprocessor system accesses the appropriate gamma correction constant table and applies the particular gamma correction factor for the address specified on address bus 4877 to data bus 4875 which, in turn, applies this factor to the data input of latch 4328, as shown in FIG. 4. The microprocessor system then applies a pulse, via a "Gamma Select" control line, to a "Load" control input of the latch. In response to this pulse, latch 4328 latches the value appearing on data bus 4875 and applies it, via leads 43, to the data in/out terminals of table 4324. Subsequently, microcomputer system 485 applies a suitable high level "Gamma Write" control signal to the "Write Enable" (WE) input to table 4274. This level, in turn, causes the RAM memory that implements this table to write the value appearing on data bus 4875 into a memory location specified by the address appearing on address bus 4877. Once this write operation has occurred, then the address is incremented, new data is applied to the data bus and the process repeats. This process iteratively occurs until all the remaining gamma correction factors for the specific type of microfilm that will be scanned have been stored in this table.

Figure 5B:
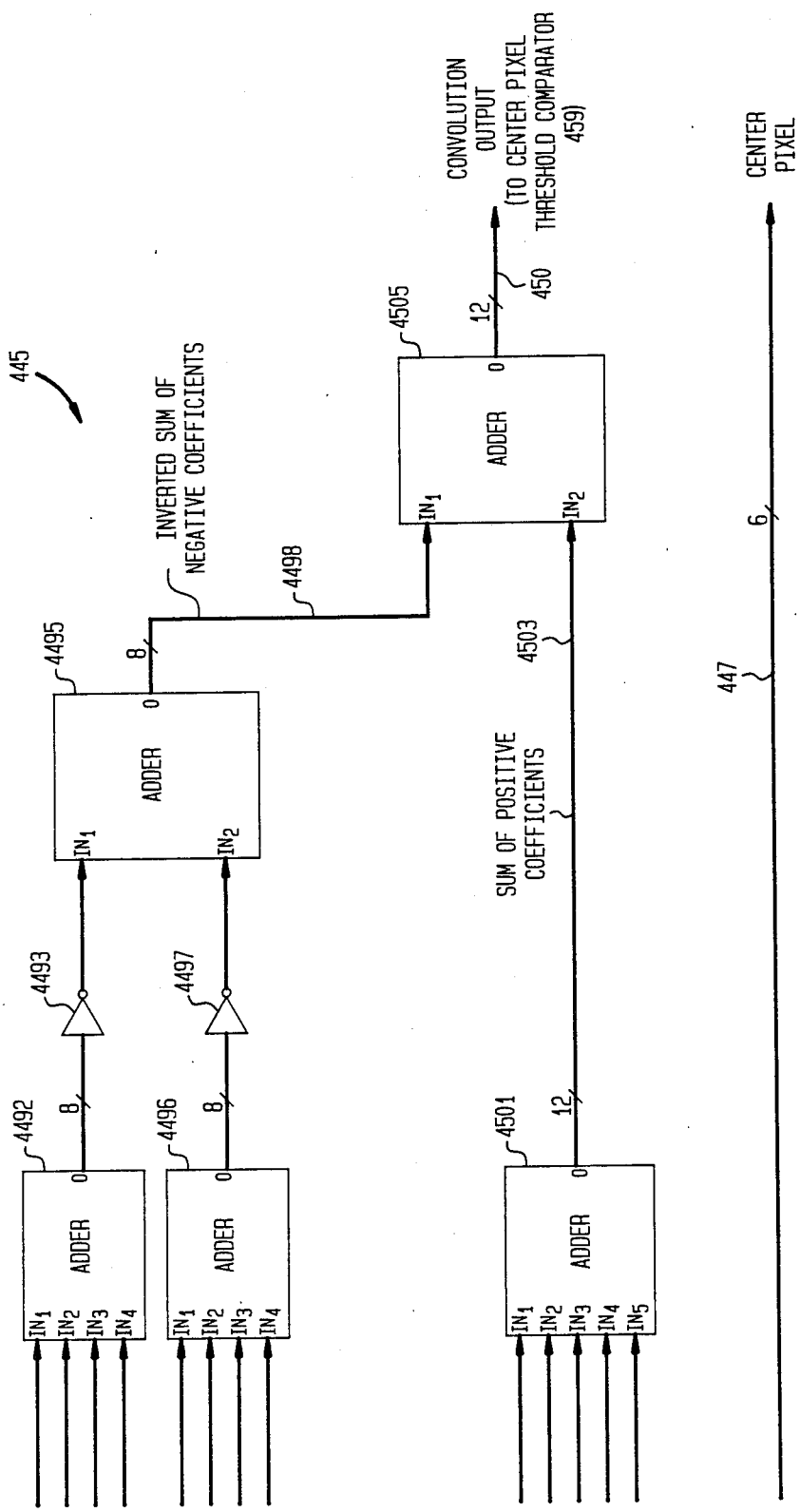

A block diagram of 5-by-5 Convolution Circuit 445, which also forms part of image processing circuit 40 shown in FIGS. 2A and 2B, is depicted in FIGS. 5A and 5B, for which the correct alignment of the drawing sheets for these latter figures is shown in FIG. 5. Now, in connection with the following discussion, reference should also be made to FIG. 6 which shows the specific pixels that constitute 5-by-5 window 46 used by convolution circuit 445 and the corresponding convolution coefficient for each pixel in this window.

The convolution circuit essentially contains a delay line which stores five scan lines and simultaneously provides the values of the pixels that form a moving 5-by-5 window. Each value is multiplied by its corresponding convolution coefficient and then summed together. Since the coefficients have the value 0, +1 or 2, each multiplication can be implemented by addition, shifting and/or subtraction. Specifically, as shown in FIGS. 5A and 5B, incoming averaged pixels appearing on leads 443 are sequentially routed through line delays 4457, 4463, 4475 and 4482 to store the first (line $Y+1$), second (line Y), third (line $Y-1$) and fourth (line $Y-2$) most recent scan lines. Simultaneously therewith, incoming pixels are also applied to 5 by 6-bit shift register 4451. This shift register stores five most recent pixels on the current scan line (line $Y+2$). Inasmuch as three of these pixels (first, third and fifth) are used in the convolution, shift register 4451 simultaneously applies the value of pixel $(X+2, Y+2)$ to leads 4452, the value of pixel $(X, Y+2)$ to leads 4453, and the value of pixel $(X-2, Y+2)$ to leads 4454. Each of these values is simultaneously applied to respective inputs of adder 4492. The output of this adder, is complemented by inverter 4493 with the resulting complemented value being applied as one input to adder 4495. This latter adder provides the inverted sum of all the pixel values thereby providing the sum of all the individual pixel values that were to be multiplied by the value −1. The inverted sum appearing on leads 4498 is, in turn, applied as one input to adder 4505 which combines the sum of all the pixel values with negative coefficients with the sum, appearing on leads 4503, of those having positive coefficients. The output of summer 4505, which appears on leads 450, is the result of the convolution.

Now, with respect to the immediately preceding scan line, i.e. scan line $Y+1$, the pixels that form this scan line are produced by line delay 4457 and then are clocked into shift register 4460. Only one of the five pixels, that form the second row of the window and are situated in this scan line, is used in the convolution. This pixel value, pixel $(X, Y+1)$ appears on leads 4461 and carries a convolution coefficient of +2. Consequently, this pixel value is routed, via leads 4461, to one input of adder 4501. This adder provides the sum of all pixels that have positive convolution coefficients. Now, inasmuch as the value of pixel $(X, Y+1)$ is to be doubled, this can be effected by simply shifting the value of the pixel one place. This is readily provided by appropriately wiring the connections between shift register 4460 and the input to adder 4501 with a one position offset, i.e. the least significant bit output on leads 4461 is wired to the least significant bit+1 input lead of input $IN_1$ of adder 4501 and so on. The circled symbol "x2" is used to designate such an offset connection. Similar offset connections occur for pixels $(X, Y)$ and $(X, Y-1)$.

With respect to the middle scan line in the window, i.e. scan line Y, the pixels that form this scan line are produced by line delay 4463 and then are clocked into shift register 4466. All five pixels, that form the center row of the window and are situated in this scan line, are used in the convolution. Two of these pixel values, i.e. first and fifth pixels $(X+2, Y)$ and $(X-2, Y)$, appearing on leads 4469 and 4473, each carry a convolution coefficient of −1 and are hence simultaneously routed to respective inputs of adders 4492 and 4496. The output of adder 4496 is complemented by inverter 4497 and thereafter applied as a second input to adder 4495. Of the three remaining pixels in this scan line, the center pixel value (X, Y) carries a convolution coefficient of +2 and is therefore connected in an offset fashion, as discussed immediately above, to one input of adder 4501. The remaining pixel values, i.e. second and fourth pixels (X+1, Y) and (X−1, Y), each carry convolution coefficients of +1 and for that reason are directly connected, via respective leads 4470 and 4472, to corresponding inputs of adder 4501.

Regarding the next scan line, i.e. scan line Y−1, the pixels that form this scan line are produced by line delay 4475 and then are clocked into shift register 4478. Only one of the five pixels, that form the fourth row of the window and are situated in this scan line, is used in the convolution. This pixel value, pixel (X, Y−1) appears on leads 4480 and carries a convolution coefficient of +2. Consequently, this pixel value is routed, via leads 4480, and using a one position offset connection to one input of adder 4501.

Lastly, with respect to the last or bottom scan line in the window, i.e. scan line Y−2, the pixels that form this scan line are clocked into shift register 4485. Three of these pixel values, i.e. first, third and fifth pixels (X+2, Y−2), (X, Y−2) and (X−2, Y−2), appearing on leads 4486, 4487 and 4488, respectively, each carry a convolution coefficient of −1 and are hence all simultaneously routed to respective inputs of adder 4496.

The convolution circuit also provides the value, over leads 447, of the center pixel that forms the 5-by-5 window. Inasmuch as center pixel look-up circuit 455 (see FIGS. 2A and 2B) imparts a one pixel interval delay to its output, the pixel value that is needed is available at the fourth position, i.e. pixel (X+1, Y) within shift register 4466. This pixel corresponds to the pixel situated immediately to the left of the center pixel in window 46 shown in FIG. 6. As a result of the one pixel delay, the convolved pixel appearing on leads 450 is the actual center pixel in the 5-by-5 window (see FIGS. 2A and 2B). Hence, the convolved pixel and the output of center pixel look-up circuit 455 are always synchronized together to the same pixel.

Figure 7:
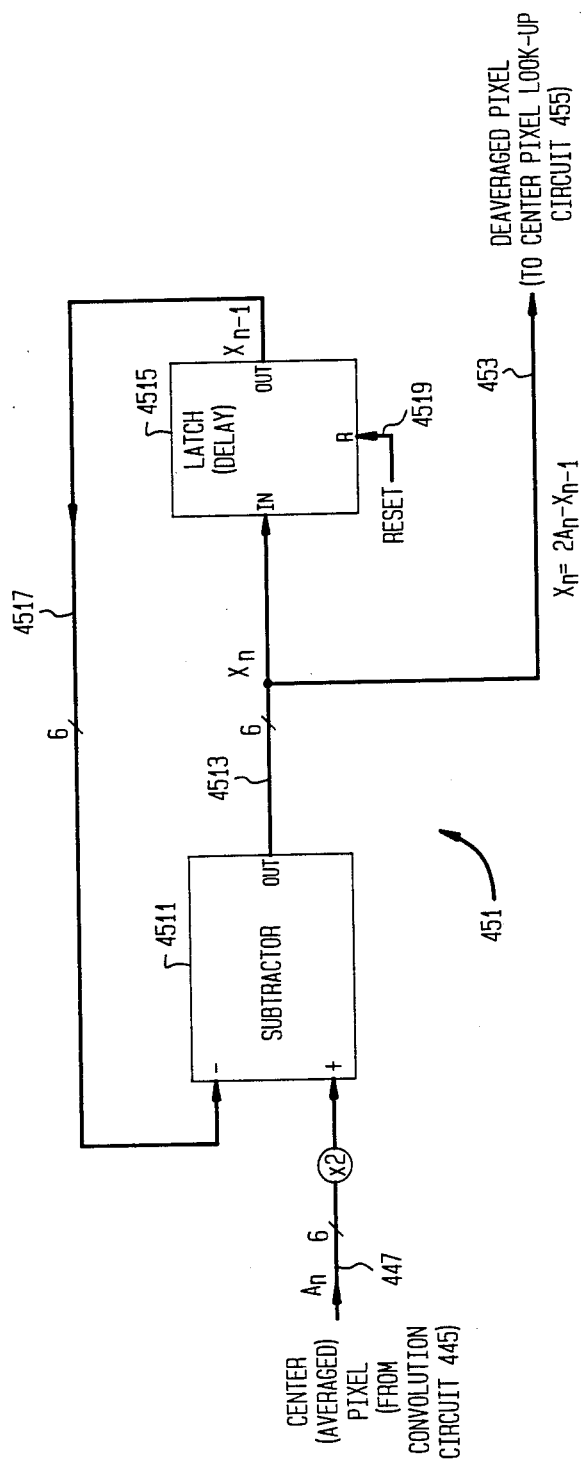
FIG. 7 depicts a block diagram of Pixel Deaverager 451 which also forms part of Image Processing Circuit 40 shown in FIGS. 2A and 2B.

A block diagram of pixel deaverager 451, which forms part of image processing circuit 40 shown in FIGS. 2A and 2B, is depicted in FIG. 7. As discussed above, the pixel deaverager reconstructs the original values of the shading corrected pixels (applied over lines 43 in FIGS. 2A and 2B) by inverting the averaging process. Once the pixel deaverager is supplied with the first pixel value for any scan line, it is then able to determine the original value for each remaining pixel in that line given the averaged data for each pixel appearing in that scan line. The deaveraged pixels appear on leads 453.

In essence, deaverager 451 functions in the following manner. Given pixels $X_0, X_1, \ldots, X_n$ in a current scan line, then subsequent corresponding average values ($A_1, A_2, A_3, \ldots, A_n$) for these pixels are given by:

$$A_1 = (X_0 + X_1)/2 \tag{1}$$

$$A_2 = (X_1 + X_2)/2 \tag{2}$$

and so on until for the last average value:

$$A_n = (X_{n-1} + X_n)/2. \tag{3}$$

Now, if the value of the first pixel in the scan line is known as $X_0$, then solving for the unknown (deaveraged) pixel value, $X_1$, in equation (1) yields:

$$X_1 = 2*A_1 - X_0 \tag{4}$$

This resulting value for pixel $X_1$ can then be inserted into equation (5) to yield the next (deaveraged) pixel value, $X_2$, to be:

$$X_2 = 2*A_2 - X_1. \tag{5}$$

Therefore, once the value of the first pixel in any scan line is known, a value can be calculated for each subsequent pixel using each corresponding averaged pixel value and the prior deaveraged pixel value. In general, deaverager 451 implements the following equation:

$$X_n = 2*A_n - X_{n-1} \tag{6}$$

Hence, to reconstruct a stream of original (deaveraged) pixel values that form a scan line from a stream of averaged pixel values for that scan line, use of this inventive technique merely requires storing the value of first pixel in the line. This, in turn, advantageously eliminates the need to store both averaged and non-averaged (original) pixel values for every pixel in the line as had occurred in the past. As a result, deaverager 451 provides a simpler and hence less expensive approach than those previously known and used in the art.

Specifically, incoming center (averaged) pixels, $A_n$, from convolution circuit 445 appearing on leads 447 are routed, via a one position offset connection, to a positive input of subtracter 4511. The offset connection effectively doubles the value appearing on leads 447. The other (negative) input to subtracter 4511 is supplied with the output value generated by latch 4515 and appearing on leads 4517. Latch 4515 provides a one pixel delay.

For any incoming averaged pixel value appearing on leads 447, subtracter 4511 calculates the deaveraged value, $X_n$, for that pixel by subtracting the value of the immediately preceding pixel, $X_{n-1}$, from twice the averaged pixel value. To operate deaverager 451, the contents of latch 4515 are first cleared through a control ("Reset") signal applied, via lead 4519, to a reset ("R") input of the latch. As a result, the prior pixel value, $X_{n-1}$, is initially set to zero. The value of the first pixel on a current scan line, which is generally zero or other known amount, is applied to deaverager 451, via leads 447. During the next succeeding pixel clock cycle, the prior pixel value, $X_{n-1}$, is essentially clocked through subtracter 4511 and latch 4515. At the same time, i.e. one pixel clock cycle after the first pixel value was applied to leads 447, the current averaged pixel value, $A_n$, is applied to these leads. As a result, at the end of this pixel clock cycle, the current deaveraged pixel value, $X_n$, appears on leads 4513 and becomes the prior pixel value, $X_{n-1}$, appearing on lead 4517 for use during the next pixel clock cycle. This process is iteratively repeated to calculate all the remaining deaveraged pixel values for the current scan line.

Figure 8:
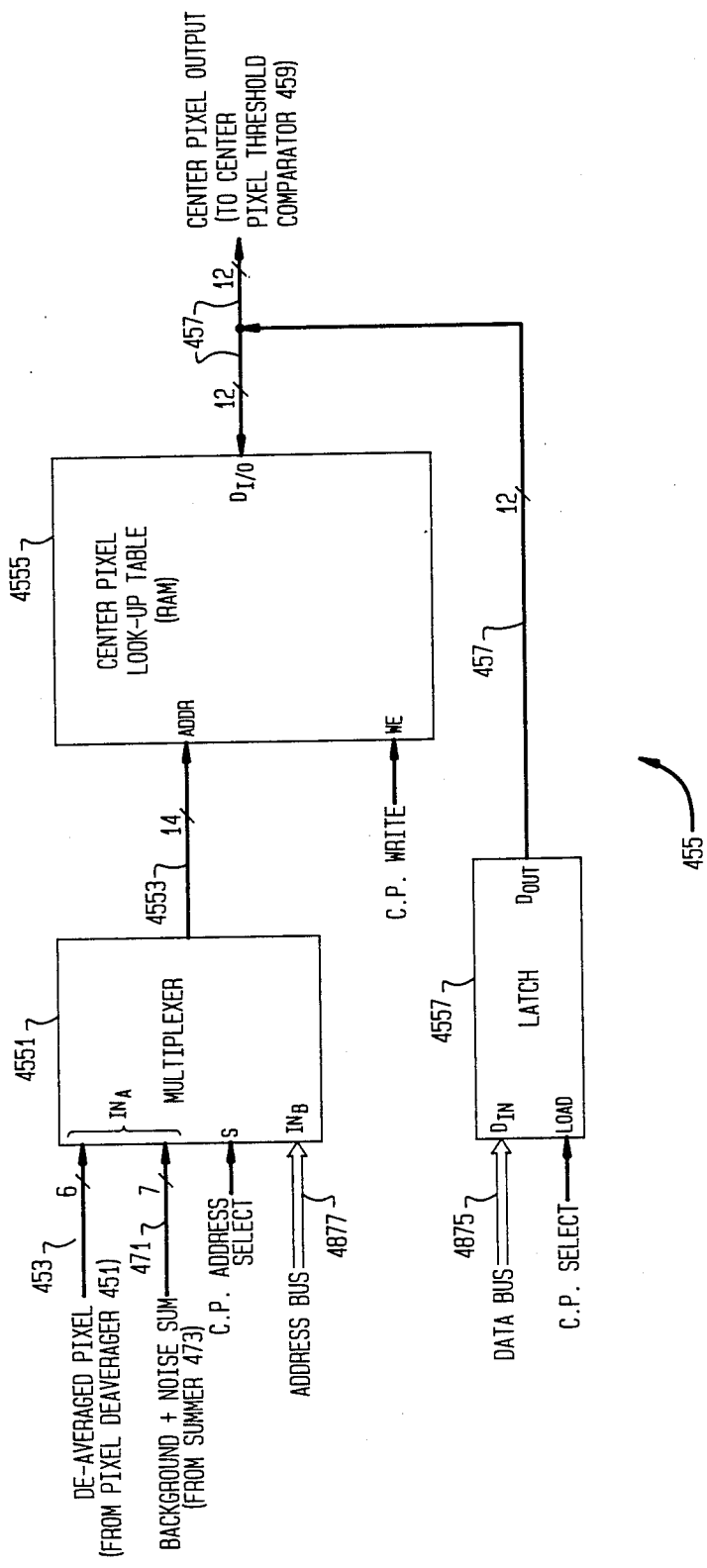
FIG. 8 depicts a block diagram of Center Pixel Lookup Circuit 455 which also forms part of Image Processing Circuit 40 shown in FIGS. 2A and 2B.

A block diagram of center pixel look-up circuit 455, which forms part of image processing circuit 40 shown in FIGS. 2A and 2B, is depicted in FIG. 8. As discussed above, circuit 455 stores pre-defined pixel values which are applied to center pixel threshold comparator 459 for use in thresholding the value of each pixel which forms the center pixel in a 3-by-3 window utilized by noise detector and filter circuit 463. The particular value produced by this table is governed by three factors: the background intensity level of the scanned area in a region near the current scanned pixel, the noise content computed for the current center pixel, and a deaveraged value of the current scanned pixel.

Specifically, three forms of incoming information are applied to the circuit and are collectively used to form an address to a memory. In particular, de-averaged pixel values appear on leads 453 and, for each such pixel value, a corresponding value representing the sum of background level and noise content for that pixel appears on leads 471. The signals appearing on leads 453 and 471 are collectively applied to one input, $IN_A$, of multiplexer 4551. The multiplexer is instructed by a "C.P. (Center Pixel) Address Select" signal, which is applied to an appropriate select (S) input of the multiplexer, to route either the signals appearing on leads 435 and 471 or those appearing on address bus 4877, which is applied to input $IN_B$ of the multiplexer, to the address input of center pixel look-up table 4555, via leads 4553. This address select signal is provided by microcomputer system 485 located within image processing circuit 40 (see FIGS. 2A and 2B). Table 4555, shown in FIG. 8, is illustratively implemented using RAM memory circuits. Once an address is provided to this table and the RAM memories used therein are appropriately clocked (by clock signals not shown), the memories provide the corresponding center pixel output values on leads 457 for use by center pixel thresholding comparator 459. During system initialization, microprocessor system 485 (see FIGS. 2A and 2B) accesses an internal table of stored constants and appropriately copies these constants into center pixel look-up table 4555. To do so, the microprocessor system first sets the "C.P. Address Select" signal, as shown in FIG. 8, to an appropriate level to cause multiplexer 4551 to route the address appearing on address bus 4877 to the address inputs of center pixel look-up table 4555. At substantially the same time, the microprocessor system accesses the appropriate center pixel table and applies the particular pixel value for the address specified on address bus 4877 to data bus 4875 which, in turn, applies this factor to the data input of latch 4557. The microprocessor system then applies a pulse, via the "C.P. Select" control line, to a "Load" control input of the latch. In response to this pulse, latch 4557 latches the value appearing on data bus 4875 and applies it, via leads 457, to the data in/out terminals of table 4555. Subsequently, microcomputer system 485 applies a suitable high level "C.P. Write" control signal to the "Write Enable" (WE) input to table 4555. This level, in turn, causes the RAM memory that implements this table to write the value appearing on data bus 4875 into a memory location specified by the address appearing on address bus 4877. Once this write operation has occurred, then the address is incremented, new data is applied to the data bus and the process repeats. This process iteratively occurs until all the remaining center pixel values have been written into table 4555.

Figure 9:
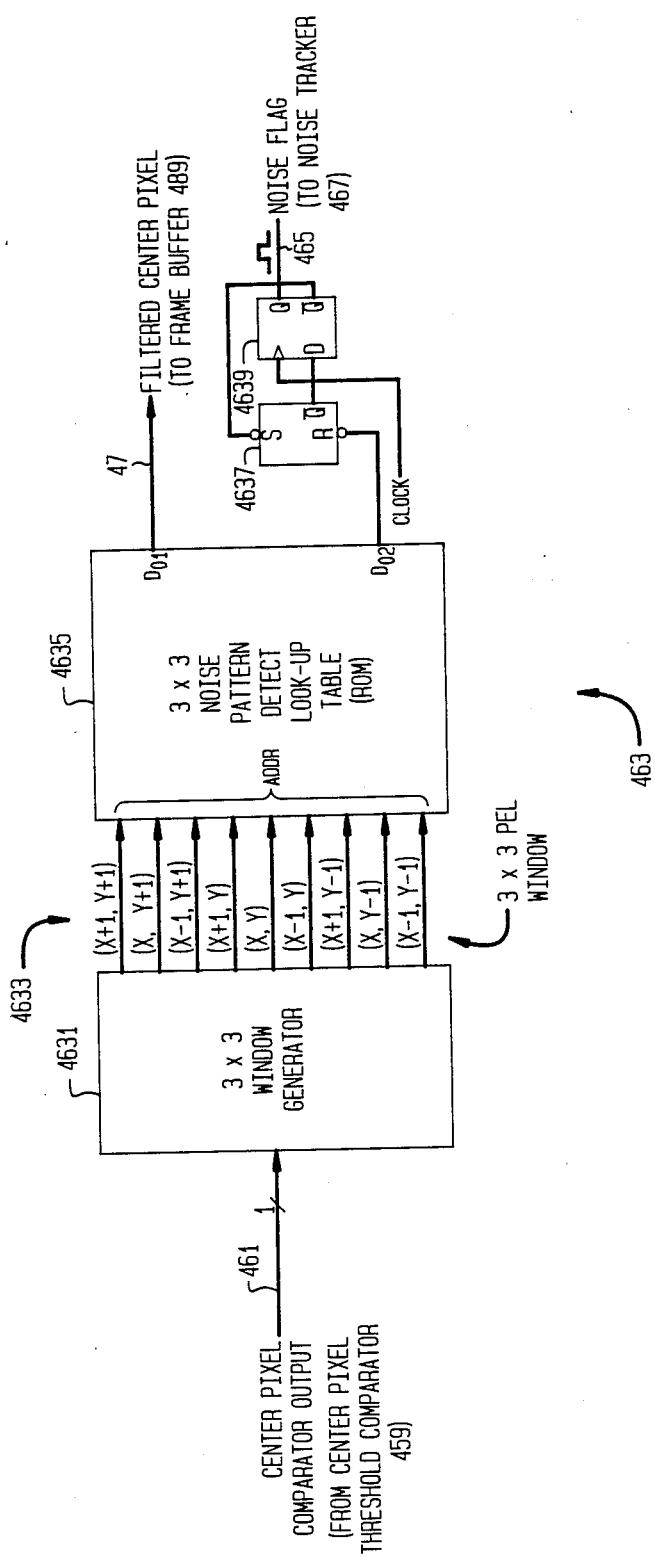
FIG. 9 depicts a block diagram of Noise Detector and Filter Circuit 463 which also forms part of Image Processing Circuit 40 shown in FIGS. 2A and 2B.

A block diagram of noise detector and filter circuit 463, which forms part of image processing circuit 40 shown in FIGS. 2A and 2B, is depicted in FIG. 9. As previously discussed, noise detector and filter circuit 463 determines whether any one of several pre-defined noise patterns exist in the thresholded image produced by comparator 459. Circuit 463 forms a 3-by-3 window of thresholded pixels centered about the current thresholded pixel produced by comparator 459. The pixel pattern in this window is then compared to a previously stored noise pattern which is pre-defined to be pixel noise. Should a match occur between the pattern in the window and the pre-stored pattern, then a signal in the form of a "Noise flag" is provided over lead 465 to noise tracker 467. In addition, circuit 463 filters single pixel noise from the center pixel (changes its value) in the 3-by-3 window and provides the filtered center pixel value on lead 47. The filtered centered pixels appearing on lead 47 are routed to windowing frame buffer 489 situated within post-scan processing circuit 48 (see FIGS. 2A and 2B).

In particular, as shown in FIG. 9, single bit pixels produced by center pixel threshold comparator 459 are applied over lead 461 to 3-by-3 window generator 4631. This window generator contains two line delays and three 3-bit shift registers connected in a similar fashion as are line delays 4457 and 4463 and shift registers 4451, 4460 and 4466 (see FIGS. 5A and 5B), to produce a moving window of 3-by-3 pixels. The nine pixels simultaneously produced by window generator 4631 are applied in parallel, via leads 4633 shown in FIG. 9, as an address to 3-by-3 noise pattern detect look-up table 4635. This look-up table contains read only memories (ROMs) that store pre-defined noise patterns that could occur within a 3-by-3 window. Four different noise patterns that could occur within a 3-by-3 window are stored within the ROMs, but only one of these patterns is selected (by well known addressing circuitry not shown) for use at any one time. Table 4635 produces two separate outputs. If the moving 3-by-3 window contains a noise pattern that matches a pattern stored within the ROM, then a high level signal is produced on output $D_{O2}$. This high level signal is then clocked through flip-flops 4637 and 4639 in order to produce a pulse, which lasts two clock cycles, on lead 465. This pulse is the "Noise flag". This pulse causes noise tracker 467 (see FIGS. 2A and 2B), which is discussed in detail below in conjunction with FIG. 10, to increment its output value. As shown in FIG. 9, the other output of table 4635, output $DO_1$, which appears on lead 47, is the value of the center pixel of the 3-by-3 window from which single pixel noise has been removed. Specifically, if the center pixel provided by comparator 459 is black (e.g. binary "1") because of noise, the value of this pixel is changed to white (e.g. binary "0") by table 4635.

Figure 10B:
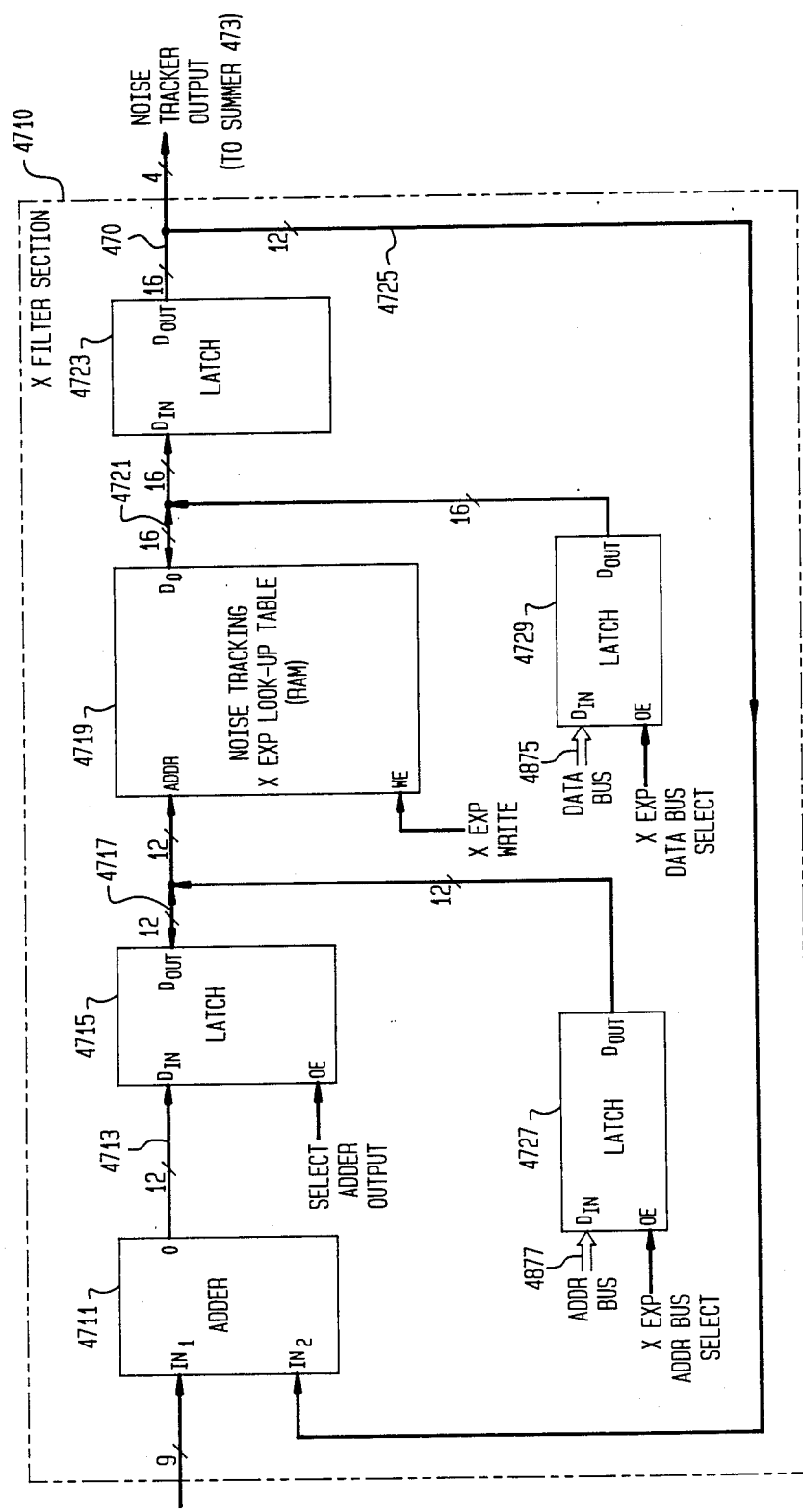

A block diagram of noise tracker 467, which forms part of image processing circuit 40 shown in FIGS. 2A and 2B, is collectively depicted in FIGS. 10A and 10B, for which the correct alignment of the drawing sheets for these figures is shown in FIG. 10. As noted above, noise tracker 467 is a two-dimensional filter that produces an output value that incrementally and exponentially decays, on a pixel by pixel basis, in both the x and y directions in response to each pulse of the Noise flag that appears on lead 465. The output of this filter tracks the current noise level in the scanned image. In response to each pulse on the Noise flag, the output of this filter increases, by a pre-defined value that is preferably equal to the decimal value "45", and then decays in both the x and y directions until the value of the output reaches zero.

As shown in FIGS. 10A and 10B, Noise Tracker 467 consists of Y Filter Section 4670 and X Filter Section 4710 which provide outputs that exponentially decays on a pixel-by-pixel basis in the Y and X directions, respectively. Specifically, within Y Filter Section 4670, a pre-defined exponentially decaying function [of the form 1/(1−T) where T is time] is stored within Noise Tracking Y Exp Look-up Table 4679, which is preferably a RAM circuit. This function provides filtering in the Y direction which corresponds to a direction that is perpendicular to that of the scan line. In other words, given a starting value for any pixel, P, on a scan line, the output of this look-up table provides a value for the same pixel but located on the next scan line, i.e. the next pixel in the same column, that equals the starting value attenuated by a small exponential amount. Now, assuming that no noise occurs in all the remaining pixels in this column for the next several scan lines, then the values for the pixels in this column produced by look up table 4679 will resemble a decaying exponential function.

Specifically, look-up table 4679 is accessed by two values that collectively form an address over leads 4677. One value is the single bit pulse appearing on Noise flag lead 465. At the same time, the multi-bit output produced by look-up table 4679, which has been delayed by one scan line through line store 4671, is the other value. Both of these values are applied to respective data inputs of latch 4675: the Noise flag bit appearing via lead 465 and the delayed output of look-up table 4679 appearing through leads 4673.

In operation, Noise flag pulses are applied over lead 465 as data to an appropriate input bit of latch 4675. Simultaneously therewith, the output of Y EXP look-up table 4679 is stored within latch 4684 for use as input data to line store 4671. The address at which the Y EXP value will be stored within the line store is specified by the value of the horizontal pixel address, XCNT, appearing on leads 36. Control circuitry 493 (see FIGS. 2A and 2B) then applies an appropriate pulse on the line store write signal to write this value into line store 4671. Once the Y EXP value has been written into the appropriate location in the line store, the line store accesses the delayed value for that location and applies the result, as shown in FIGS. 10A and 10B, to leads 4673. Both the delayed value and the value of the Noise flag are clocked into latch 4675 and from there appear as a ten bit address to Y EXP look-up table 4679. In response to this address and appropriate clock signals (not shown) applied to the RAM circuits used therein, Y EXP look-up table accesses the appropriate Y EXP value and applies that value to leads 4682. Thus, as can be seen, the value provided by table 4679 for the current pixel being processed determines, in part, the value for the same pixel but located in the immediately following scan line. In the event a pulse occurs on the Noise flag, then the Y EXP table increases its output value by a pre-determined amount, typically the decimal value "45". The output of the Y EXP table appearing on leads 4681 is routed as input to X Filter Section 4710.

As noted, X Filter Section 4710 provides filtering in the X direction which corresponds to a direction parallel to that of the scan line. In other words, given a starting value for any pixel, P, on a scan line, the output of this look-up table provides a value for the next pixel on this scan line that equals the starting value attenuated by a small exponential amount. Now, assuming that no noise occurs in the next several successively occurring pixels in the same scan line, then the values for these pixels in this scan line produced by look up table 4719 will resemble a decaying exponential function. Specifically, within X Filter Section 4710, a pre-defined exponentially decaying function [again of the form 1/(1−T) where T is time] is stored within Noise Tracking X Exp Look-up Table 4719, which is preferably a RAM circuit.

X Filter Section 4710 functions in a very similar manner to that of Y Filter Section 4670. Specifically, look-up table 4719 is accessed by an address appearing on leads 4717. This address consists of the sum of two values. One value is the output of Y Filter Section 4670 appearing on leads 4681. At the same time, the multi-bit output produced by X EXP look-up table 4719, which has been delayed by one pixel clock cycle through latch 4723, is the other value. In operation, both the output of Y Filter Section 4670, directly appearing via leads 4681, and the delayed output of look-up table 4719 appearing on leads 4725 are applied to respective inputs of adder 4711. The sum of these values appears on leads 4713 and is clocked into latch 4715 as an address to X EXP look-up table 4719. In response to this address and appropriate clock signals (not shown) applied to the RAM circuits that form X EXP look-up table 4719, this look-up table accesses the appropriate X EXP value and applies that value to leads 4725. Thus, as can be seen, the value provided by table 4719 for the current pixel being processed determines, in part, the value for the immediately preceding pixel. The output value appearing on leads 470 is a two-dimensionally filtered value that tracks the noise level that occurs in the scanned image. As noted above, this value is applied, via leads 470, to summer 473 (see FIGS. 2A and 2B).

X EXP and Y EXP look-up tables 4679 and 4719 are both loaded with appropriate data during system initialization by microcomputer system 485, specifically through execution of block 1410 shown in FIG. 14 which will be discussed in detail shortly. For initialization, appropriate data and address information are applied, from the microcomputer system, via address bus 4877—shown in FIGS. 10A and 10B—and data bus 4875, to these tables through address latch 4687 and data latch 4690 for Y EXP look-up table 4679 and address latch 4727 and data latch 4729 for X EXP look-up table 4719. Data is written into both of these tables by the microcomputer system using appropriate address and data bus select signals and write signals in a substantially identical manner as that explained above in connection with center pixel look-up table 4555 (see FIG. 8).

A block diagram of background tracker 475, which forms part of image processing circuit 40 shown in FIGS. 2A and 2B, is collectively depicted in FIGS. IIA and IIB, for which the correct alignment of the drawing sheets for these figures is shown in FIG. 11. Background tracker 475, as noted above, produces a six-bit value that adaptively tracks the background level for each pixel in the scanned image. The background level can be viewed as the level, which dynamically varies from pixel to pixel, at which a white pixel changes to black (for negative film) as a pre-defined function of the background intensities of the pixels in a neighboring region.

The background level for the current pixel, V, can be determined using the following relationship:

$$\text{Background of } V = \min(b, c) - f[\min(b, c) - V] \tag{7}$$

where:
 b=the background level for the pixel, B, situated in the same column as the current pixel but located within the immediately prior scan line, and c = the background level for the previous pixel, C, located in the current scan line.

The positions of pixels B and C in relation to current pixel V are depicted in portion 4785 of the current scanned image. Function f is a non-linear empirically derived function that preferably resembles function 4880. Through this function, the tracked background level responds rapidly (closely follows a video level) when the value of the current pixel goes towards the background (or paper) level of the scanned document, i.e. changes from black (decimal value "63") to white (decimal value "0"), and responds less rapidly when the value of the current pixel goes towards that of character data, i.e. changes from white to black. Background tracker 475 provides the background level of the current pixel V using this relationship.

Specifically, pre-defined values of the function f are stored within background tracking look-up table 4768 which is preferably implemented using RAM circuits. This table is accessed using two values as an address: the value of the present pixel, V, and the minimum of two prior background values (b and c). The value of the current pixel, pixel (X+1, Y), is supplied to background tracker 475, via leads 447. During image processing, this value is routed through multiplexer 4767 and is applied as input to the lowest six bits (0–5) of the address input to look-up table 4768. The other input, min(b,c), appears on leads 4763 and is routed, during image processing, through multiplexer 4765, and is applied as input to the highest six bits of the address input to this look-up table.

Line store 4751, latch 4755, comparator 4757 and multiplexer 4761 are used to determine the minimum value between prior background values b and c. In particular, in response to various clocking and control signals (not shown) line store 4751 provides the value of the pixel for the prior scan line and stored in the location given by the current value of the horizontal pixel address, XCNT, on leads 4753. This value is applied to one input, $IN_B$, of multiplexer 4761 and as one input, $IN_A$, of comparator 4757. At the same time, the contents of latch 4779 contain the background value for the previous pixel, C, situated on the current scan line. This value is routed, via feedback leads 4781, to another input, $IN_A$, of multiplexer 4761. In addition, the background value c is also routed as one input, $IN_B$, to comparator 4757. Comparator 4757 compares the b and c background values and produces a single bit output which specifies which value is the smaller of the two. This single bit is applied to the select input of multiplexer 4761. Therefore, in the event that background level b exceeds background level c, then the output level produced by comparator 4757 is high which instructs multiplexer 4761 to route background level c to leads 4763. Alternatively, in the event that background level c exceeds background level b, then the output level produced by comparator 4757 is low which instructs multiplexer 4761 to route background level b to leads 4763. The value appearing on leads 4763 then becomes part of the address supplied to look-up table 4768.

Now, once the full address is applied to table 4768 and in response to appropriate clock and control signals (not shown), the RAM circuits that form look-up table 4768 access an appropriate pre-stored value of function f (stored in two's complement form) and applies it to leads 4770. This value is routed as one input to adder 4775. The other input to the adder is the minimum value, min(b,c), produced by multiplexer 4761. The output of this adder appearing on leads 4777 is the background value for the current pixel V. This value is then clocked into latch 4779 which imparts a one pixel delay to this value. The resulting value clocked out of latch 4779 is used as the background value for the previous pixel and hence is routed, via leads 4781, to respective inputs of comparator 4757 and multiplexer 4761. The output of latch 4779 is clocked through latch 4783 in order to impart an additional pixel delay to the output. This additional delay synchronizes the output of background tracker 475, which is applied as one input to summer 473 (see FIGS. 2A and 2B), to that of noise tracker 467 which is applied to the other input of this summer.

After each time the line store is accessed to provide a background value, the current background value is stored therein. Specifically, once the line store generates a background value, appropriate clock and control signals (not shown) are applied to latch 4755 (see FIGS. 11A and 11B) to cause the current background value then appearing on leads 4777 to be stored in the latch and appear on leads 4753. Thereafter, appropriate clock and control signals (such as line store write among others not shown) are applied to line store to cause the current background value appearing on leads 4753 to be written into the line buffer at the location given by the current value of the horizontal pixel address, XCNT.

Look-up table 4768 is loaded, by microcomputer system 485 with appropriate values of function f during system initialization, specifically through execution of block 1410 in main loop 1400 (see FIG. 14 which will be discussed in detail shortly). First, the microcomputer system sets the level of a select signal applied to multiplexers 4765 and 4767, shown in FIGS. 11A and 11B as the "B.T. Address Select" signal, to an appropriate level to instruct both multiplexers to route the addresses appearing on bus 4877 and applied to input INB of each multiplexer, instead of the current pixel level appearing on leads 447 and the min(b, c) value appearing on leads 4763, to the address inputs of look-up table 4768. Next, the microcomputer system applies an appropriate address to address bus 4877 which is, in turn, routed through multiplexers 4765 and 4767 to look-up table 4768. Thereafter, the microcomputer system accesses a value of the function f that has been stored within its resident memory and applies this value to data bus 4875. Once this has occurred, the microcomputer applies an appropriate select signal ("B.T. Select") to latch 4772 to store the data appearing on bus 4875 into the latch and then route the data to leads 4770 as input to look-up table 4768. Thereafter, the microcomputer system applies an appropriate write signal ("B.T. Write") to look-up table 4768 to cause the RAM circuits used therein to store the data value at the appropriate address within the table. For the next data value of function f, the microcomputer system changes the address, accesses the new data value from its resident memory, applies this data value to data bus 4875, stores the data into latch 4772 and then instructs the RAM memory that forms look-up table 4768 to appropriately store this data value, and so on for each successive value of function f.

Figure 12B:
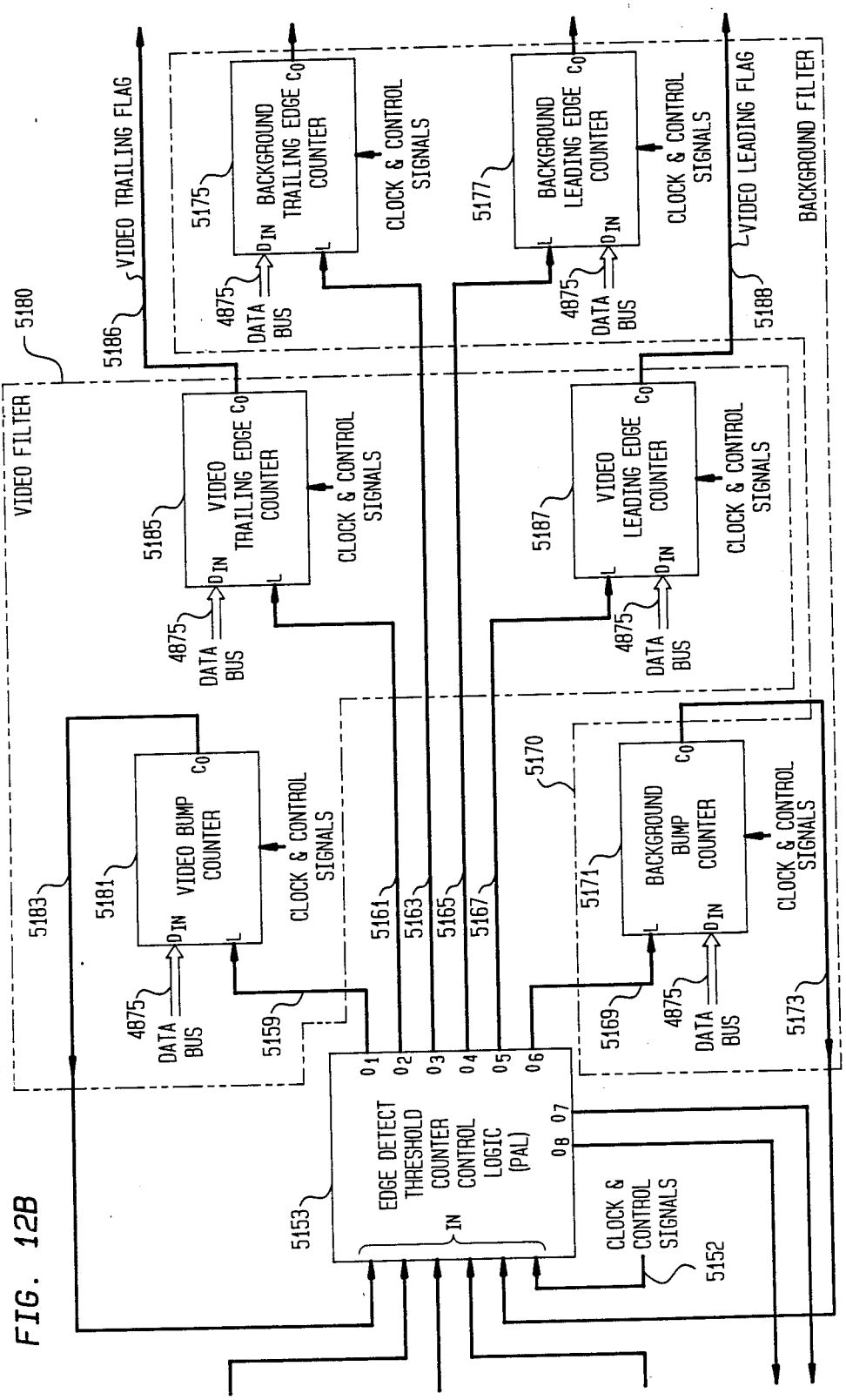
Figure 12C:
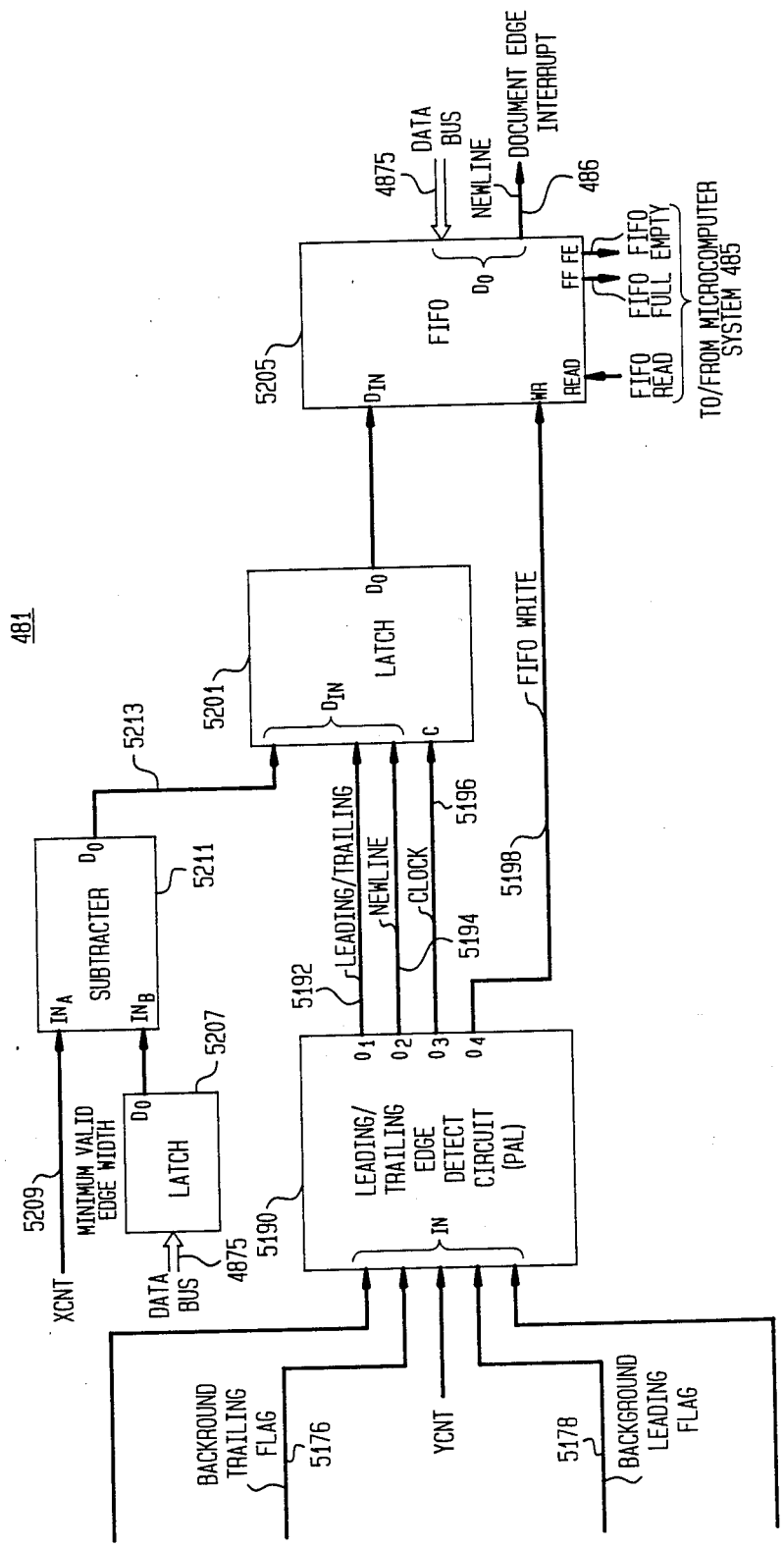

A block diagram of document edge detection circuit 481 is collectively depicted in FIGS. 12A–12C, for which the correct alignment of the drawing sheets for these figures is shown in FIG. 12. Document edge detection circuit 481, as noted above, detects edges in each scan line in the scanned image. For each such edge, the circuit supplies the associated pixel location (XCNT value) of that edge to microcomputer system 485, via address and data busses 487, for subsequent use by the microcomputer system in determining which ones of these edges for any given scan line are the actual leading and trailing edges of the document for that scan line.

In essence, circuit 481 functions by comparing background values and center pixel values against threshold values and using the results of those comparisons to control various counters. One set of these counters forms a video filter which detects valid edge transitions in the video signal (incoming center pixel values) while removing spurious transitions due to noise that would otherwise appear in the video signal. Another set of these counters forms a background filter which detects valid edge transitions in the background values while removing spurious transitions due to noise that would otherwise appear in the background values. The output of various ones of these counters are then applied to a leading/trailing edge detect circuit which determines, based upon these outputs, whether a valid leading or trailing edge has, in fact, occurred in the current scan line. If such a valid edge has occurred, then the detect circuit generates suitable control signals to store the pixel position (XCNT value) of that edge within a first-in first-out (FIFO) memory circuit. Once the entire scan line has been processed, circuit 481 generates a document edge detection interrupt on lead 486. In response to this interrupt, the microcomputer system accesses all the edge locations from the FIFO and then determines the location of the actual leading and trailing edge pair of the scanned document for the current scan line.

Specifically, within circuit 481, incoming background values, appearing on leads 474 or center pixel values (video values) appearing on leads 447, are routed to one input of each of comparators 5137, 5141 and 5145. These comparators compare both the video and background levels to two different threshold levels: a "cutoff" level appearing on leads 5130 and an "actual cutoff" level appearing on leads 5113. Generally speaking, the background level follows the video level. In particular, the background values closely track any increase in the video values but respond somewhat slower to any decrease in the video values. In contrast, the cutoff level very slowly tracks both the video and background levels, typically falling one count over the span of several hundred pixels and rising approximately ten times more slowly. Inasmuch as the background level often rises or falls above the cutoff level making the results of a comparison against the cutoff level somewhat erratic, the actual cutoff level has a value that is consistently lower than the cutoff value by a pre-defined offset value, typically 10 counts. In this manner, the background level generally remains above the actual cutoff value thereby eliminating any erratic performance due to noise. Comparing the background values against two separate threshold levels provides a check on system performance which advantageously reduces erratic response. Both cutoff levels are produced by cutoff values generating circuit 5100, which will be discussed in detail below. Comparator 5141 compares the video values [values of center pixel (X+1, Y)], appearing on leads 447, against the cutoff value.

Now, in order to determine whether a valid edge has occurred in the scanned image, the outputs of the three comparators are used to control six separate counters. Three of these counters, specifically video bump counter 5181, video trailing edge counter 5185 and video leading edge counter 5187, collectively form video filter 5180. The remaining three counters, specifically background bump counter 5171, background trailing edge counter 5175 and background leading edge counter 5177, collectively form background filter 5170. The video and background filters provide two functions: (a) they determine whether a detected edge in the video or background level, respectively, spans a sufficiently long interval in the scanned image, i.e. whether the edge transition itself in the video or background level, respectively, is followed by a sufficiently wide interval of pixels all having the same value (the minimum valid edge width); and (b) filter out transitions that are too short (less than or equal to the maximum noise edge width) and hence attributable to noise.

For example, a leading edge in the video signal is defined to be a rising transition in the video signal followed by at least a preset number of, typically 20 pixels (the minimum valid edge width), all having a value in excess of the cutoff value. Now, if such an edge does not span a predefined minimum distance, typically at least "5" pixels wide (the maximum noise edge width), then the edge is viewed as noise and hence ignored. Alternatively, a trailing edge in the video signal is defined to be a falling transition in the video signal followed by again a preset number of, also typically "20", pixels all having a value lower than the cutoff value. If the trailing edge does not span a distance of at least "5" pixels, then this edge is viewed as noise and ignored. Similarly, the background filter determines whether a detected edge in the background values lasts sufficiently long through use of the same pixel distances.

Now, with this understanding in mind, the outputs of comparators 5137, 5141 and 5145 are routed via respective leads 5139, 5143 and 5147 to associated inputs of edge detect threshold control logic 5153. This logic is typically implemented using programmable array logic. The array stores pre-defined logical functions and operates as a finite state machine in defining the manner in which the counters in video filter 5180 and the counters in background filter 5170 operate as well as the direction (increase/decrease) in which the cutoff value changes. Specifically, whenever an edge transition is detected, by virtue of a level change in one or more of the comparator outputs, the appropriate background or video leading or trailing counter 5185 or 5175, or 5177 or 5187 is loaded with the pre-set value, i.e. "20", by circuit 5153, which generates appropriate signals appearing on output lead 5161 or 5163, or 5165 or 5167. Illustratively, a leading edge is defined to occur when the video values decrease below the cutoff and actual cutoff values. A trailing edge, in contrast, is illustratively defined to occur when both the video and background values increase above the cutoff levels. At the same time, circuit 5153 causes either video bump counter 5181 or background bump counter 5171 to be loaded with the predefined minimum distance value, typically "5" pixels. The contents of all the other counters remain at zero. For example, if the output level produced by comparator 5141 falls, thereby indicating that a leading edge in the video level occurs, then logic 5153 generates a pulse on lead 5167 to load counter 5187 with the value "20" and also generates a pulse on lead 5159 to load the value "5" into video bump counter 5181. Likewise, if a trailing edge in the video occurs, then logic 5153, in response to a rising level change in the output signal produced by comparator 5141, generates a pulse on lead 5161 to load counter 5185 with the minimum valid edge width, i.e. the value "20", and generates a pulse on lead 5159 to load the maximum noise width value, i.e. the value "5", into the video bump counter. Similarly, if a background leading or trailing edge is detected, then only either counters 5171 and 5177, or counters 5171 and 5175 are loaded with the appropriate initial values.

Now, during each successive pixel following the edge transition, each counter that has been loaded with an initial value is decremented by one. In the event another edge transition occurs within the first five pixels, then logic 5153 will merely generate appropriate pulses at certain of its outputs to cause all the appropriate counters to re-load themselves with the minimum valid edge width value thereby effectively ignoring this edge transition. Alternatively, if another edge transition occurred after but not during the first five pixels (the maximum edge noise width), then, depending upon whether the edge transition occurs in either the video or background level, either video bump counter 5181 or background bump counter 5171 will underflow (roll over) and generate a pulse on its carry output, $C_O$, terminal. The carry outputs of both bump counters 5171 and 5181 are fed back over leads 5173 and 5183, respectively, to corresponding inputs of logic 5153 in order to signify that the present edge transition is a potentially valid edge and that further decrementation for each subsequent pixel should continue.

Now, if the detected edge continues for at least the minimum valid edge width, i.e. the number "20", then that one of the four remaining counters in the video and background filters that has most recently been loaded with the minimum valid edge width value will eventually underflow, i.e. roll over through zero, and generate a pulse on its associated carry output, $C_O$, terminal. For example, if a video leading edge transition was initially detected based upon a level change present in the output of comparator 5141, then video leading edge counter 5187 will have been loaded with the value "20" and subsequently decremented with each successive pixel until the contents of this counter underflows and causes a carry out pulse to be generated which will appear on lead 5188 as the "Video Leading" flag. Likewise, if a transition signifying a video trailing edge, a background leading edge or a background trailing edge was initially detected, based upon level changes in the output signals produced by comparators 5137, 5141 or 5145, and the edge was at least "20" pixels wide, then the contents of video trailing edge counter 5185, background leading edge counter 5177 or background trailing edge counter 5175 would, as the result of subsequent decrementation, eventually underflow and produce a carry out pulse. This pulse would appear on leads 5186, 5178 or 5176 as the "Video Trailing" flag, the "Background Leading" flag or the "Background Trailing" flag, respectively.

All four flags along with the current value of the vertical pixel address, YCNT, are applied as input, through leads 5186, 5176, 5178 and 5188, to leading/trailing edge detect circuit 5190. This circuit is also implemented using programmable array logic (PAL). This circuit is pre-programmed with pre-defined logical functions that categorize a valid detected edge as a leading or trailing edge, based upon the status of these four flags and the vertical pixel address, YCNT. Specifically, if both the video and background leading flags are high, then this indicates that an actual leading edge has just been detected in the current scan line. In this case, circuit 5190 produces a high level on leading/trailing lead 5192 (PAL output $O_1$) which, in turn, is routed to an appropriate data input terminal of latch 5201. Alternatively, if both the video and background trailing flags are high, then this indicates that an actual trailing edge has just been detected in the current scan line. Consequently, here, circuit 5190 produces a low level on leading/trailing edge lead 5192. At the same time either of these events occur, circuit 5190 also produces a clock pulse on clock lead 5196 (PAL output $O_3$). This clock pulse is routed to the clock input of latch 5201 and causes the horizontal pixel location occurring at the start of the detected edge to be stored into latch 5201. This location is equal to the current value of horizontal pixel address XCNT less the minimum valid edge width value, i.e. the decimal value "20". Specifically, during system initialization, the minimum valid edge width value is applied to data bus 4875 and then stored in latch 5207 by the microcomputer system. Thereafter, this value is applied to one input, $IN_B$, of subtracter 5211 while the current value of the horizontal pixel address, XCNT, is applied to the other input, $IN_A$ of the subtracter. Hence, whenever a valid edge is detected, the output of subtracter 5211, appearing on leads 5213, is the location of the pixel situated at the start of the edge transition. This location is applied to appropriate data input terminals of latch 5201 to be clocked into this latch whenever a valid edge has been detected. The output of the latch, namely the edge location and whether it is a leading or trailing edge, is routed to the data inputs of FIFO memory circuit 5205. During the next pixel interval, leading/trailing edge detect circuit 5190 generates a pulse at output terminal 04 which is, in turn, applied, via FIFO write lead 5198, to the write enable input of FIFO 5205. This pulse causes the FIFO to store the value then being applied to its data input terminals. This process is repeated for each successive detected edge on the current scan line such that all the edge locations for its line are stored within FIFO 5205. Now, once this entire line has been processed, circuit 5190 generates a pulse on NEWLINE output lead 5194 (PAL output lead $O_2$). This pulse, which signifies that another scan line is about to be processed, is stored in the FIFO and serves to demarcate edge location data for different scan lines. The FIFO provides the pulse on NEWLINE lead 486 as the document detection interrupt to the microcomputer system. In response to this interrupt signal, the microcomputer system reads the contents of the FIFO to obtain the leading/trailing edge locations stored therein. A NEWLINE pulse will be generated regardless of whether any edges where detected in the previous scan line. The microcomputer system is connected through appropriate leads (not shown) to various control terminals of the FIFO; namely, FIFO Read, FIFO Full and FIFO Empty, and utilizes these control terminals to read the contents of the FIFO. The edge locations provided by the FIFO are applied, via various data output ($D_O$) terminals, to data bus 4875 and from there to the microcomputer system.

As discussed above, cutoff values generating circuit 5100 provides the values of the cutoff and actual cutoff levels for use by comparators 5137, 5141 and 5145. These cutoff values, as noted above, vary with time and slowly track both the video and background values. Specifically, within circuit 5100, the cutoff value is generated through arithmetic logic unit (ALU) 5125, counter 5133 and latch 5129 along with add register 5117 and subtract register 5121. During system initialization, pre-defined constants, which will be subsequently used to increment and decrement the cutoff value, are stored in add register 5117 and (in twos complement form to implement subtraction) in subtract register 5121 by the microcomputer system, via data bus 4875. Also during system initialization, the microcomputer system stores, via data bus 4875, an initial cutoff value within cutoff counter 5133. Now, if, during processing of any pixel in the scanned image, the background value for that pixel is greater than the cutoff level, as indicated by the output level produced by comparator 5145, then the cutoff level is too low and needs to be incremented. Consequently, logic circuit 5153 applies a level change, via output terminal $O_7$, to output lead 5157. This causes add register 5117 to apply its contents to its data output ($D_O$) terminals which, in turn, are connected to an input, $IN_2$, of ALU 5125. The other input, IN1, of the ALU receives through latch 5129 and feedback leads 5127, the previous output provided by the ALU. The ALU adds the two values present at its two inputs together. If the result causes an overflow in the ALU, a carry out pulse is generated by the ALU and applied to the clock input ("c") of counter 5133. Inasmuch as the add signal, provided over lead 5157 by circuit 5153 and applied to the Up/Down input of counter 5133, is now high, counter 5133 now increments its contents by one. The output of this counter, appearing on leads 5130, is the cutoff value.

Now, alternatively, in the event the background value is less than the cutoff level for the pixel presently being processed, as indicated by the output level produced by comparator 5145, then the cutoff level is too high and needs to be decremented. In this case, logic circuit 5153 applies a level change, via output terminal $O_8$, to output lead 5155. This causes subtract register 5121 to apply its contents to its data output (DO) terminals which, in turn, are connected to input $IN_2$ of ALU 5125. The ALU then basically decrements its output by the contents of subtract register 5121. If the result causes an underflow in the ALU, a carry out pulse is generated by the ALU and applied to the clock input of counter 5133. Inasmuch as the add signal, provided over lead 5157 by circuit 5153 and applied to the Up/Down input of counter 5133, is now low, counter 5133 decrements its contents by one and thereby reduces the cutoff value appearing on leads 5130. Inasmuch as the incremental amount stored in and supplied by add and subtract registers 5117 and 5121 is generally quite small, the cutoff level changes very slowly.

As will now be explained below, any change upward or downward in the cutoff value causes the same change in the actual cutoff value. Specifically, to generate the actual cutoff value appearing on leads 5113, the cutoff value appearing on leads 5130 is routed to one input of subtracter 5107. The other input is provided by register 5103. This register is loaded by the microcomputer system, during system initialization and via data bus 4875, with the pre-defined value, typically 10 counts, of the offset between the cutoff and actual cutoff values. Subtracter 5107 subtracts the offset value from the cutoff value and applies the result as input data to latch 5111. This resulting value is then clocked into the latch, by clock signals (not shown), and thereafter appears on leads 5113 as the actual cutoff value.

Figure 13B:
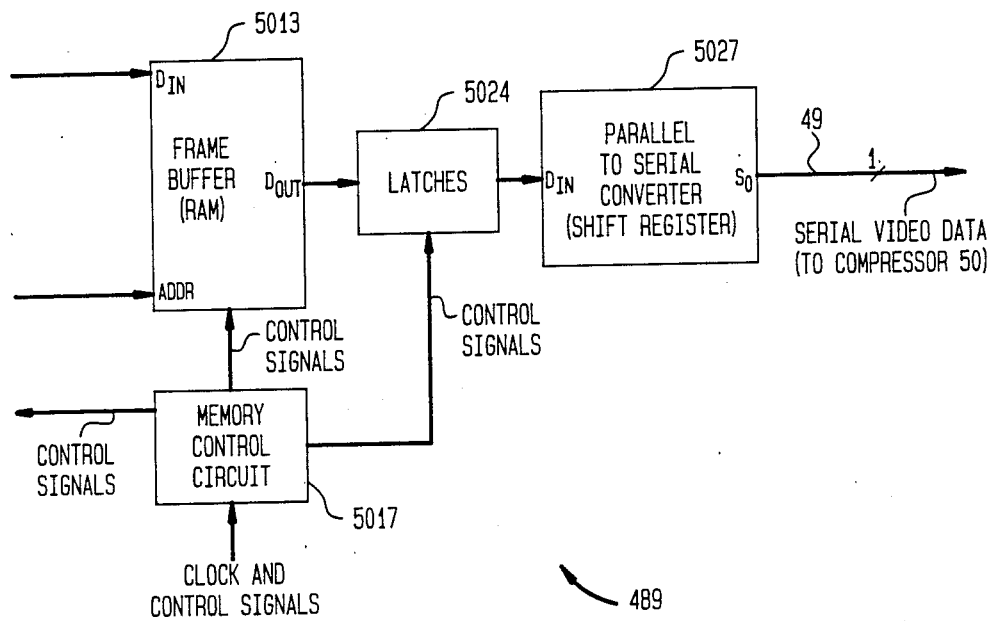

A block diagram of windowing frame buffer 489 is collectively depicted in FIGS. 13A–13B, for which the correct alignment of the drawing sheets for these figures is shown in FIG. 13. In essence, as noted above, all the pixel values that form any scanned image are first stored within windowing frame buffer 489. Thereafter, the starting address of the first pixel location in the escribing rectangle (upper left hand corner) and the horizontal and vertical sizes of the rectangle, as determined by the microcomputer system, are appropriately loaded into the windowing frame buffer. Once this has occurred, the windowing frame buffer performs a video masking operation to read out all the pixel values located on and within the edges of the escribing rectangle. The resulting pixels are applied, in serial form, via lead 49, to compressor 50.

As noted above, all the filtered center pixel values provided by noise detection and filter circuit 463 (see FIGS. 2A and 2B) that form the scanned image are first stored within frame buffer 5013 before any masking operation occurs on this image. To store pixel information for a scanned image within the frame buffer, memory control circuit 5017 applies appropriate control signals to address selector 5009 to route the collective address produced by both X address counter 4891 and Y address counter 4894 to the address inputs of frame buffer 5013. The frame buffer is preferably implemented using RAM circuits of sufficient capacity. An incoming pixel value, appearing on lead 47, is then routed to serial to parallel converter 5005, which is preferably implemented using an appropriately sized shift register. Under the control of appropriate system clock signals (not shown), converter 5005 converts a group of several successive incoming single bit pixel values into parallel form and applies the resulting parallel value to the data inputs, $D_{in}$, of frame buffer 5013. Once this has occurred, memory control circuit 5017 applies appropriate control signals to the frame buffer to invoke a write operation and thereby store the pixel values at the address then appearing on its address inputs and supplied by both X and Y address counters 4891 and 4894. Once this write operation has occurred, the contents of X address counter 4891 are incremented by one in preparation to store the next group of successive incoming pixel values on the current scan line. After an entire row in the frame buffer is filled, the contents of the X address counter roll over to zero and the Y address counter are incremented by one in preparation to store pixels in the next row. This process is iteratively repeated until the last pixel located on the last scan line in the scanned image has been written into the frame buffer at which point both the X and Y address counters are reset to zero in preparation to store the next scanned image. Counters 4891 and 4894 are clocked by appropriate pixel clocks provided by control circuitry 493 (see FIGS. 2A and 2B).

Now, to read pixel values located on and within the escribing rectangle, the microcomputer system loads, utilizing data bus 4875 and address bus 4877, x and y memory addresses corresponding to the location of the starting pixel of the escribing rectangle into X window address counter 4995 and Y window address counter 5001, respectively. Thereafter, the microcomputer, again utilizing the address and data busses, loads the horizontal size (width), measured in memory locations, of the escribing rectangle into X window size counter 4991 and the vertical size (length), measured in memory rows (scan lines), into Y window size counter 4997. Once these operations have occurred, the pixels stored within frame buffer 5013 and located on and within the top, bottom, left and right edges of the escribing rectangle are then read. Specifically, to read the desired pixels stored frame buffer 5013 (i.e. perform a video masking operation), appropriate control signals are applied by memory control circuit 5017, to route pre-defined control signals to address selector 5009, typically implemented by a multiplexer, in order to select the X and Y memory addresses of the starting pixel location stored within counters 4995 and 5001. These addresses are then routed through address selector 5009 to the address inputs of the frame buffer. Thereafter, memory control circuit 5017 provides appropriate control signals to the frame buffer to invoke a read operation at the address then appearing on its address inputs. The group of pixel values provided at the data output terminals, $D_{out}$, of the frame buffer are then clocked within latches 5024 by appropriate control signals provided by memory control circuit 5017. Thereafter, the value stored within latches 5024 is applied in parallel to the input of parallel to serial converter 5027 (typically a shift register) which, using appropriate system clock signals (not shown) then converts the parallel value into bit serial form which, in turn, is applied, via lead 49, to compressor 50. Now, once this memory location has been read, the contents of counter 4991 are decremented by one and the contents of counter 4995 are incremented by one. This, in turn, addresses the next group of pixel values on the first scan line in the escribing rectangle. The frame buffer is appropriately instructed to perform a read operation at this new address. This process continues until the end of the scan line has been read. When this occurs, the contents of counter 4991 which has been decremented to zero then roll over which, in turn, causes a pulse to appear on end of scan line lead 4993. This pulse causes counter 4995 to reload the value of the starting X address in preparation for reading the next scan line. At the same time, Y window address counter 5001 has been incremented by one to address the next sequential scan line in the escribing rectangle. Since a full scan line has now been read, the contents of Y window size counter 4997 are then decremented by one. Clearly, to increase the speed of windowing frame buffer circuit 489, parallel to serial converter 5027 can operate simultaneously with frame buffer 5013 such that a group of pixel values can be converted into serial form and applied to lead 49 while the next group value can be accessed from the frame buffer. In any event, the process of reading the frame buffer and converting the resulting parallel pixel values into bit serial form is iteratively repeated for each remaining group of pixels on each remaining scan line until the last group of pixels situated on the scan line has been read, converted and applied to lead 49. Once this has occurred, then the contents of counter 4997 which have, by now, been decremented to zero then roll over. This, in turn, causes a pulse to appear on end of image lead 4999 which, in turn, causes counter 5001 to cease decrementing any further. At this point, all the pixels located on and within the escribing rectangle have been read from frame buffer 5013 and routed, in serial form, to compressor 50.

C. Image Processing Software

Now having discussed the hardware used in the inventive system in detail, a detailed description of the software executed by microcomputer system 485 will now be provided.

1. Main Loop

Figure 14:
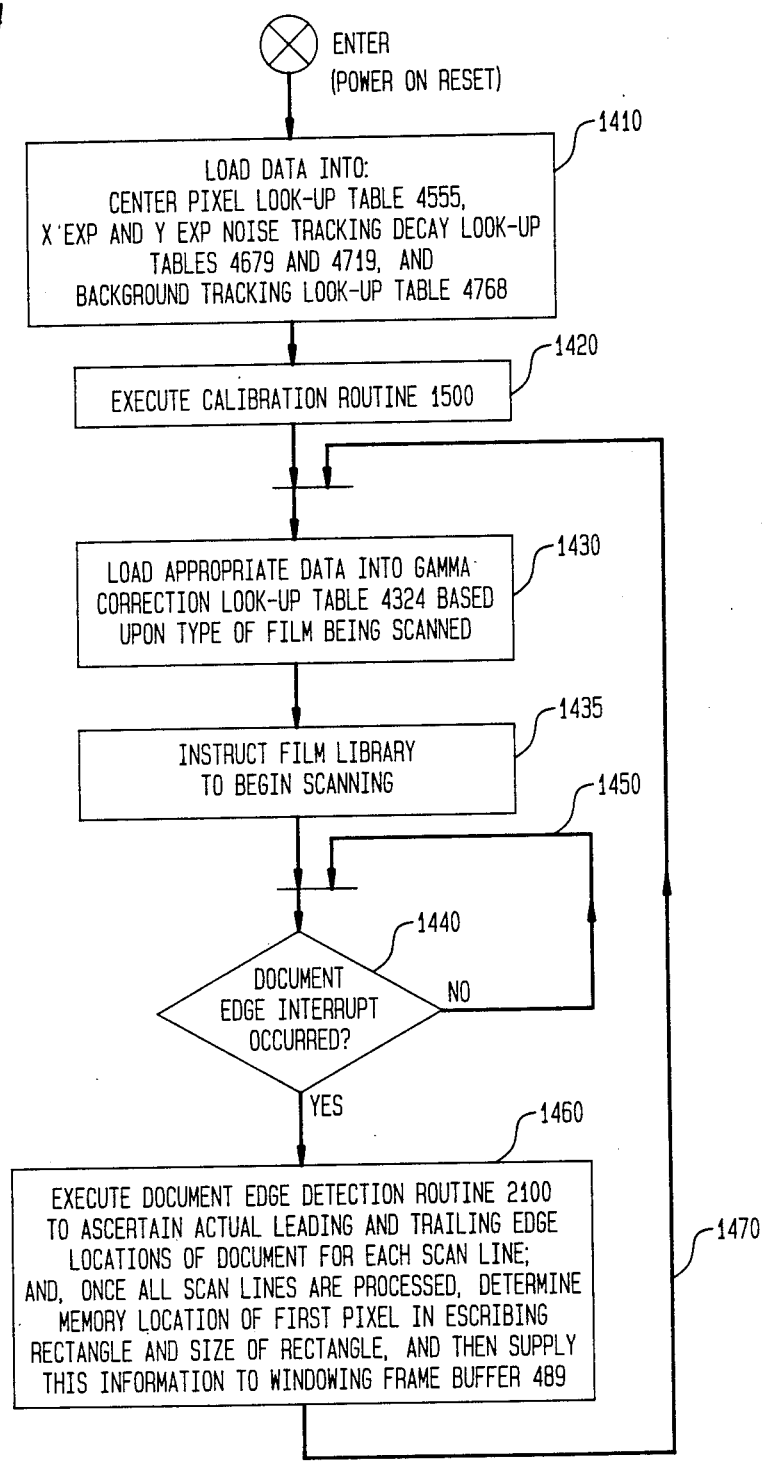
FIG. 14 depicts Main Loop 1400 executed by Microcomputer System 485 located within Image Processing Circuit shown in FIGS. 2A and 2B.

FIG. 14 depicts a flowchart of the Main Loop executed by the microcomputer system. In essence, Main Loop 1400 calibrates the system, loads look-up tables (RAMs) 4270 and 4274 in Shading Correction Circuit 426 (see FIG. 3) with appropriate data, and at each occurrence of a document edge interrupt, occurring on lead 486 (see FIGS. 2A and 2B) as discussed above, determines actual leading and trailing edges of the document for the current scan line being processed. Once all the scan lines have been processed, this routine determines the memory location of the first pixel in the escribing rectangle and the size of the rectangle. The memory address and rectangle size are then provided by routine 2100 to the windowing frame buffer.

In particular, when power is first applied to the system microcomputer system, execution enters routine 1400, as shown in FIG. 14, and proceeds to block 1410. This block accesses resident memory within the microcomputer system and transfers appropriate data therefrom into Center Pixel Look-up Table (RAM) 4555, X EXP and Y EXP Noise Tracking Decay Look-up Tables (RAMs) 4679 and 4719 and Background Tracking Look-up Table (RAM) Table 4768 all contained within Image Processing Circuit 40 (specifically see FIGS. 8, 10A and 10B, and 11A and 11B, respectively). Once this has occurred, execution is passed to block 1420 to invoke Calibration Routine 1500. This routine, as discussed in detail below in conjunction with FIG. 15, calculates appropriate gain and offset factors and stores these factors within Offset Correct Look-up Table (RAM) 4274 and Gain Correct Look-up Table (RAM) 4270 for subsequent use by Shading Correction Circuit 426 in correcting scanned microfilm images for side-to-side shading differences. Once block 1420 fully executes, execution passes to block 1430. This block, determines the type of microfilm that is to be scanned (silver positive, silver negative, diazo or vessicular) from information supplied by the film library and, in response to this information, copies an appropriate table of gamma correction factors from resident memory within the microcomputer system into Gamma Correct Look-up Table (RAM) 4324 situated within Gamma Correction Circuit 432 (see FIG. 4). During this time, the film library also loads an appropriate roll of microfilm that is to be scanned into an available microfilm scanner.

Now, once the gamma table has been fully copied, system calibration and initialization is complete, and microfilm scanning can begin. Therefore, execution passes to block 1435 which, when executed as shown in FIG. 14, provides a signal (over a lead not shown) to the film library to begin scanning. Once this occurs, execution proceeds to block 1440. Now, as noted above, each incoming scanned pixel is processed by pre-scan processing circuit 42 and by image enhancement circuit 44 (see FIGS. 2A and 2B). However, edge detection does not occur until an entire line of pixels has been scanned. Consequently, microcomputer system 485 waits for an interrupt to occur over line 486 (see FIGS. 2A and 2B) by re-executing decision block 1440 (see FIG. 14). This interrupt signals that an entire scan line has been processed and leading and trailing edge pair(s) have been stored within document edge detection circuit 481, as described above, for use by the microcomputer system. When this interrupt occurs, execution proceeds, via the "YES" path emanating from decision block 1440, to block 1460. This block invokes Document Edge Detection Routine 2100 to access the leading/trailing edge pairs stored within the document edge detection circuit and appropriately process these pairs, in the manner described in detail below in conjunction with FIGS. 21A–21C, to ascertain the actual document leading and trailing edge locations (boundaries) for the current scan line and, once all the scan lines have been processed, a memory address for the first pixel in the escribing rectangle and the size of the rectangle. Once all first pixel address and rectangle size have been determined, routine 2100 passes this information to windowing frame buffer 489 (see FIGS. 2A and 2B) to mask all areas appearing outside the rectangle and thereby transfer the processed pixels located on and within the escribing rectangle to video compressor 50 (see FIGS. 2A and 2B). Once Document Edge Detection Routine 2100 completes its execution, execution loops back, as shown in FIG. 14 via path 1470, to block 1430 in preparation for processing the next scan of an image.

2. System Calibration Routines

A flowchart of Calibration Routine 1500 is depicted in FIG. 15. This routine calculates appropriate gain and offset factors and stores these factors within Offset Correct Look-up Table (RAM) 4274 and Gain Correct Look-up Table (RAM) 4270 for subsequent use by Shading Correction Circuit 426 (see FIG. 3) in correcting scanned microfilm images for side-to-side shading differences.

Upon entry into this routine, execution passes to block 1510 to initialize various variables. Once this occurs, the microcomputer instructs the film library, as discussed in detail below, to scan an image without any microfilm present in the scanner. One such scan occurs with illumination lamp 7 (see FIG. 1) "off" to fabricate a table of offset correction factors, and a second scan occurs with the illumination lamp "on" to fabricate a table of gain correction factors. These tables are then stored within appropriate RAM look-up tables located within Shading Correction Circuit 426 (see FIG. 3).

Specifically as shown in FIG. 15, once all the appropriate variables have been initialized, execution passes to block 1520 to invoke Lamp Off Correction Routine 1600, which will be discussed in detail in conjunction with FIGS. 16A and 16B below, to perform a lamp off scan and determine a table of offset correction values. Thereafter, execution proceeds to block 1530, to invoke Lamp Off Diagnostic Routine 1700, which is discussed in detail below in conjunction with FIGS. 17A and 17B, to perform various diagnostic tests with the lamp off and thereby partially test performance of the optics located in the microfilm scanner. Now, once these diagnostic tests have been completed, execution proceeds to block 1540 to invoke Lamp On Correction Routine 1800. This routine, as discussed in detail below in conjunction with FIGS. 18A–18C, performs a lamp on scan and determines a table of gain correction values. Thereafter, execution proceeds to block 1550, which when executed, invokes Lamp On Diagnostic Routine 2000. This routine, when executed and as discussed in detail in conjunction with FIG. 20 below, performs various diagnostic tests with the lamp on and provides other diagnostic test information concerning the performance of the optics located in the microfilm scanner. Now, once routine 2000 has fully executed, execution proceeds to block 1560 to store the offset and gain correction tables, determined through routines 1600 and 1800, in appropriate files located within resident storage (such as disk storage) contained within the microcomputer system. Once this occurs, Calibration Routine 1500 has fully executed and hence execution then returns to Main Loop 1400.

Figure 16B:
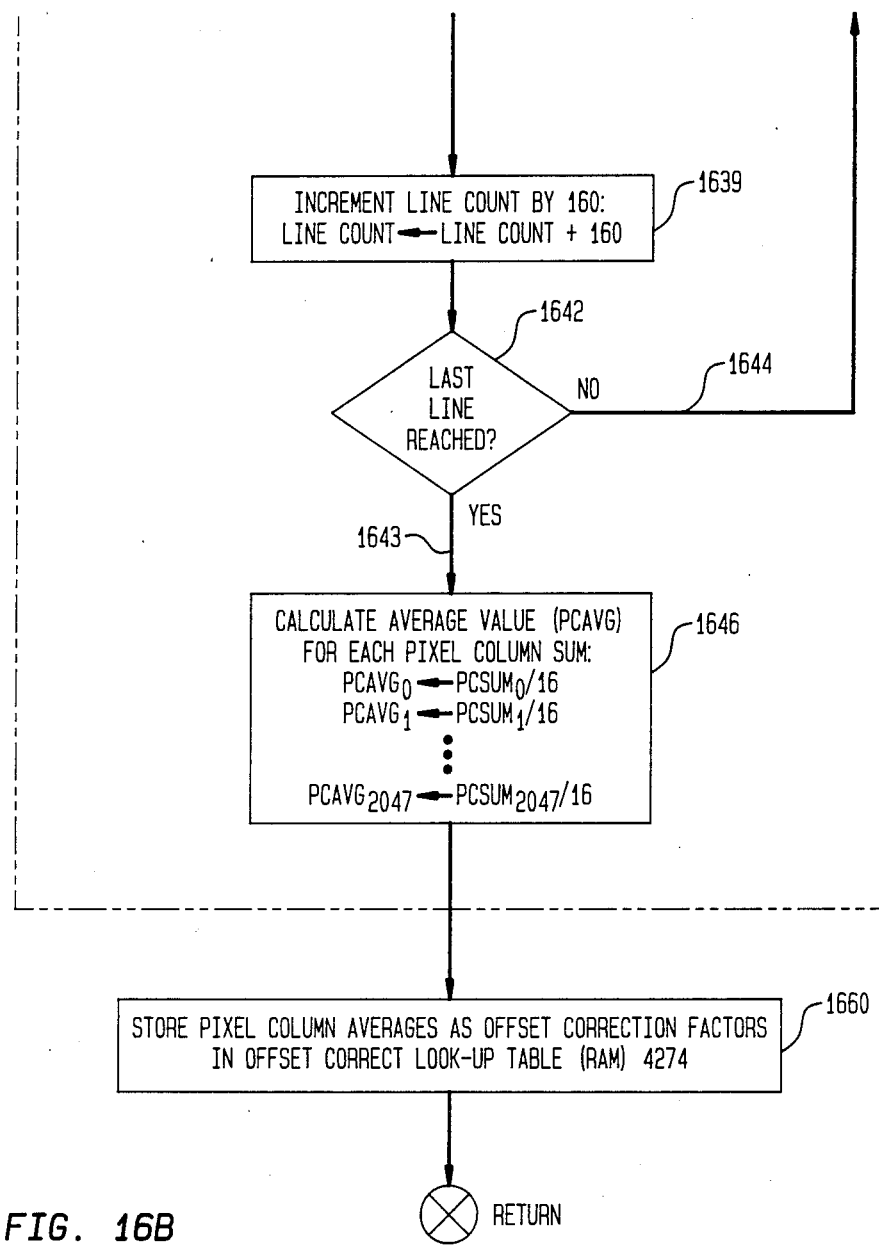

A flowchart of Lamp Off Correction Routine 1600 is depicted in FIGS. 16A and 16B, for which the correct alignment of the drawing sheets for these figures is shown in FIG. 16. This routine performs a lamp off scan, determines a table of offset correction values and stores this table in Offset Correct Look-up Table (RAM) 4274 located within Shading Correction Circuit 426 (see FIG. 3).

Upon entry into routine 1600, as shown in FIGS. 16A and 16B, execution first proceeds to block 1610. This block, when executed, appropriately sets the level of the Lamp On/Off signal produced by microcomputer system 485 to instruct Lamp Driver 5 (see FIG. 1) to energize illumination lamp 7. Thereafter, with the lamp fully illuminated and no film in the microfilm scanner, execution proceeds to pixel column averaging routine 1640 which calculates, through averaging, an appropriate side-to-side offset correction factor for each one of the 2048 pixels in a scan line. Once routine 1460 is executed, block 1660 executes to store all 2048 offset correction factors into Offset Correct Look-up Table (RAM) 4274. Execution then exits from Lamp Off Correction Routine 1600 and returns to Calibration Routine 1500 (see FIG. 15).

In essence, a side-to-side offset correction factor, for each pixel in a scan line, is calculated to be the averaged value of corresponding vertically aligned pixels (pixel column averaging) appearing in each one of 16 uniformly spaced scan lines located throughout an image of 2560 scan lines. Specifically, upon entry into Pixel Column Averaging Routine 1640, execution first proceeds to block 1620. This block, when executed, instructs the microfilm scanner to scan an image and store the results. Thereafter, block 1622 executes to set the line sum (LSUM) to zero. Next, block 1624 executes to set the values of pixel sum (PSUM), the contents of a line counter (LINE COUNT) and each of 2048 individual pixel column sums ($PCSUM_0$, $PCSUM_1$, ..., $PCSUM_{2047}$) to zero.

At this point, execution proceeds to block 1626 to add the value of the current pixel ($P_n$) into the pixel sum (PSUM) for on the current scan line. Once this has occurred, execution is passed to decision block 1629 which determines whether the end of the current scan line has been reached. If not, then execution is routed, via "NO" path 1631 emanating from this decision block, back to block 1626 in order to process the next pixel on the current scan line. Alternatively, if the end of the current scan line has been reached, then execution proceeds, via "YES" path 1630 emanating from decision block 1629, to block 1637 which adds the value of each pixel in the current scan line to its corresponding column sum of pixels, $PCSUM_0$, $PCSUM_1$, ..., $PCSUM_{2047}$ Thereafter, execution proceeds to block 1639 to increment the value of the line counter, LINE COUNT, which points to the current scan line being processed by routine 1640, by the decimal value "160". Once this occurs, execution is passed to decision block 1642 which determines whether the last scan line in the image, i.e. scan line number 2560, has been processed. If not, then execution is routed, via "NO" path 1644, back to block 1626 to process the next scan line. Alternatively, if the last scan line has been processed, then decision block 1646 routes execution, via "YES" path 1643, to block 1646. This latter block, when executed, calculates the pixel column average value (PCAVG) by dividing the sum of 16 pixels for each corresponding pixel location by the decimal value "16". Each resulting pixel column average value is the side-to-side shading offset correction factor for that corresponding pixel location. Once all the average values have been calculated, execution then exits from routine 1640 and proceeds to block 1660, as discussed above.

Figure 17B:
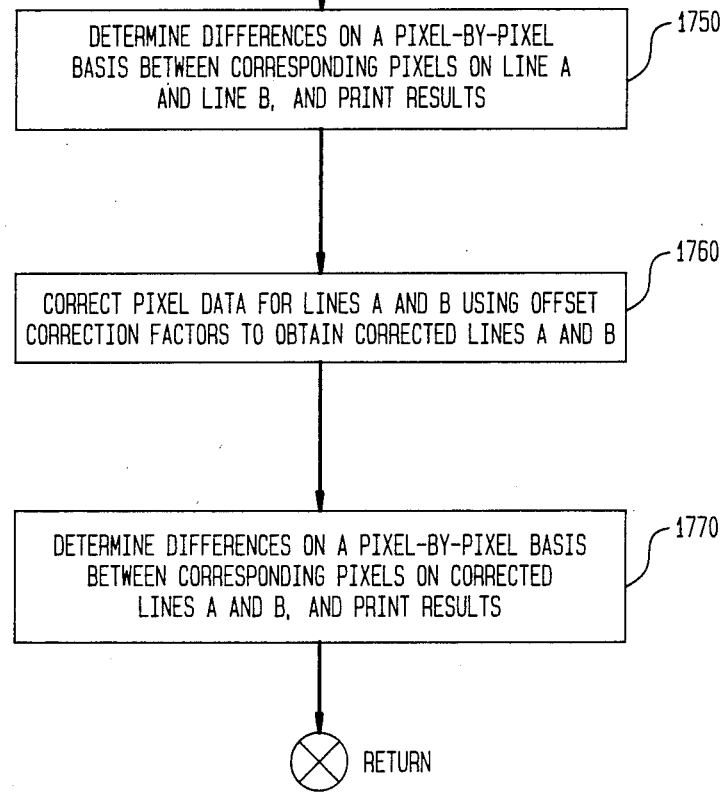

A flowchart of Lamp Off Diagnostic Routine 1700 appears in FIGS. 17A and 17B, for which the correct alignment of the drawing sheets for these figures is shown in FIG. 17. Essentially, this routine performs various diagnostic tests with the lamp off and thereby partially tests the performance of the optics located in the microfilm scanner.

Specifically, upon entry into routine 1700, execution passes to block 1710 which determines the maximum and minimum pixel column average values, i.e. the highest and lowest amounts of offset noise, and the pixel locations for each of those values, and then prints this information. This information provides the system operator with the range of electronic noise in the system. If the electronics are properly functioning, then the amount of variation typically remains within 0–2 video counts. Once this information has been printed, execution proceeds to block 1720 which, when executed, instructs the microfilm scanner to scan an image. Once this first scan is completed, this block stores the resulting pixels for a specific scan line, designated as scan line SL which is typically scan line 1000, as line A. Execution then passes to block 1730 which calculates various diagnostic measures for the data obtained for line A. These measures include: minimum intensity value, maximum intensity value, mean value, standard deviation, and odd/even average value differences. The odd average is calculated by averaging all odd location pixels. The even-average is calculated by subtracting the odd-sum from the total-sum to get the even-sum, and dividing by the number of even pixels to get the even average in the scan line A. Once all these average values are computed by block 1730, then the average value of the difference between individual odd/even averages is computed. The value of the difference indicates the amount of channel offset in the CCD electronics. Once this has occurred, the results are printed for use by an operator.

Next, routine 1700 determines whether the performance of the optical scanning system varies with time and provides a measure of that variability. To do this, routine 1700 obtains a second scan of the image and compares the results for the same scan line SL that occurs in both image scans but at different points in time. Specifically, the microcomputer first waits a predefined interval of time which is typically several seconds before initiating the second scan. This wait is necessary to allow the scanner to reset itself and for any transients to settle. After this period of time elapses, execution passes to block 1740. This block, when executed, instructs the microfilm scanner to scan an image. Once this second scan is completed, this block stores the resulting pixels for scan line SL as line B. Thereafter, execution proceeds to block 1750 which determines any differences between corresponding pixels on lines A and B. Any such differences indicate time dependent variability in the optical scanning system. The results are then printed by this block for use by the operator. Once this has occurred, execution proceeds to block 1760 which corrects the scanned pixels for lines A and B using the offset correction factors that have been previously determined through Lamp Off Correction Routine 1600, as discussed above in conjunction with FIGS. 16A and 16B, to generate Corrected Lines A and B. Once this has occurred, block 1790 is executed to determine temporal differences on a pixel-by-pixel basis between the values of corresponding pixels occurring in Corrected Lines A and B. Once this has occurred, this block prints the results for use by the system operator. At this point, execution of Lamp Off Diagnostic Routine 1700 is complete and execution returns to Calibration Routine 1500.

Figure 18B:
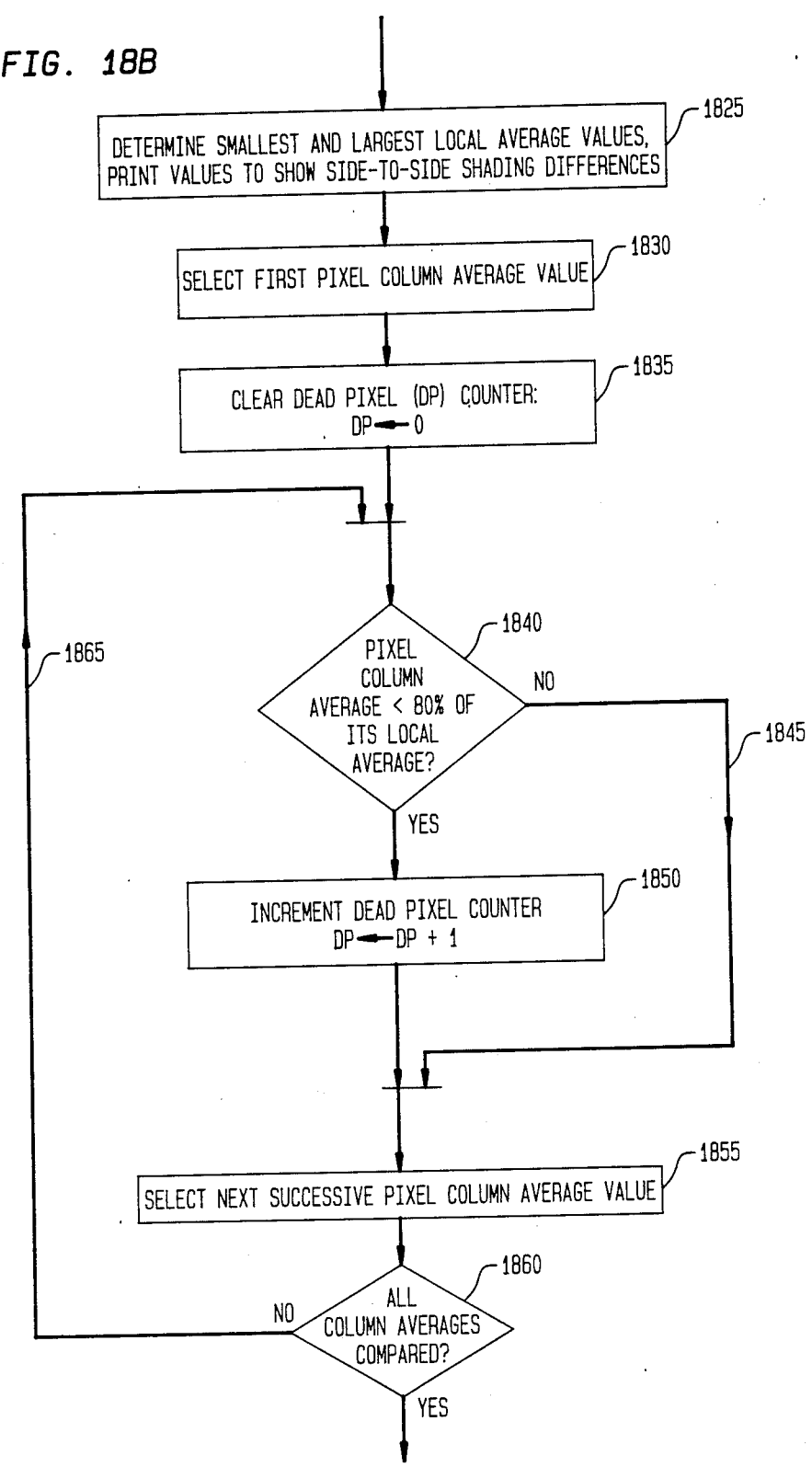
Figure 18C:
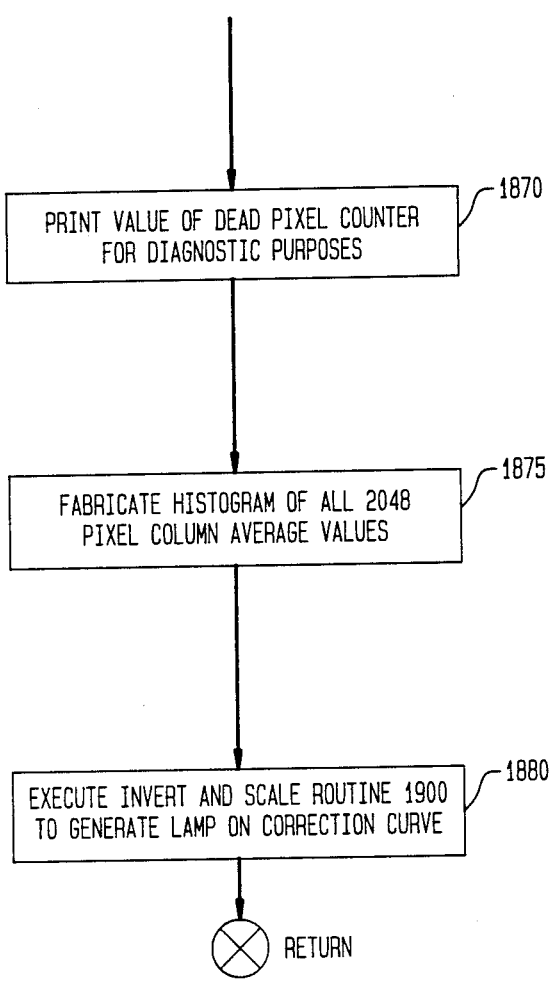

A flowchart of Lamp On Correction Routine 1800 is depicted in FIGS. 18A–18C, for which the correct alignment of the drawing sheets for these figures is shown in FIG. 18. Essentially, this routine performs a lamp on scan and determines a table of gain correction values for storage within Gain Correct Look-up (RAM) Table 4270 located within Shading Correction Circuit 426 (see FIG. 3).

Now, as shown in FIGS. 18A–18C, execution first proceeds to block 1805. This block, when executed, sets the lamp on/off signal provided by the microcomputer system to lamp driver 5 (see FIG. 1) to energize illumination lamp 7. Thereafter, execution proceeds to block 1810 which calculates pixel column averaging routine 1640 which, as discussed above in conjunction with FIGS. 16A and 16B, instructs the microfilm scanner to scan the image (here again with no film in the scanner) and calculate a pixel column average value for each of 2048 pixels in a scan line. Once all these average values have been calculated, execution proceeds to block 1813. This block, when executed, determines the location (scan line number) and values of the minimum and maximum pixel values that form each pixel column average value and then prints the results. The values thus obtained provide the system operator with data corresponding to the lamp on intensity levels and the range of vertical shading differences that occur in a scanned image. All these intensity levels should preferably carry a decimal value in the mid-50s (the range of intensity for 6 bits is from decimal values 0–63) and, in the absence of any shading abnormalities, the width of this range should be relatively narrow (typically low single digit variations). Thereafter, execution proceeds to block 1815 which calculates a local average pixel value (PLAVG) for every one of 64 groups of 32 adjacent pixel column average values. Thereafter, execution proceeds to block 1820 to find the value of the largest variation between any two pixel column average values within each of these groups. Once these values are found, block 1820 prints each of these values and the corresponding pixel locations for use by the system operator. Next, block 1825 is executed to determine the smallest and largest pixel column average values across all groups and then print the results. The difference between these values provides a measure of the side-to-side shading differences appearing in a scanned image.

Now, at this point, blocks 1835 through 1860 are executed to determine the number of "dead" pixels appearing in a scan line. A "dead" pixel is defined to be one that has a pixel column average value that is less than 80% of the its local average pixel value. Specifically, execution first proceeds to block 1835 which, when executed, clears the contents of a "dead" pixel (DP) counter, i.e. sets the contents equal to zero. Next, execution passes to block 1840 which tests a pixel column average value against its local average pixel value.

If the pixel column average value is less than 80% of its local average pixel value, then decision block 1840 routes execution, via its "YES" path, to block 1850. This latter block, when executed, increments the contents of dead pixel counter DP by one. Thereafter, execution proceeds to block 1855 which selects the next successive pixel column average value. Having done so, execution then proceeds to decision block 1860 which determines whether all pixel column average values have been compared against their corresponding local average pixel values. If not, then this decision block routes execution, via "NO" path 1865, to decision block 1840 to process the next successive pixel column average value. After every group of 64 successive pixel column average values is processed, the next successive local average pixel value is selected. Now, alternatively, if the pixel column average value being processed is within 80% of its local average value, then decision block 1840 routes execution, via its "NO" path 1845, directly to block 1855 to select the next successive pixel column average value for processing. Now, once all the pixel column average values have been processed, decision block 1860 routes execution, via its "YES" path, to block 1870. This latter block, when executed, merely prints the value stored within dead pixel counter DP for diagnostic use by the system operator. Once this occurred, execution passes to block 1875 which, when executed, fabricates a histogram of all 2048 pixel column average values. Thereafter, block 1880 is executed to invoke Invert and Scale Routine 1900, as discussed in detail in conjunction with FIGS. 19A and 19B, to invert and appropriately scale the histogram and thereby produce a table of 2048 gain correction values which collectively form the Lamp On Correction Curve and are stored within Gain Correct Look-up (RAM) Table 4270. Now, once this occurs, then execution of Lamp On Correction Routine 1800 is complete. Consequently, execution then returns to Calibration Routine 1500.

Figure 19B:
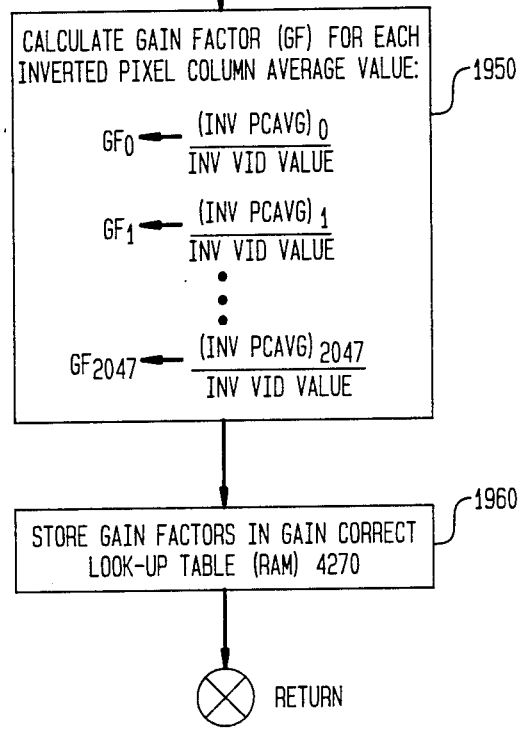

A flowchart of Invert and Scale Routine 1900 is depicted in FIGS. 19A and 19B, for which the correct alignment of the drawing sheets for these figures is shown in FIG. 19. As noted above, this routine inverts and appropriately scales the histogram of pixel column average values and thereby produces a table of 2048 gain correction values which collectively form the Lamp On Correction Curve that is stored within Gain Correct Look-up (RAM) Table 4270.

Upon entry into this routine, block 1910 is first executed to calculate inverted pixel column average values (INV PCAVG$_0$, INV PCAVG$_1$, ..., INV PCAVG$_{2047}$) by dividing each pixel column average value (PCAVG$_0$, PCAVG$_1$, ..., PCAVG$_{2047}$) into the decimal number "32768". All these inverted values are then stored in appropriate memory locations located within the microcomputer system. Thereafter, execution sequentially proceeds through blocks 1920-1950 to appropriately scale each inverted value. The histogram of pixel column average values, calculated as part of Lamp On Correction Routine 1800 as discussed above in conjunction with FIGS. 18A–18C, is used to determine an appropriate vertical offset for the lamp on correction curve, when viewed as a function of pixel location. Specifically, block 1920, when executed as shown in FIGS. 19A and 19B, locates the averaged video value (VID VALUE), by moving backward through the histogram of pixel column average values, where 40 "hits" first occur. The decimal value "40" is an empirically determined value that is based upon the transmissivity of the microfilm. Once this location has been found, then execution proceeds to block 1930 which, when executed, calculates an appropriate scaling factor by determining the inverse value of VID VALUE. Thereafter, block 1940 is executed to add eight bits of precision to each of the 2048 inverted pixel column average values by multiplying each of these values by the decimal number "128". Once this has occurred, execution proceeds to block 1950 which calculates 2048 gain factors (GF$_0$, GF$_1$, ..., GF$_{2047}$), which collectively form the lamp on correction curve, by dividing each inverted pixel column average value by the scaling factor, i.e. the inverse video value. The resulting 2048 gain factors are then stored, through execution of block 1960, in corresponding locations in Gain Correct Look-up Table (RAM) 4270 located within Shading Correction Circuit 426 (see FIG. 3). Once this storage operation is complete, Invert and Scale Routine 1900 has fully executed. As a result, execution then returns to Lamp On Correction Routine 1800.

A flowchart of Lamp On Diagnostic Routine 2000 is depicted in FIG. 20. As noted above, this routine performs various diagnostic tests with the illumination lamp on and provides additional diagnostic test information concerning the performance of the optics located in the microfilm scanner.

Specifically, as shown in FIG. 20, execution begins with block 2010 which instructs the microfilm scanner to scan an image. Once this first scan is completed, this block stores the resulting pixels for a specific scan line, again designated as scan line SL which is typically scan line 1000, as line A. Execution then proceeds to block 2020 which corrects the pixel data in the line A for gain differences using the gain correction factors obtained through Lamp On Correction Routine 1800 (discussed above in conjunction with FIGS. 18A–18C) and then stores the corrected scan line data as Corrected Line A. Thereafter, execution passes to block 2030 which calculates various diagnostic measures on the data obtained for Corrected Line A. These measures include: minimum intensity value, maximum intensity value, mean value, standard deviation, and odd/even average value differences. The odd/even averages are computed by averaging the data for each adjacent pair of odd and even pixels that comprise Corrected Line A. Once all these average values are computed by block 2030, then the average value of the difference between individual odd/even averages is computed. The value of the latter average indicates the amount of side-to-side (horizontal) shading variation remaining in the gain corrected image. Once this has occurred, the results are printed for use by an operator.

Next, routine 2000 determines whether the performance of the optical scanning system varies with time and provides a measure of that variability. To do this, routine 2000 obtains a second scan of the image and compares the gain corrected results for the same scan line SL that occurs in both image scans but at different points in time. Specifically, the microcomputer first waits a pre-defined interval of time which is typically several seconds before initiating the second scan. This wait is necessary to allow the scanner to reset itself and for any transients to settle. After this period of time elapses, execution passes to block 2040. This block, when executed, instructs the microfilm scanner to scan an image. Once this second scan is completed, this block stores the resulting pixels for scan line SL as line B.

Thereafter, execution proceeds to block 2050 which corrects the pixel data in line B for gain differences again using the same gain correction factors. The resulting gain corrected scan line is stored as Corrected Line B. Thereafter, execution proceeds to block 2060 which determines any temporal differences between corresponding pixels on Corrected Lines A and B. Any such differences indicates time dependent variability in the optical scanning system. The results are then printed by this block for use by the operator. At this point, execution of Lamp On Diagnostic Routine 2000 is complete and execution returns to Calibration Routine 1500.

Once system execution has reached this point, all the calibration routines have been executed and microcomputer system 485 (see FIGS. 2A and 2B) waits for a document edge interrupt to occur in order to initiate edge processing.

3. Edge Detection Routines

Essentially, Document Edge Detection Routine 2100, when executed at the occurrence of each document edge interrupt occurring on lead 486 (see FIGS. 2A and 2B) reads leading/trailing edge pairs from document edge detection circuit on a scan line-by-scan line basis and then appropriately processes these edge pairs to first locate the actual leading edge (left boundary) and trailing edge (right boundary) of a portion of the scanned document located within each scan line. Once, all these edges have been located, the routine then determines the actual edges (top, bottom, left and right) of an escribing rectangle that completely contains the document presently being scanned. After this has occurred, routine 2100 uses this edge location information of the escribing rectangle to calculate both a memory address, within windowing frame buffer 489 (specifically frame buffer 5013), at which the first pixel in the escribing rectangle is stored and the horizontal and vertical size of the rectangle. Thereafter, routine 2100 passes the address of the first pixel and the rectangle size to windowing frame buffer 489 which, in turn, successively reads the values of all the pixels stored therein and situated on and within the escribing rectangle and then routes these values to video compressor 50 (see FIG. 1).

Figure 21B:
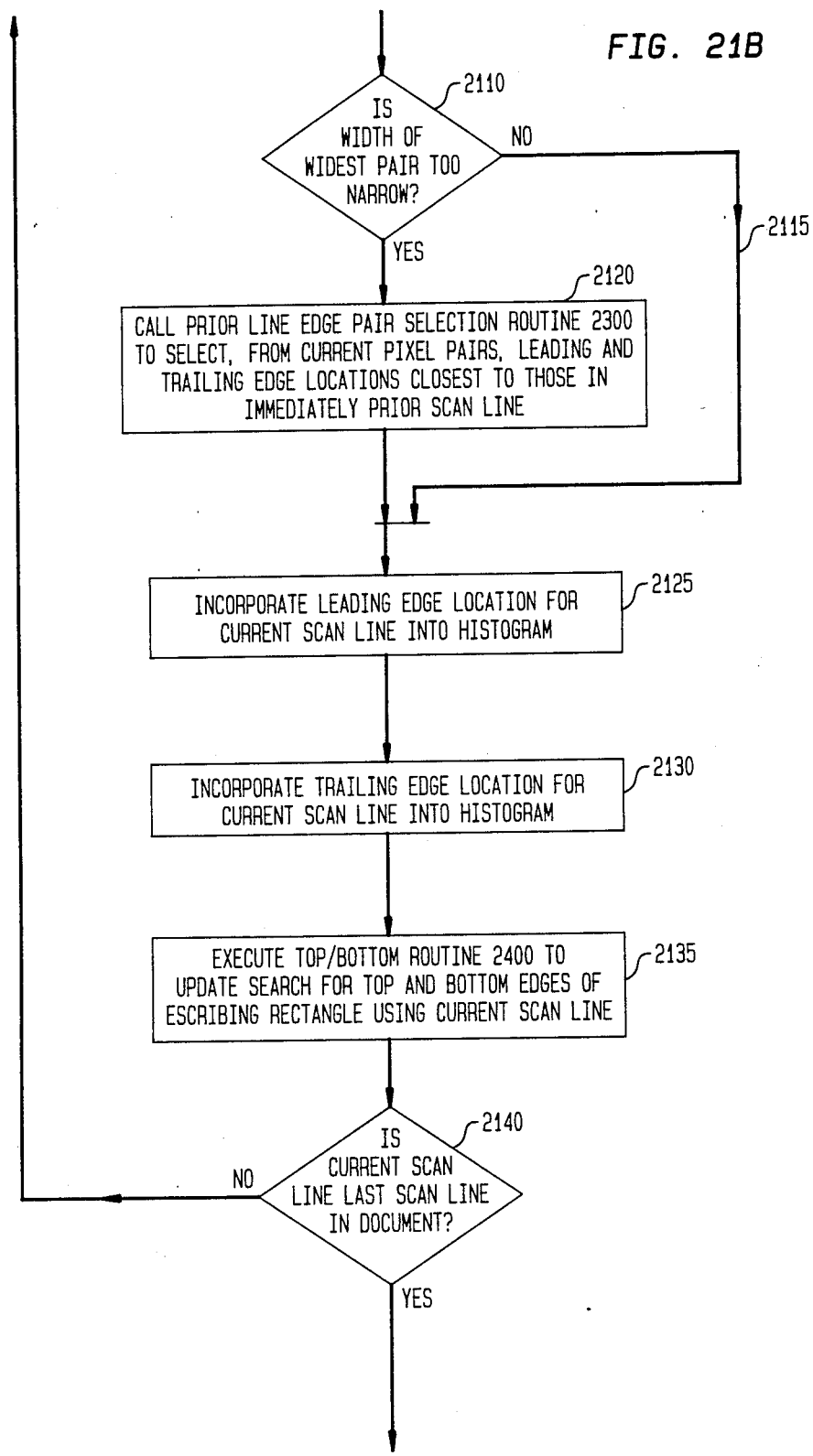
Figure 21C:
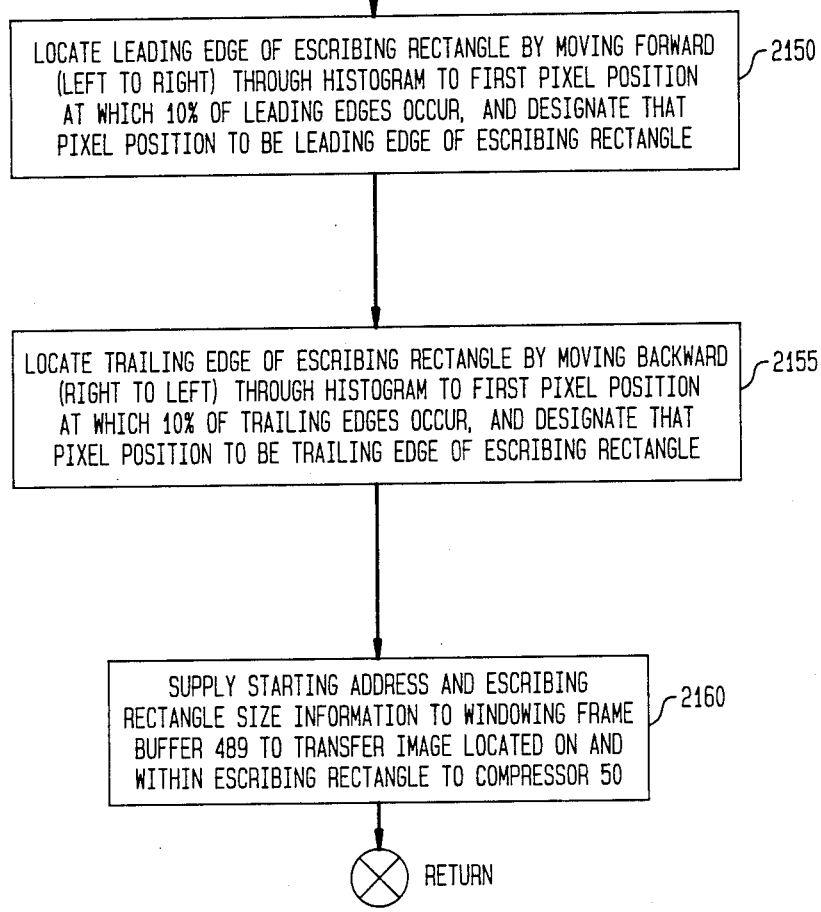

Specifically, a flowchart of Document Edge Detection Routine 2100 is depicted in FIGS. 21A-21C, for which the correct alignment of the drawing sheets for these figures is shown in FIG. 21. Upon the occurrence of a document edge detection interrupt, execution enters routine 2100 and proceeds to block 2101. This block, when executed, initializes the contents of an edge counter (ECOUNT) to zero. Thereafter, execution proceeds to a loop formed of blocks 2103, 2105 and 2107 in order to process each edge pair in a scan line in order to locate that edge pair having the widest spacing in that line. This loop is traversed for each edge pair provided by Document Edge Detection Circuit 481 (see FIGS. 2A and 2B). Specifically, within this loop and as shown in FIGS. 21A-21C, execution first proceeds to block 2103 which increments the contents of the edge counter (ECOUNT) by one. Once this has occurred, execution proceeds to block 2105 which, when executed, invokes Widest Pair Determination Routine 2200. This routine selects the leading/trailing edge pair in the current scan line that has the widest separation and stores the pixel locations of that edge pair for further processing. Once this routine has executed, execution then proceeds to decision block 2107. This decision block determines whether all the edge pairs in the current scan line have been processed. If any more edge pairs remain to be processed, then decision block 2107 routes execution, via "NO" path 2108, back to block 2103 to process these edges in seriatum. Alternatively, if all the edge pairs in the current scan line have been processed, then decision block 2107 routes execution, via "YES" path 2109, to decision block 2110.

Decision block 2110 determines whether the width of the widest edge pair selected by routine 2200 is less than a pre-selected minimum number of pixels. If not, then this edge pair is designated as the actual leading/trailing edge pair of the document portion, i.e. the left and right boundaries of the document, contained within the current scan line and execution proceeds from decision block 2110, via "NO" path 2115, to block 2125. This latter block, when executed, constructs a histogram of all the leading edges of the document in the scanned image by incrementing the cell in the histogram that corresponds to the location of the actual leading edge of the current scan line. Alternatively, in the event that the widest edge pair selected by routine 2200 is too narrow—thereby indicative of a hole, a large blackened area or the like, in the scanned image, then execution proceeds, via the "YES" path emanating from decision block 2110, to block 2120. This block, when executed, invokes Prior Line Edge Pair Selection Routine 2300 to select, from all the leading/trailing edge pairs produced by Document Edge Detection Circuit 481 (see FIGS. 2A and 2B), the locations of the particular edge pair that is closest, in position, to the widest actual leading/trailing edge pair locations that have been designated for the immediately prior scan line. The resulting leading edge is then incorporated, as shown in FIGS. 21A-21C, into the histogram through execution of block 2125. Once the appropriate histogram has been updated with the current actual leading edge location, execution proceeds to block 2130 which updates a second histogram with the actual trailing edge location for the current scan line. Thereafter, execution proceeds to block 2135 which, when executed, invokes Top/Bottom Routine 2400, as discussed below in conjunction with FIGS. 24A-24C, to update a search for the top and bottom edges of the escribing rectangle containing the document being scanned with data from the current scan line being processed. Now, once block 2135 has executed, execution proceeds to block 2140 to test whether the current scan line being processed is the last scan line that forms the escribing rectangle. In the event the current scan line is not the last line in the rectangle, then execution is directed from decision block 2140, via "NO" path 2145, to block 2101 to initialize the edge counter and then appropriately process the edge pairs in order to locate an appropriate actual leading/trailing edge pair for the next scan line. Alternatively, in the event, the present scan line is the bottom edge of the escribing rectangle, i.e. there are no more lines in the scanned document, then execution proceeds to blocks 2150 and 2155 to pick the left and right edges of the escribing rectangle that contains the scanned document based upon the data contained in the histograms. Specifically, block 2150, when executed, defines the actual left edge of the escribing rectangle to be the first pixel location in the histogram, moving forward—i.e. from left to right—through the histogram, at which 10% of the actual leading edges have occurred. Now, once this left edge has been defined as a specific pixel location, execution proceeds to block 2155 that performs a similar operation to define the right edge. Specifically, block 2155, when executed, defines the actual right edge of the escribing rectangle to be the first pixel location in the histogram, moving backward—i.e. from right to left—through the histogram, at which 10% of the actual trailing edges have occurred. As will be discussed in detail later, actual left and right pixel edge locations are determined for every fourth scan line in a scanned image; however, masking is performed on every scan line. Consequently, if these locations are determined for a current scan line, then the actual leading edge pixel locations for this line and the fourth prior scan line are interpolated to yield actual leading edge pixel locations for the three prior scan lines, and similarly for the actual trailing edge pixel locations. Now, with both the pixel locations of both the left and right edges defined, execution then proceeds to block 2160. This block, when executed, calculates the (x,y) starting address of the first pixel in the escribing rectangle (pixel in the upper left corner of the rectangle) and the vertical and horizontal sizes of the rectangle based on the location of the top, bottom, right and left edges of the rectangle. Thereafter, this block provides both the (x,y) starting address and the vertical and horizontal sizes to windowing frame buffer 489 (see FIGS. 2A and 2B). In response to these addresses, the windowing frame buffer masks the scanned enhanced image stored therein by sequentially accessing the values of only those pixel locations located on and within the edges of the escribing rectangle. The resulting stream of pixel values is provided by the buffer to compressor 50 for suitable video compression, as discussed above. Now, once all this information has been loaded into the windowing frame buffer by the microcomputer system, routine 2100 has fully executed. As a result, execution returns from Document Edge Detection Routine 2100 back to Main Loop 1400 (see FIG. 14).

Figure 22:
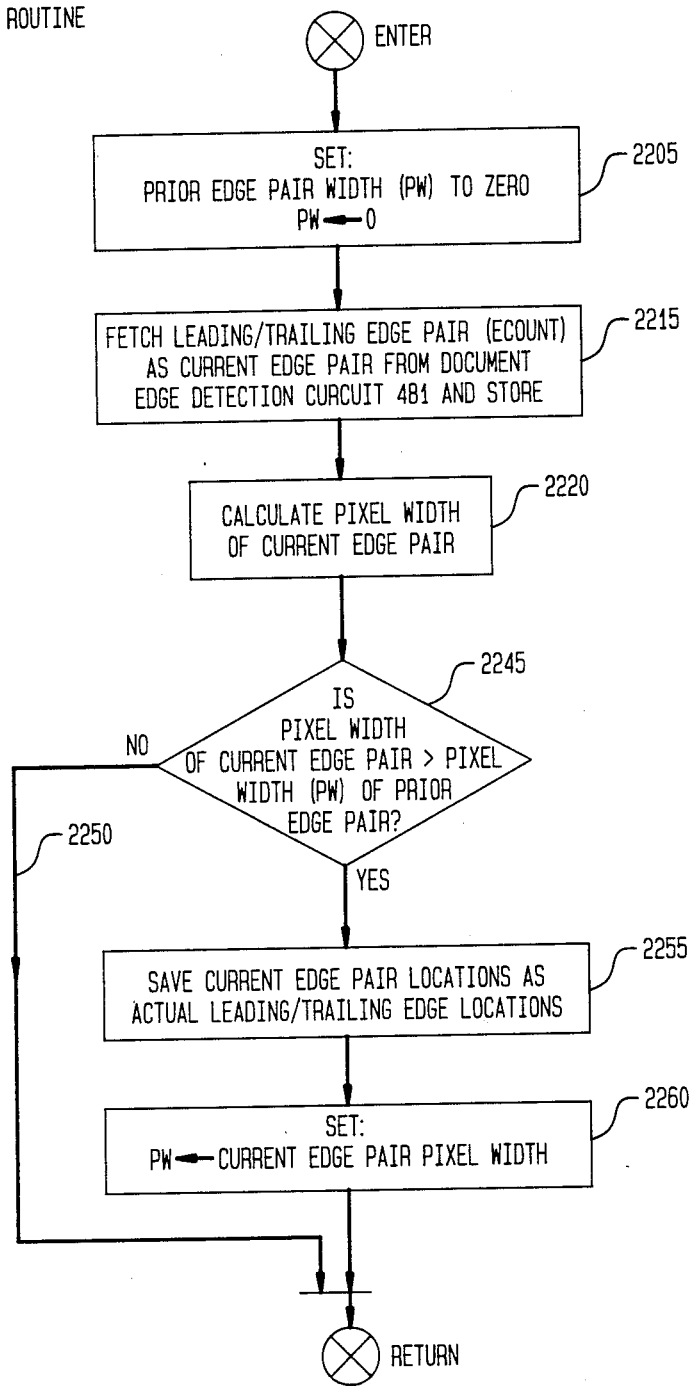
FIG. 22 depicts a flowchart of Widest Pair Determination Routine 2200 that is executed as part of Document Edge Detection Routine 2100 shown in FIGS. 21A-21C.

A flowchart of Widest Pair Determination Routine 2200 is depicted in FIG. 22. Essentially, as noted above, this routine analyzes all the edge pairs provided for any current scan line by Document Edge Detection Circuit 481 (see FIGS. 2A and 2B) to select the pair having the widest separation.

Specifically, upon entry into the routine and as shown in FIG. 22, execution sequentially proceeds to block 2205 which, when executed, sets the value of the prior edge pair width (PW) to zero. Thereafter, execution proceeds to block 2215. This block, when executed, fetches the next successive leading/trailing edge pair, as defined by the current contents of edge counter ECOUNT, available from Document Edge Detection Circuit 481 (see FIGS. 2A and 2B) and temporarily stores the pair, as the current edge pair, for subsequent processing. Once this has occurred, execution proceeds, as shown in FIG. 22, to block 2220 which calculates the spacing, in pixels, between the two edges that form the current edge pair. Thereafter, execution proceeds to decision block 2245. This decision block tests whether the width (measured in pixels) of the current edge pair is greater than the width (PW) for the prior edge pair for the same scan line. In the event the current edge pair has such a larger width, then the current pair is designated as the actual leading/trailing edge pair and the value of the prior edge pair (PW) is set equal to the width of the current pair for use in processing the next successive edge pair on the current scan line. Specifically, if the current edge pair possesses a larger width than the prior edge pair, then execution proceeds, via the "YES" path emanating from decision block 2245, to block 2255. This latter block, when executed, designates the current edge pair locations to be the actual leading/trailing edge pair locations for the current scan line. Next, execution proceeds to block 2260 which, when executed, sets the value of the prior edge width (PW) equal to that of the current edge pair. Execution then exits from routine 2200 and returns to Document Edge Determination Routine 2100. Now, alternatively, in the event the current edge pair has a width less than or equal to that of the prior edge pair, then the current edge pair is ignored. In this case, execution merely exits from routine 2200, via "NO" path 2250 emanating from decision block 2245, and returns to Document Edge Detection Routine 2100 (see FIGS. 21A-21C).

Figure 23B:
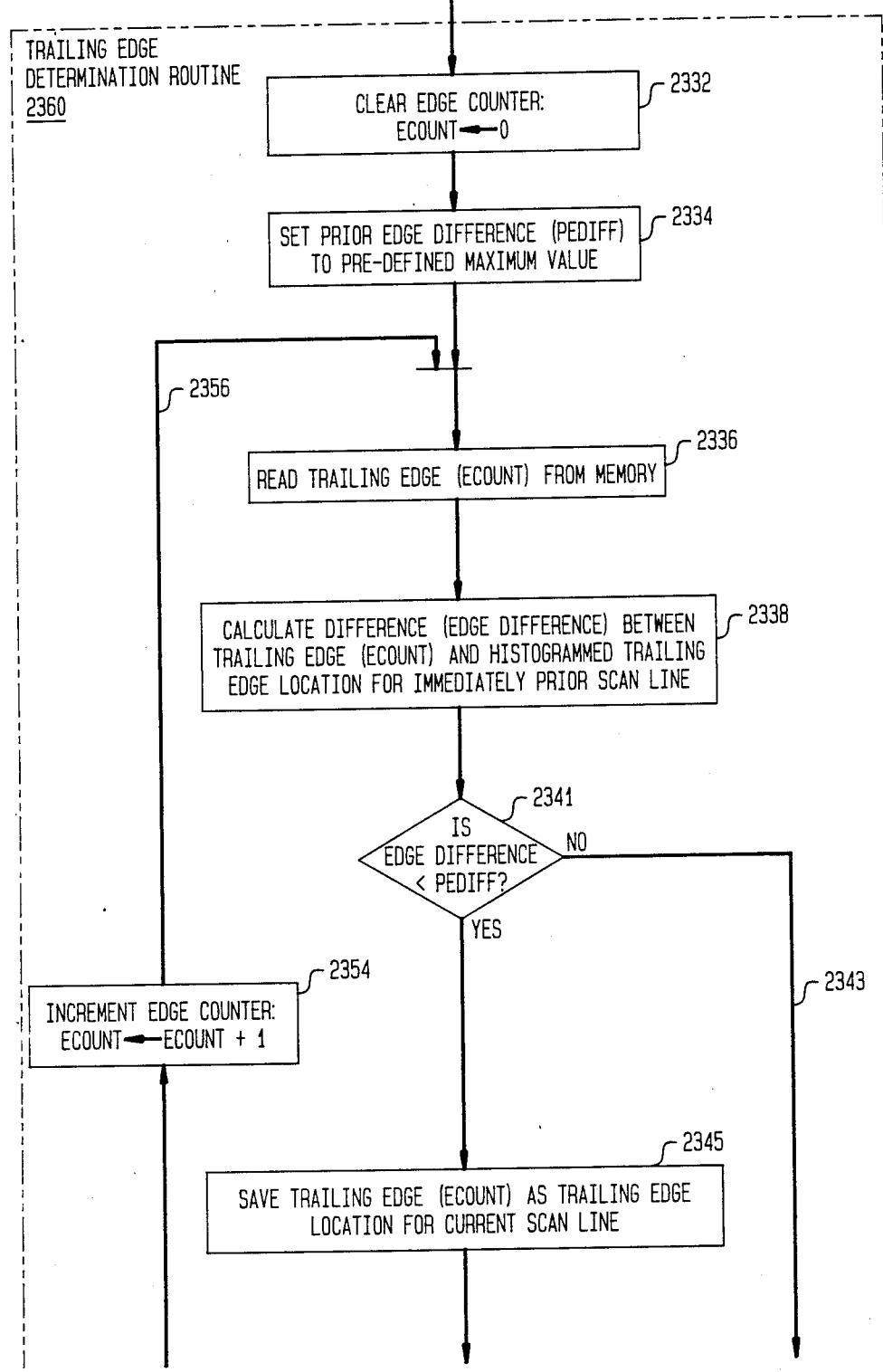
Figure 23C:
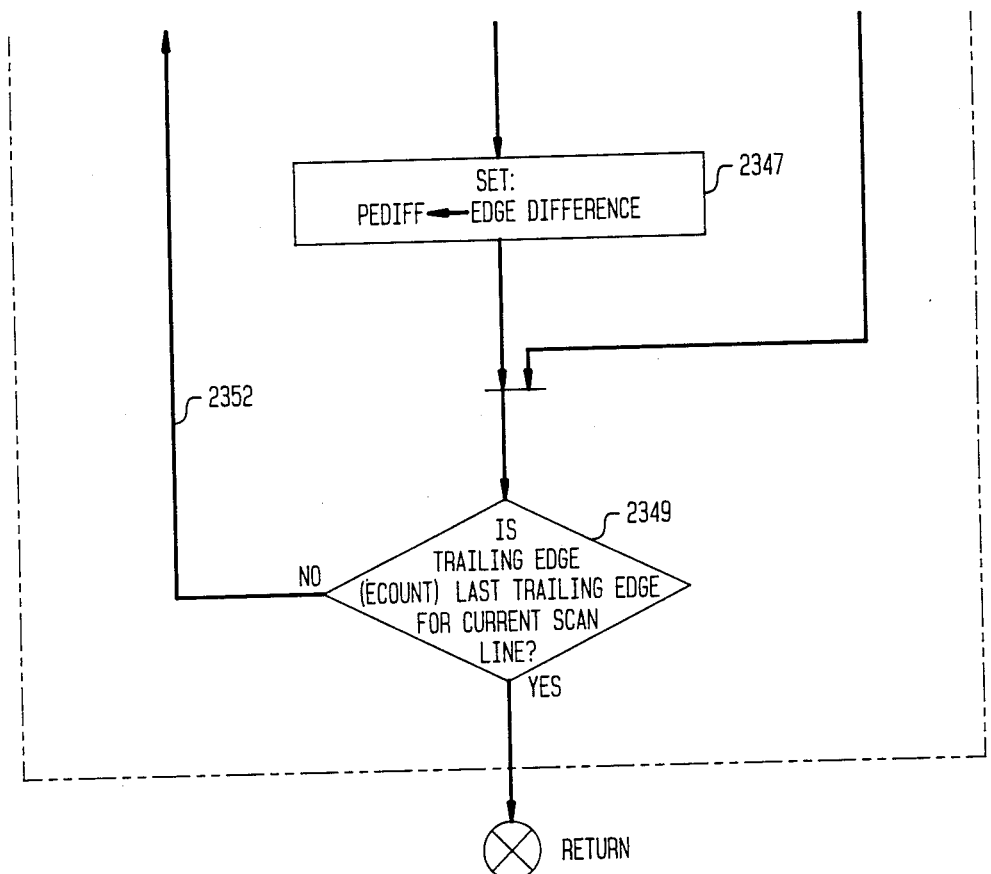

A flowchart of Prior Line Edge Pair Selection Routine 2300 is depicted in FIGS. 23A-23C, for which the correct alignment of the drawing sheets for these figures is shown in FIG. 23. Essentially, as noted above, this routine selects, from all the edge pairs produced by Edge Detection Circuit 481 (see FIGS. 2A and 2B), the particular edge pair that has the closest position to the actual leading/trailing edge pair that has been designated for the immediately prior scan line.

As shown in FIGS. 23A-23C, Prior Line Edge Pair Selection Routine 2300 consists of leading edge determination routine 2330, that determines the current leading edge based in part upon the leading edge in the prior scan line, and trailing edge determination routine 2360 that determines the current trailing edge based in part upon the trailing edge in the prior scan line. Both of these routines perform edge processing in a highly similar manner.

Specifically, upon entry into Prior Line Edge pair Selection Routine 2300, execution is directed to leading edge determination routine 2330 and, within this latter routine, to block 2302. This block, when executed, clears the value of an edge counter (ECOUNT) to zero. Thereafter, block 2304 is executed to set the prior edge difference value (PEDIFF) to a pre-defined maximum value. Once these operations have occurred, execution proceeds to block 2306. This block, when executed, accesses the leading edge defined by the value ECOUNT from resident memory in the microcomputer system. Thereafter, execution passes to block 2308 which calculates the difference measured in pixels (EDGE DIFFERENCE), occurring between the current leading edge and the designated leading edge for the immediately prior scan line, the latter edge having been used to update the corresponding histogram. Once this occurs, execution proceeds to decision block 2311 which determines whether the value of EDGE DIFFERENCE is less than that of the value of the previous edge difference (PEDIFF). If the inequality is met, i.e. that the current leading edge is moving closer to the designated leading edge for the prior scan line, then execution is routed, via the "YES" path emanating from decision block 2311, to block 2315. This latter block, when executed, saves the leading edge accessed by the current value of the edge counter, ECOUNT, as the preliminary designated location of the leading edge of the current scan line. Next, block 2317 is executed to set the value of the prior edge difference (PEDIFF) to the value of EDGE DIFFERENCE in preparation for processing the next leading edge. Execution then proceeds to decision block 2319. Alternatively, in the event the value of EDGE DIFFERENCE is larger than the value of PEDIFF, thereby indicating that the leading edge supplied for the current line is moving away from the designated leading edge for the prior scan line, then decision block 2311 routes execution, via "NO" path 2313, to decision block 2319. This latter decision block determines whether the last leading edge for the current scan line has been processed. If the last leading edge has not been processed, then decision block 2319 routes execution, via "NO" path 2322, to block 2324 to increment the contents of the edge counter, ECOUNT, by one. Once this has occurred, execution is directed, via path 2326, back to block 2306 to access and subsequently process the next leading edge on the current scan line. Now, alternatively, in the event all the leading edges for the current scan line have been processed, then decision block 2319 routes execution, via its "YES" path, to trailing edge determination routine 2360.

Upon entry into routine 2360, execution proceeds to block 2332. This block, when executed, clears the value of an edge counter (ECOUNT) to zero. Thereafter, block 2334 is executed to set the prior edge difference value (PEDIFF) to a pre-defined maximum value. Once these operations have occurred, execution proceeds to block 2336. This block, when executed, accesses the trailing edge defined by the value ECOUNT from resident memory in the microcomputer system. Thereafter, execution passes to block 2338 which calculates the difference measured in pixels (EDGE DIFFERENCE), occurring between the current trailing edge and the designated trailing edge for the immediately prior scan line, the latter edge having been used to update the corresponding histogram. Once this occurs, execution proceeds to decision block 2341 which determines whether the value of EDGE DIFFERENCE is less than that of the value of the previous edge difference (PEDIFF). If the inequality is met, i.e. that the current trailing edge is moving closer to the designated trailing edge for the prior scan line, then execution is routed, via the "YES" path emanating from decision block 2341, to block 2345. This latter block, when executed, saves the trailing edge accessed by the current value of the edge counter, ECOUNT, as the preliminary designated location of the trailing edge of the current scan line. Next, block 2347 is executed to set the value of the prior edge difference (PEDIFF) to the value of EDGE DIFFERENCE in preparation for processing the next trailing edge. Execution then proceeds to decision block 2349. Alternatively, in the event the value of EDGE DIFFERENCE is larger than the value of PEDIFF, thereby indicating that the trailing edge supplied for the current line is moving away from the designated trailing edge for the prior scan line, then decision block 2341 routes execution, via "NO" path 2343, to decision block 2349. This latter decision block determines whether the last trailing edge for the current scan line has been processed. If the last trailing edge has not been processed, then decision block 2349 routes execution, via "NO" path 2352, to block 2354 to increment the contents of the edge counter ECOUNT by one. Once this has occurred, execution is directed, via path 2356, back to block 2336 to access and subsequently process the next trailing edge on the current scan line. Now, alternatively, in the event all the trailing edges for the current scan line have been processed, then routine 2300 has been fully executed and execution returns, via the "YES" path emanating from decision block 2349, to Document Edge Detection Routine 2100 (see FIGS. 21A-21C). At this point, a edge pair has been designated as a leading/trailing edge pair of the portion of the scanned document contained within the current scan line.

Figure 24C:
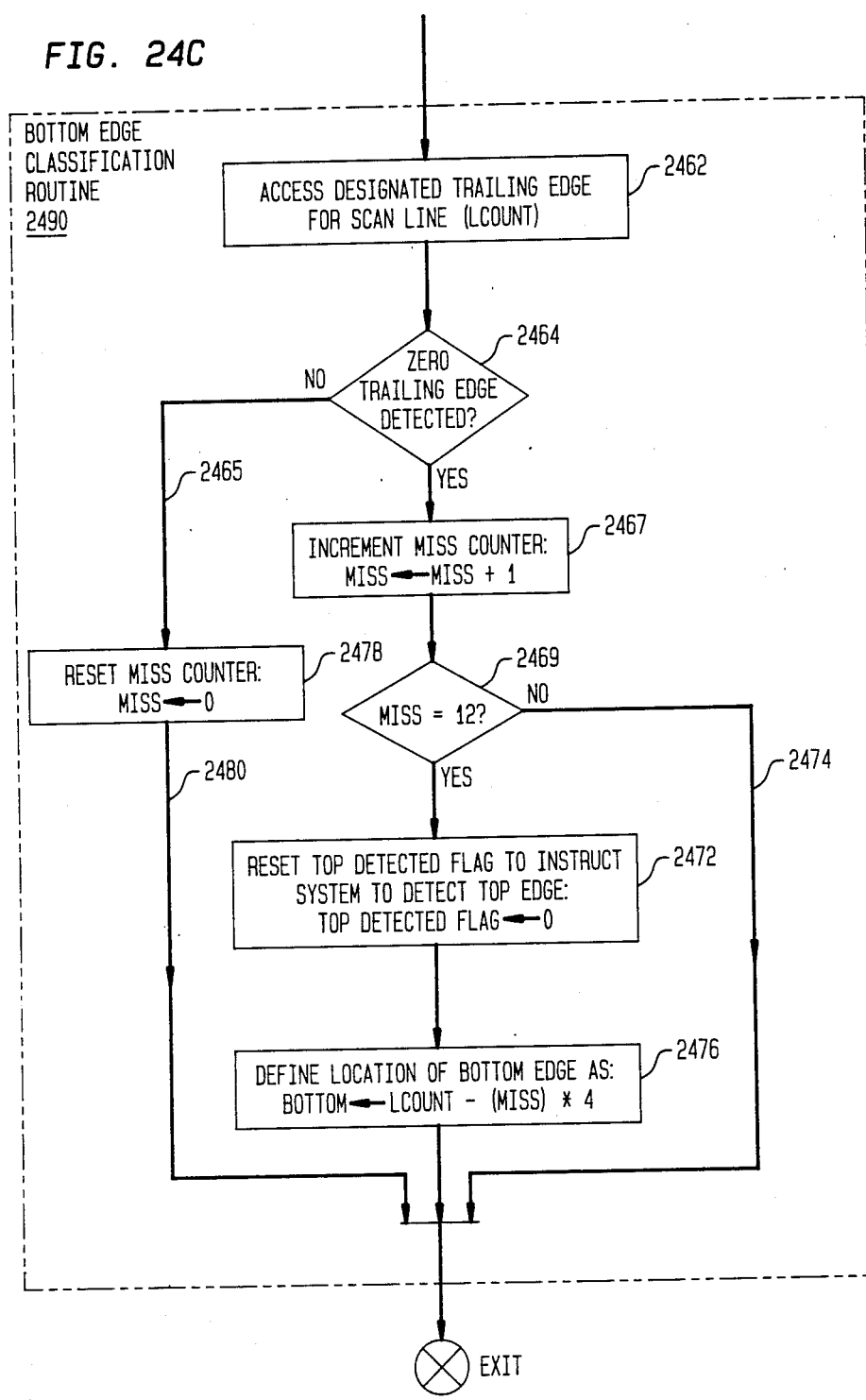

A flowchart of Top/Bottom Routine 2400 is depicted in FIGS. 24A-24C, for which the correct alignment of the drawing sheets for these figures is shown in FIG. 24. Essentially, as noted above, this routine updates a search for the actual top and bottom edges of the escribing rectangle containing the document being scanned with data from the current scan line being processed.

As shown in FIGS. 24A-24C, Top/Bottom Routine 2400 contains initialization routine 2410 that initializes various counters and a flag, top edge classification routine 2430 that identifies the location of the top edge in the scanned image based upon the number of successive designated leading edges in the scanned image, and bottom edge classification routine 2490 that identifies the location of the bottom edge based upon the number of successive designated trailing edges in the scanned image. Top edge classification routine 2430 and bottom edge classification routine both 2490 perform edge processing in a similar manner.

Specifically, upon entry into Top/Bottom Routine 2400 execution passes to initialization routine 2410 which initializes various counters and the value of a "Top Detected" flag. Specifically, execution first proceeds to decision block 2402. This decision block tests whether the first scan line in the image is being processed. If it is, then various counters and a flag need to be initialized. Consequently, execution proceeds, via the "YES" path emanating from decision block 2402 to block 2404. This block, when executed, clears the contents in three counters: a hit counter ("HIT"), a miss counter ("MISS") and a line counter (LCOUNT). As described in detail below, the hit counter counts the number of successive leading edges and the miss counter counts the number of successive absent trailing edges in the current image. The line counter keeps track of the number of the current scan line being processed during edge detection. Now, once these counters have been cleared, execution proceeds to block 2406 which resets the Top Detected flag to zero. This flag is used by the microcomputer system to identify whether the top or bottom edge is being detected. After this flag is reset, then execution exits from initialization routine 2410 and proceeds to decision block 2411. Alternatively, in the event that the current scan line being processed is not the first line, then execution is directed by decision block 2402, via "NO" path 2403, to block 2408 to increment the contents of the line counter for use in accessing the designated leading edge for the next scan line. Although every scan line can be processed in order to accurately locate the edges of the escribing rectangle, processing speed can be significantly increased with minimal loss in accuracy if as few as every fourth scan line is processed. In this manner, processing time for edge detection is reduced to one quarter of that which would otherwise be required if every line were to be processed. Consequently, block 2408, when executed, increments the contents of LCOUNT by four rather than one. If processors are used that execute instructions at a rate significantly faster than the instruction cycle time of microcomputer system 485 (see FIGS. 2a and 2B), then every other or even every single scan line can be processed. Hence, in that case, the incrementation provided by block 2408, as shown in FIGS. 24A-24C, can be reduced to either two or one, if desired. In any event, once the contents of the line counter have been appropriately incremented, execution exits from initialization routine 2410 and proceeds to decision block 2411.

Decision block 2411 determines, based upon the state of the Top Detected flag, whether to detect a top or bottom edge. Specifically, if the value of this flag has been set to zero, then a top edge is to be detected in which case execution proceeds, via "YES" path 2413 from decision block 2411, to top edge classification routine 2430. Alternatively, if the value of this flag has been set to one, then a bottom edge is to be detected, in which case execution proceeds, via "NO" path 2412 from decision block 2411, to bottom edge classification routine 2490.

Now, in the event top edge classification routine 2430 is to be executed, then execution is first routed, within this routine, to block 2414 which accesses the designated leading edge for the particular scan line identified by the contents of the line counter, LCOUNT. Once the next designated leading edge has been accessed, execution passes to decision block 2416 which tests whether the position of the leading edge is "non-zero" Initially, document edge detection circuit 481 (see FIGS. 2A and 2B) sets the position of the leading and trailing edges in each scan line to zero (specifically FIFO 5205 shown in FIGS. 12A–12C is reset by various control signals not shown). If this circuit detected no leading edges in any scan line, then the position of the leading edge supplied by this circuit to the microcomputer system remains at zero. Now, if no leading edge exists on the current scan line, then decision block 2416, as shown in FIGS. 24A–24C, routes execution, via its "NO" path, to block 2418. This latter block resets the contents of the hit counter to zero since a leading edge has not been detected. Thereafter, execution exits from top edge classification routine 2418, via path 2428, and proceeds to decision block 2450. Alternatively, in the event a leading edge has been detected, i.e. the location of the leading edge is non-zero, then decision block 2416 routes execution, via its "YES" path, to block 2420. This block, when executed, increments the contents of the hit counter by one. Each successive leading edge will continue to increment the value of this counter as successive scan lines are processed through routine 2400 and specifically through top edge classification routine 2430. Now, an actual top edge is arbitrarily defined to the scan line that immediately precedes all the scan lines that together contain fifty successive detected leading edges (which equals the number of the current scan line minus 200). Therefore, once the contents of the hit counter have been incremented by block 2420, then execution proceeds to decision block 2422 to test whether the contents of the hit counter have reached fifty. If the contents are less than fifty, then the decision block merely routes execution, via path 2425, to decision block 2450. Now, in the event that the contents of the hit counter have reached fifty, then decision block 2422 routes execution, via its "YES" path, to block 2424. This latter block, when executed, sets the value of the Top Detected flag to one in order to instruct the microcomputer system to detect a bottom edge. Thereafter, execution proceeds to block 2427 to compute the location of the top edge of the escribing rectangle to be the contents of the line counter, LCOUNT, minus four times the contents of the hit counter, i.e. the decimal value 200. Once the position of this edge has been calculated, execution proceeds from block 2427 to decision block 2450.

Decision block 2450, when executed, tests the value of the Top Detected flag to determine whether a bottom edge is to be detected. Specifically, if a top edge was detected, then top edge classification routine 2430 has changed the value of the Top Detected flag from a one to a zero. Inasmuch as this indicates that the microcomputer system should now locate a bottom edge, decision block 2450 routes execution, via "YES" path 2455, to bottom edge classification routine 2490. Alternatively, in the event the value of the Top Detected flag remains at one, indicating that a top edge has not yet been located, then execution exits from Top/Bottom Routine 2400 via the "NO" path emanating from decision block 2450.

Now, upon entry into bottom edge classification routine 2490, execution proceeds to block 2462 which accesses the trailing edge for the current scan line being processed, i.e. scan line (LCOUNT). Once this edge has been accessed, execution passes to decision block 2464 which tests whether the position of the trailing edge is "non-zero". Initially, as noted above, document edge detection circuit 481 (see FIGS. 2A and 2B) sets the position of the trailing edge in each scan line to zero. If this circuit detected no trailing edges in any scan line, then the position of the trailing edge supplied by this circuit to the microcomputer system remains at zero. Now, in the event that no trailing edge exists on the current scan line, decision block 2464, as shown in FIGS. 24A–24C, routes execution, via its "YES" path, to block 2467. This latter block increments the contents of the miss counter by one since a trailing edge has not been detected. The absence of a trailing edge on each successive scan line will continue to increment the value of the miss counter as these scan lines are processed through routine 2400 and specifically bottom edge classification routine 2490. Now, an actual bottom edge is arbitrarily defined to the scan line that immediately precedes all the scan lines that contain 12 successive missed trailing edges (which equals the number of the current scan line minus 48). Therefore, once the contents of the miss counter have been incremented by block 2467, then execution proceeds to decision block 2469 to test whether the value of the miss counter has reached "12". If the contents are less than "12", then this decision block merely routes execution, via path 2474, to the exit point of routine 2400. Now, in the event that the contents of the miss counter have reached the value "12", then decision block 2469 routes execution, via its "YES" path, to block 2472. This latter block, when executed, sets the value of the Top Detected flag to zero in order to instruct the microcomputer system to once again detect a top edge. Thereafter, execution proceeds to block 2476 to compute the location of the bottom edge of the escribing rectangle to be the contents of the line counter, LCOUNT, minus four times the contents of the miss counter, i. e. the decimal value 48. Once the position of this edge has been calculated, execution proceeds from block 2476 to the exit point of routine 2400 and from there returns to Document Edge Detection Routine 2100. Now, alternatively, in the event a trailing edge has been detected on the current scan line, i.e. the location of this trailing edge is non-zero, then the bottom edge of the escribing rectangle is at least 48 scan lines down from the current scan line. Hence, decision block 2464 routes execution, via "NO" path 2465, to block 2478. This block, when executed, resets the contents of the miss counter to zero. Once this has occurred, execution exits from routines 2490 and 2400, via path 2480, and returns to Document Edge Detection Routine 2100.

This now concludes the discussion of the software used to determine the actual edge locations and information relating to the location and size of the escribing rectangle.

Even though the inventive apparatus and methods for locating edges in a scan line has been explained in conjunction with detecting edges in scanned microfilm images, edge detection circuit 481 can detect any edge in a scanned image regardless of the source of the image. The image can be produced by any source of scanned video information such as a video camera, a facsimile scanner or the like. Once image edges have been detected, they can be routinely processed, using the inventive methods or a hardware implementation thereof, to locate one or more regularly occurring boundaries in the scanned image. These boundaries are not limited to those of an escribing rectangle that contains a scanned document or the left and right boundaries of the document, as has been used above, but can instead be those of any regularly occurring object located within the scanned image or of any specific pre-defined portion of that image.

Furthermore, although the windowing frame buffer, as described above, performs a masking operation to extract all the pixel values that form escribing rectangle 11 (see FIG. 1), containing document 13, from over-scanned image 12, a desired rectangular (or square) portion of document 13 can be accessed from the frame buffer and provided to compressor 50. This can be readily accomplished by suitably modifying block 2160 in Document Edge Detection Routine 2100 (see FIGS. 21A–21C) to change the starting location and reduce the vertical and horizontal size of the escribing rectangle that is provided by the microcomputer system to windowing frame buffer 489 (see FIG. 2A and 2B).

Although a single embodiment of the present invention has been shown and described herein, many other varied embodiments that incorporate the teachings of the invention may be easily constructed by those skilled in the art.

We claim:

1. In a system for processing a scanned image stored within a frame buffer, wherein the scanned image contains pixels that collectively form an image of a document, a method for extracting pixel values from said frame buffer and associated with at least a portion of the image of the document, said method comprising the steps of:

determining horizontal pixel locations for left and right edges of the image of the document for each of a plurality of scan lines located within said scanned image, wherein each of said scan lines contains at least one pixel that comprises the image of the document;

ascertaining, in response to the left and right edges in said plurality of scan lines, first and second vertical pixel locations of corresponding top and bottom edges of an escribing rectangle located within a frame buffer that stores said scanned image, wherein said escribing rectangle completely contains said image of the document;

determining, in response to said horizontal pixel locations for said left edge, a location where a first pre-determined percentage of said left edges has occurred in order to select a first horizontal pixel location in said scanned image at which a leading edge of the escribing rectangle occurs;

determining, in response to said horizontal pixel locations for said right edge, a location where a second pre-determined percentage of said right edges has occurred in order to select a second horizontal pixel location in said scanned image at which a trailing edge of said escribing rectangle occurs;

determining, in response to said first and second horizontal pixel locations and said first and second vertical pixel locations, memory addressing information relating to where pixel values, that are contained within said escribing rectangle, are located within said frame buffer;

accessing, in response to said information, contents of various memory locations, stored within said frame buffer, in order to obtain selected pixel values; and providing said selected pixel values to an output connection as the pixel values that are associated with at least a portion of the image of the document.

2. The method in claim 1 wherein said memory addressing information determining step comprises the steps of:

determining a memory location of a first pixel in the escribing rectangle and horizontal and vertical size information of said rectangle; and applying said first pixel memory location and the vertical and horizontal size information to addressing circuitry situated within said frame buffer.

3. The method in claim 2 wherein said left and right edge pixel locations determining step comprises the step of: comparing a separation between the left and right edges of a current scan line within said plurality of scan lines to a pre-determined amount and, if said separation is less than said pre-determined amount, selecting left and right edge locations for a most recent scan line in said plurality of scan lines for the left and right edge locations for the current scan line.

4. The method in claim 3 wherein said first and second vertical pixel locations ascertaining step includes the step of finding the top edge of said escribing rectangle as being a vertical pixel address of a first scan line in a first group of a first pre-determined number of successive scan lines, wherein each of the said scan lines in said first group contains a leading edge.

5. The method in claim 4 wherein said first and second vertical pixel locations ascertaining step includes the step of finding the bottom edge of said escribing rectangle as being a vertical pixel address of a first scan line in a second group of a second pre-determined number of successive scan lines, wherein each of said scan lines in said second group does not contain a trailing edge.

6. The method in claim 5 wherein said first and second pre-determined percentages are both approximately equal to 10%.

7. The method in claim 6 wherein said scanned image is a scanned microfilm image.

8. The method in claim 1 wherein said left and right edge pixel locations determining step comprises the steps of:

providing, in response to at least one incoming pixel value that comprises a scan line in the scanned image, a background value representative of a background level in said scanned image and associated with said incoming pixel value;

generating, in response to said background value and to said incoming pixel value, a first signal indicating that said background value exceeds a first value and a second signal indicating that said incoming pixel value exceeds a second value;

determining, in response to said first and second signals, whether an edge transition has occurred in the scan line and, in response thereto, providing a suitable indication thereof, wherein said determining and providing step comprises the steps of:

ascertaining, as a pre-defined logical function of said first and second signals, whether said edge transition has occurred and, in response thereto, producing at least one suitable control signal; and determining, in response to said one control signal and to a pixel clock signal, whether said edge transition is followed in said scan line by a pre-defined number of similar pixel values and, in response thereto, providing said indication;

storing, in response to said indication and to a horizontal pixel address representing a pixel location of said incoming pixel on said scan line, said pixel address as a stored edge; and selecting pixel locations for a leading edge and a corresponding trailing edge for said scan line, from amongst the stored edges, wherein said selected pixel locations for the leading and trailing edges have a widest pixel spacing of all the leading and corresponding trailing edges stored for said scan line in said scanned image.

9. The method in claim 8 wherein said first and second signal generating step comprises the steps of:

generating first and second comparison levels, wherein said first and second comparison levels slowly change in order to track variations in said background level and said incoming pixel values;

comparing said background value to the first comparison level and comparing said incoming pixel values to said second comparison level in order to generate said first and second signals, respectively.

10. The method in claim 9 wherein said edge transition ascertaining step comprises the step of ignoring any edge transition that is not followed by at least a pre-determined minimum number of similar pixel values in order to filter noise from said image.

11. The method in claim 10 wherein said pre-determined minimum number is "5" and said pre-defined number is "20".

12. The method in claim 11 wherein said memory addressing information determining step comprises the steps of:

determining a memory location of a first pixel in the escribing rectangle and horizontal and vertical size information of said rectangle; and applying said first pixel memory location and the vertical and horizontal size information to addressing circuitry situated within said frame buffer.

13. The method in claim 12 wherein said left and right edge pixel location determining step comprises the step of: comparing a separation between the left and right edges of a current scan line within said plurality of scan lines to a pre-determined amount and, if said separation is less than said pre-determined amount, selecting left and right edge locations for a most recent scan line in said plurality of scan lines for the left and right edge locations for the current scan line.

14. The method in claim 13 wherein said first and second vertical pixel locations ascertaining step includes the step of finding the top edge of said escribing rectangle as being a vertical pixel address of a first scan line in a first group of a first pre-determined number of successive scan lines, wherein each of the said scan lines in said first group contains a leading edge.

15. The method in claim 14 wherein said first and second vertical pixel locations ascertaining step includes the step of finding the bottom edge of said escribing rectangle as being a vertical pixel address of a first scan line in a second group of a second pre-determined number of successive scan lines, wherein each of said scan lines in said second group does not contain a trailing edge.

16. The method in claim 15 wherein said first and second pre-determined percentages are both approximately equal to 10%.

17. The method in claim 16 wherein said scanned image is a scanned microfilm image.

* * * * *